US012782648B2

(12) United States Patent
Hinata et al.

(10) Patent No.: US 12,782,648 B2
(45) Date of Patent: Nov. 3, 2026

(54) OPTICAL CONNECTOR AND OPTICAL CONNECTOR MODULE

(71) Applicant: Enplas Corporation, Saitama (JP)

(72) Inventors: Ayano Hinata, Saitama (JP); Honoka Nara, Saitama (JP)

(73) Assignee: Enplas Corporation, Saitama (JP)

( * ) Notice: Subject to any disclaimer, the term of this patent is extended or adjusted under 35 U.S.C. 154(b) by 272 days.

(21) Appl. No.: 18/687,876

(22) PCT Filed: Sep. 5, 2022

(86) PCT No.: PCT/JP2022/033327
§ 371 (c)(1),
(2) Date: Feb. 29, 2024

(87) PCT Pub. No.: WO2023/033177
PCT Pub. Date: Mar. 9, 2023

(65) Prior Publication Data

US 2025/0035864 A1 Jan. 30, 2025

(30) Foreign Application Priority Data

Sep. 3, 2021 (JP) ................................ 2021-144109
Oct. 29, 2021 (JP) ................................ 2021-177884
Feb. 10, 2022 (JP) ................................ 2022-019614

(51) Int. Cl.
*G02B 6/40* (2006.01)

(52) U.S. Cl.
CPC .................................... *G02B 6/403* (2013.01)

(58) Field of Classification Search
CPC ..... G02B 6/403; G02B 6/2555; G02B 6/2553
See application file for complete search history.

(56) References Cited

U.S. PATENT DOCUMENTS 6,536,954 B2 * 3/2003 Asada .................. G02B 6/3878 385/60
6,874,945 B2 * 4/2005 Gherardini ........... G02B 6/3821 385/139

(Continued)

FOREIGN PATENT DOCUMENTS

JP 2004-317527 11/2004
JP 2007-041222 2/2007

(Continued)

OTHER PUBLICATIONS

Supplementary European Search Report and the European Search Opinion Dated Jul. 16, 2025 From the European Patent Office Re. Application No. 22864759.0. (9 Pages).

*Primary Examiner* — Tina Wong

(57) ABSTRACT

An optical connector (120) according to the present invention comprises: a holding unit (121); a first optical unit (122), a second optical unit (123), a convex unit (124), concave unit (125), a first inner regulating surface (126) and a first outer regulating surface (127). When the optical connector (120) is engaged with the other optical connector, the convex unit (124) and the concave unit (125) are configured to be respectively engaged with the concave unit (125) and the convex unit (124) of the other optical connector, the first inner regulating surface (126) is configured to contact the first outer regulating surface (127) of the other optical connector, and the first outer regulating surface (127) is configured to contact the first inner regulating surface (126) of the other optical connector.

10 Claims, 40 Drawing Sheets

(56) References Cited

U.S. PATENT DOCUMENTS

| | | | | |
|---|---|---|---|---|
| 2003/0044125 | A1* | 3/2003 | Kiani | G02B 6/3821 385/76 |
| 2012/0033921 | A1 | 2/2012 | Haley et al. | |
| 2014/0056560 | A1 | 2/2014 | McColloch | |
| 2015/0219863 | A1 | 8/2015 | Haase et al. | |
| 2016/0231511 | A1* | 8/2016 | Watanabe | G02B 6/02042 |
| 2019/0154930 | A1* | 5/2019 | Ho | G02B 6/4256 |
| 2020/0103597 | A1 | 4/2020 | Watanabe et al. | |
| 2022/0050250 | A1 | 2/2022 | Asada et al. | |

FOREIGN PATENT DOCUMENTS

| | | |
|---|---|---|
| JP | 2015-530628 | 10/2015 |
| JP | 2020-101738 | 7/2020 |
| WO | WO 2018/221717 | 12/2018 |

* cited by examiner

OPTICAL CONNECTOR AND OPTICAL CONNECTOR MODULE

TECHNICAL FIELD

The present invention relates to an optical connector and an optical connector module.

BACKGROUND ART

In the related art, in the field of optical communications of transmitting light emitted from a light-emitting element such as a surface-emitting laser (for example, vertical-cavity surface-emitting laser (VCSEL), a plurality of optical transmission members is used to increase the capacity. Further, an optical connector for optically coupling optical transmission members is known (see, for example, PTL 1).

PTL 1 discloses a connector system for optically coupling a multiple core fiber and a single core fiber. The connector system disclosed in PTL 1 includes a first ferrule for holding an end portion of the multiple core fiber, a second ferrule for holding an end portion of the single core fiber, and a guide pin for connecting the first ferrule and the second ferrule. An insertion hole for inserting a guide pin is formed in each of the first ferrule and the second ferrule.

In the connector system disclosed in PTL 1, the multiple core fiber and the single core fiber are optically coupled by connecting the first ferrule and the second ferrule by inserting the guide pins to the insertion holes facing each other in the state where the first ferrule and the second ferrule face each other.

CITATION LIST

Patent Literature

PTL 1

Japanese Patent Application Laid-Open No. 2020-101738

SUMMARY OF INVENTION

Technical Problem

However, in the connector system disclosed in PTL 1, the guide pin is required to connect the first ferrule and the second ferrule, which makes the operation complicated and increases the cost due to the increased number of components.

An object of the present invention is to provide an optical connector that can couple optical connectors with the same shape without increasing the number of components, and to provide an optical connector module including the optical connector.

Solution to Problem

[1] An optical connector configured to hold a plurality of optical transmission members, and configured to be engaged with another optical connector with a same fitting shape holding a plurality of other optical transmission members to optically couple the plurality of optical transmission members and the plurality of other optical transmission members, the optical connector including: a holding part configured to hold the plurality of optical transmission members disposed in parallel to each other in a first direction; a first optical part disposed to face end surfaces of the plurality of optical transmission members held by the holding part, and configured to allow incidence of light emitted from the plurality of optical transmission members or emit light toward the plurality of optical transmission members; a second optical part configured to emit toward the other optical connector light entered from the first optical part, or allow incidence of light from the other optical connector; a protrusion and a recess disposed at positions in a line-symmetric manner with respect to a reference straight line extending in parallel to the first direction as viewed along an optical path between the optical connector and the other optical connector, the protrusion and the recess being configured for engaging with the other optical connector; at least one pair of first inward regulation surfaces that are flat surfaces disposed to face inward in the first direction, and configured to suppress positional displacement with respect to the other optical connector in the first direction; and at least one pair of first outward regulation surfaces that are flat surfaces disposed to face outward in the first direction, and configured to suppress positional displacement with respect to the other optical connector in the first direction. When the optical connector and the other optical connector are engaged with each other, the protrusion and the recess are engaged with a recess and a protrusion, respectively, of the other optical connector, the at least one pair of first inward regulation surfaces makes contact with at least one pair of first outward regulation surfaces of the other optical connector, and the at least one pair of first outward regulation surfaces makes contact with at least one pair of first inward regulation surfaces of the other optical connector.

[2] The optical connector according to [1], in which the at least one pair of first inward regulation surfaces and the at least one pair of first outward regulation surfaces are a part of a latch structure configured to connect the optical connector and the other optical connector.

[3] The optical connector according to [1] or [2], in which one of the protrusion and the recess includes a second inward regulation surface that is a flat surface disposed to face inward in a second direction perpendicular to the first direction as viewed along the optical path between the optical connector and the other optical connector, and configured to suppress positional displacement with respect to the other optical connector in the second direction. The other of the protrusion and the recess includes a second outward regulation surface that is a flat surface disposed to face outward in the second direction, and configured to suppress positional displacement with respect to the other optical connector in the second direction. When the optical connector and the other optical connector are engaged with each other, the second inward regulation surface makes contact with a second outward regulation surface of the other optical connector, and the second outward regulation surface makes contact with a second inward regulation surface of the other optical connector.

[4] The optical connector according to any one of [1] to [3], further including: an outward regulation part disposed to sandwich the second optical part in the first direction and to face outward in a second direction perpendicular to the first direction as viewed along the optical path between the optical connector and the other optical connector, the outward regulation part being configured to suppress positional displacement with respect to the other optical connector in the second direction; and an inward regulation part disposed to sandwich the second optical part in the first direction and to face away from the outward regulation part as viewed along the optical path between the optical connector and the other optical connector in the second direction, the inward regulation part being configured to suppress positional displacement with respect to the other optical connector in the second direction. The inward regulation part includes a first flat surface perpendicular to the second direction. The outward regulation part includes a second flat surface perpendicular to the second direction, and a second tilted surface tilted with respect to the second surface or a second perpendicular surface perpendicular to the second surface. When the optical connector and the other optical connector are engaged with each other, a part of the inward regulation part makes contact with an outward regulation part of the other optical connector, and a part of the outward regulation part makes contact with an inward regulation part of the other optical connector.

[5] The optical connector according to any one of [1] to [4], further including a third inward regulation surface that is a flat surface disposed to face the reference straight line in a second direction perpendicular to the first direction as viewed along the optical path between the optical connector and the other optical connector, the third inward regulation surface being configured to suppress positional displacement with respect to the other optical connector in the second direction. The third inward regulation surface makes contact with a third inward regulation surface of the other optical connector.

[6] The optical connector according to [3], in which the second inward regulation surface and the second outward regulation surface are tilted with respect to the second direction perpendicular to the first direction as viewed along the optical path between the optical connector and the other optical connector.

[7] The optical connector according to any one of [1] to [6], in which the first inward regulation surface and the first outward regulation surface are tilted with respect to the second direction in a plane including the first direction, and the second direction perpendicular to the first direction as viewed along the optical path between the optical connector and the other optical connector.

[8] The optical connector according to any one of [1] to [7], in which the holding part includes: a holding recess including a notch part at both end portions in the first direction, and configured to dispose the plurality of optical transmission members; and a lid configured be disposed to cover the holding recess where the plurality of optical transmission members is disposed.

[9] The optical connector according to any one of [1] to [8], further including a contact surface disposed to face the other optical connector and configured to make contact with the other optical connector when the optical connector and the other optical connector are engaged with each other. The protrusion and the recess are disposed at the contact surface. The contact surface is a tilted surface that is tilted toward the first optical part side in a direction from the protrusion toward the recess as viewed along the first direction.

[10] An optical connector module, including: a plurality of optical transmission members; and the optical connector according to any one of to any one of [1] to [9].

[11] The optical connector module according to [10], in which an end surface of the optical transmission member is tilted with respect to a plane orthogonal to an extending direction of the optical transmission member. The second optical part includes a plurality of projecting surfaces disposed in parallel in the first direction and configured to emit toward the other optical connector light entered from the first optical part or allow incidence of light from the other optical connector, and a central axis of one projecting surface of the plurality of projecting surfaces, and a virtual line do not intersect the reference straight line, the virtual line being a line passing through a center of an end surface of one optical transmission member corresponding to the one projecting surface among the plurality of optical transmission members, and extending in a third direction perpendicular the first direction and a second direction.

Advantageous Effects of Invention

According to the present invention, optical connectors with the same shape can be coupled without increasing the number of components.

DESCRIPTION OF EMBODIMENTS

Optical connectors and optical connector modules according to embodiments of the present invention are elaborated below with reference to the accompanying drawings.

Embodiment 1

Configuration of Optical Connector Module

Figure 1:
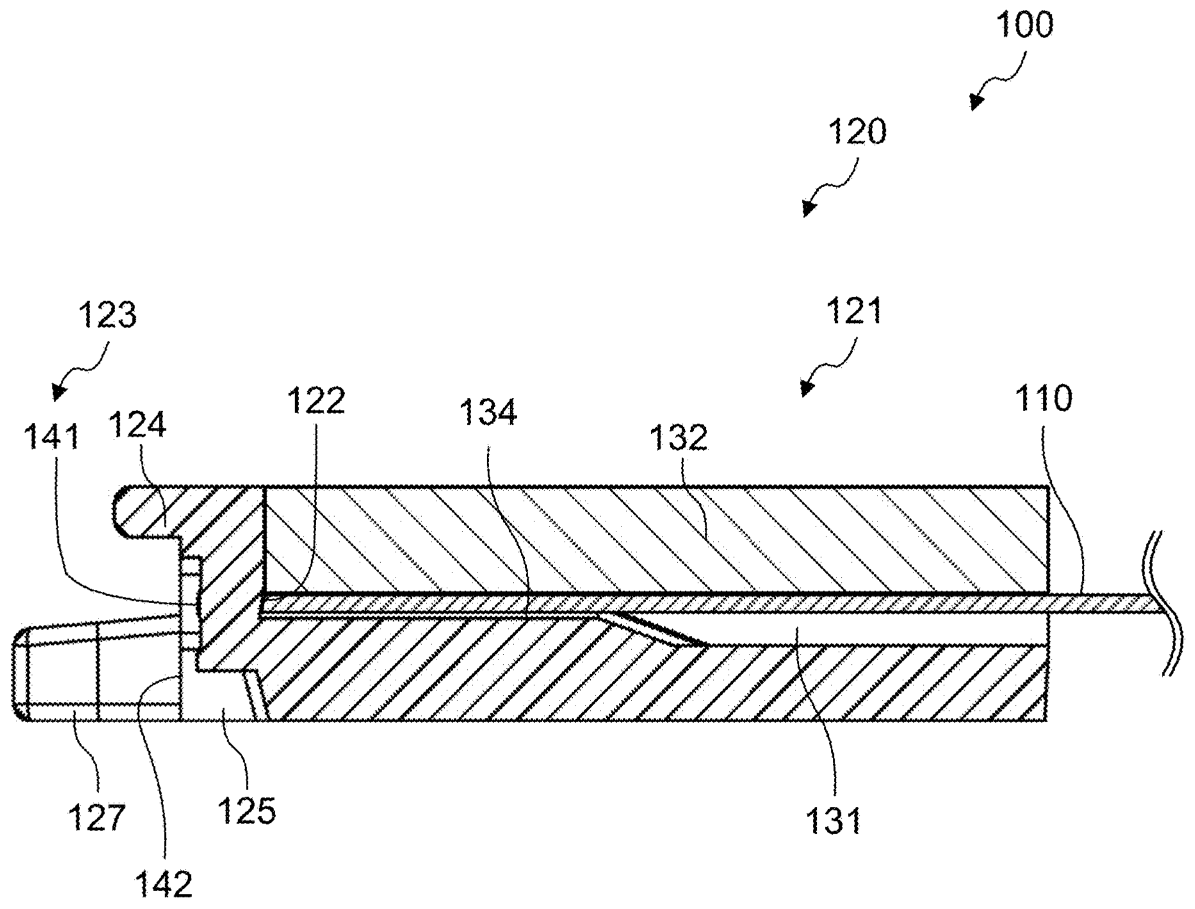
FIG. 1 is a sectional view illustrating a configuration of an optical connector module according to Embodiment 1 of the present invention.

FIG. 1 is a sectional view illustrating a configuration of optical connector module 100 according to Embodiment 1 of the present invention.

As illustrated in FIG. 1, optical connector module 100 according to Embodiment 1 includes optical transmission member 110, and optical connector 120. Optical connector module 100 is used with a plurality of optical transmission members 110 held by optical connector 120. Optical connector module 100 is used as one pair (a pair). The plurality of optical transmission members 110 are optically coupled to each other by connecting the same optical connectors 120 to each other in the state where the other optical connector module 100 holding the other plurality of optical transmission members 110 is upside-down with respect to one optical connector module 100 holding the plurality of optical transmission members 110. Note that optical connector module 100 may be used together with a housing, a spring clamp structure part and the like (omitted in the drawing).

The type of optical transmission member 110 is not limited. Examples of the type of optical transmission member 110 include optical fibers and optical waveguides. In the present embodiment, optical transmission member 110 is an optical fiber. In addition, the optical fiber may be of a single mode type, or a multiple mode type. Preferably, the end surface of optical transmission member 110 is tilted with respect to a plane orthogonal to the extending direction of optical transmission member 110. In the present embodiment, the inclination angle to the plane is 5 degrees. The number of optical transmission members 110 is not limited as long as a plurality of optical transmission members 110 is provided. In the present embodiment, 16 optical transmission members 110 are provided. The end portion of optical transmission member 110 is fixed to optical connector 120. Note that in the case where an optical waveguide is used as optical transmission member 110, the structure of the holding part in optical connector 120 described later differs (Embodiment 11).

Configuration of Optical Connector

Figure 2:
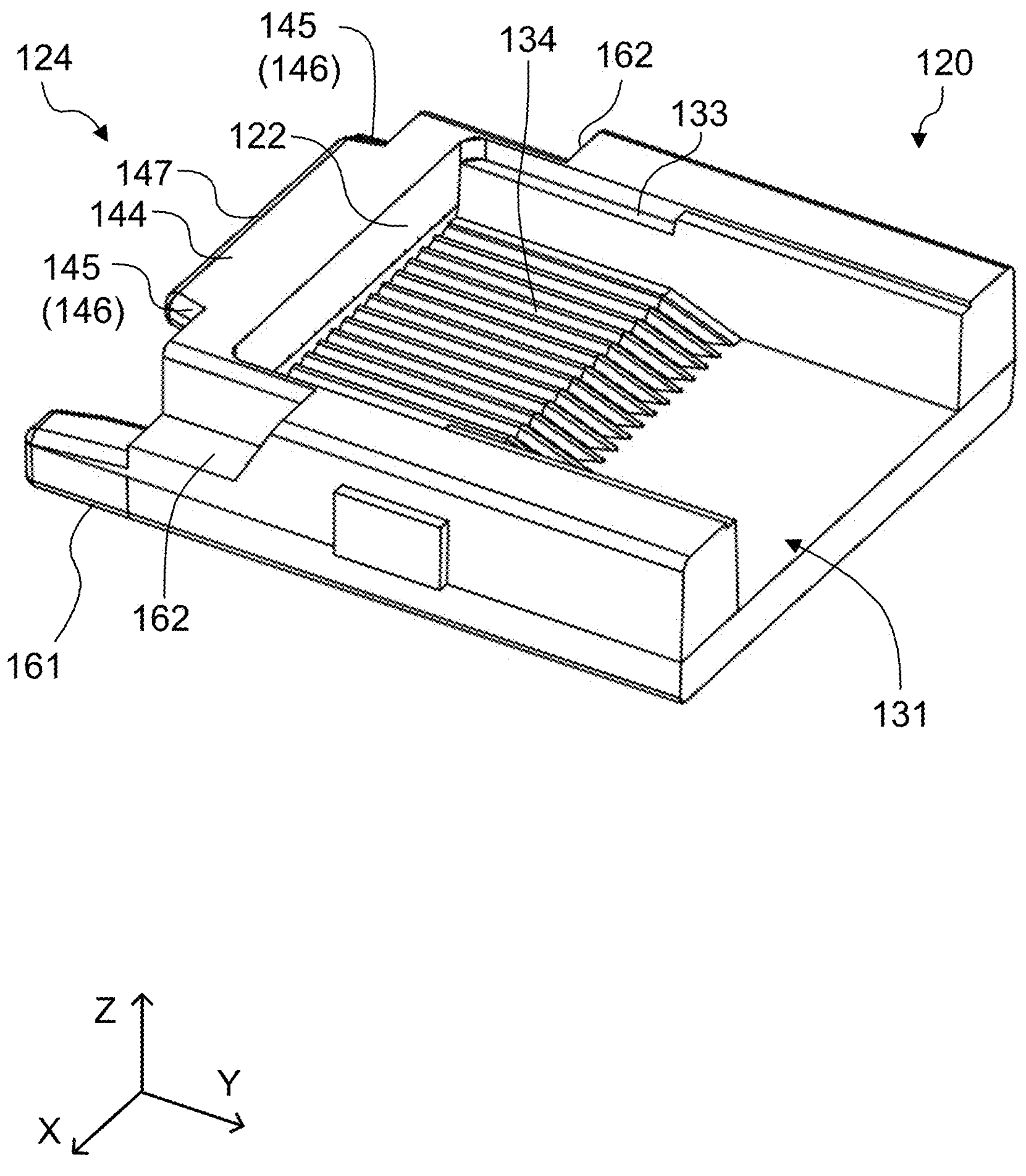
FIG. 2 is a perspective view as viewed from the upper side of an optical connector from which a lid is detached according to Embodiment 1 of the present invention.
Figure 3A:
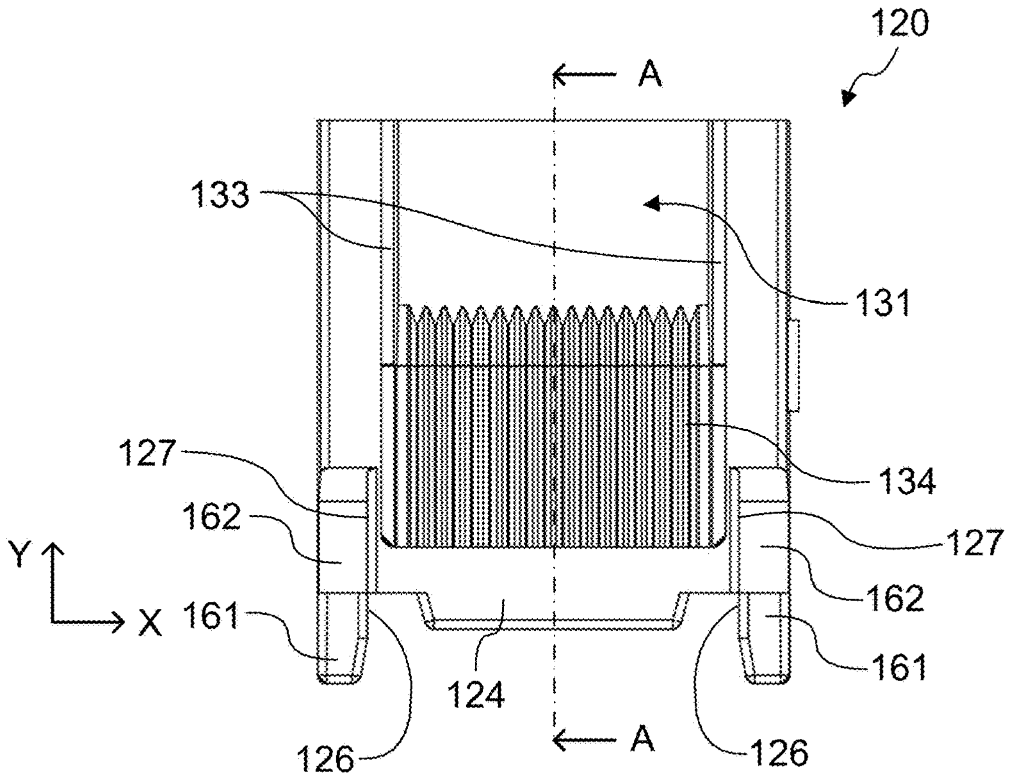
FIGS. 3A and 3B are diagrams illustrating a configuration of the optical connector from which the lid is detached according to Embodiment 1 of the present invention.
Figure 3B:
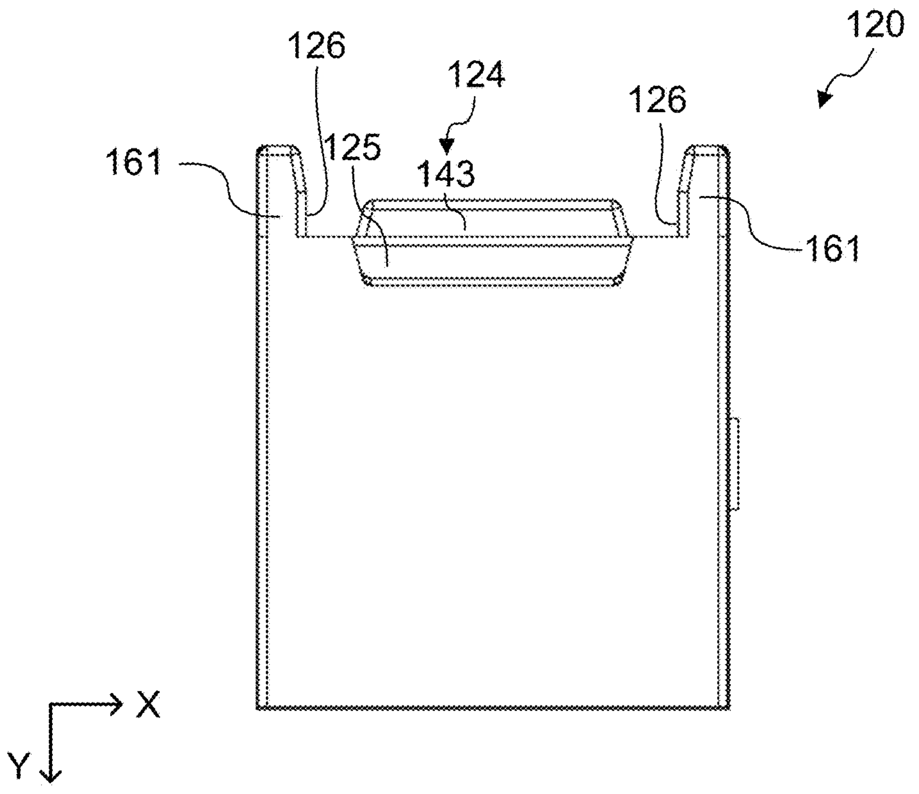
Figure 4A:
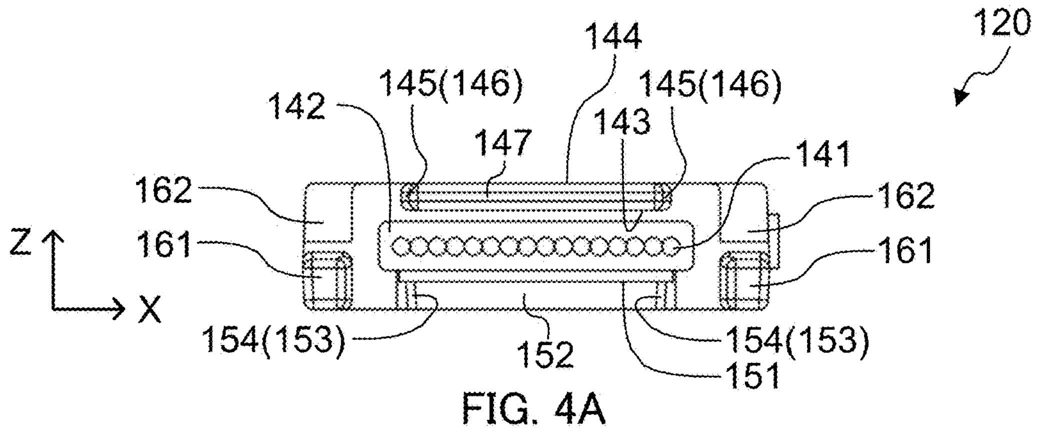
FIGS. 4A to 4D are other diagrams illustrating a configuration of the optical connector from which the lid is detached according to Embodiment 1 of the present invention.
Figure 4B:
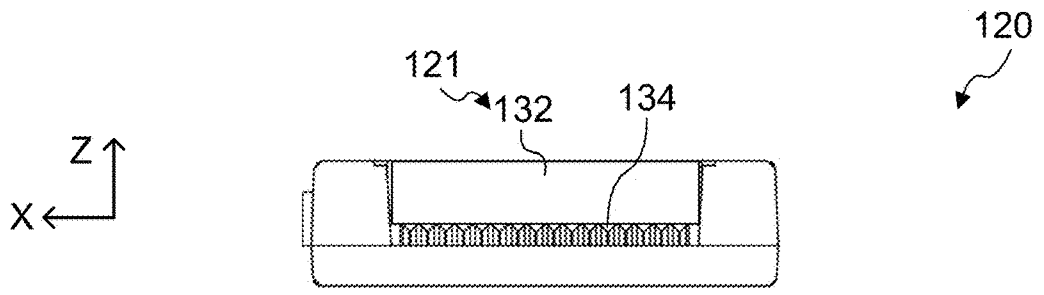
Figure 4C:
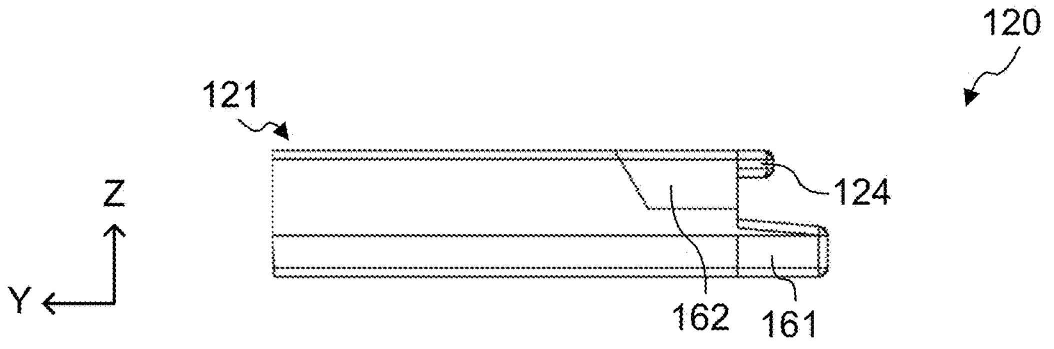
Figure 4D:
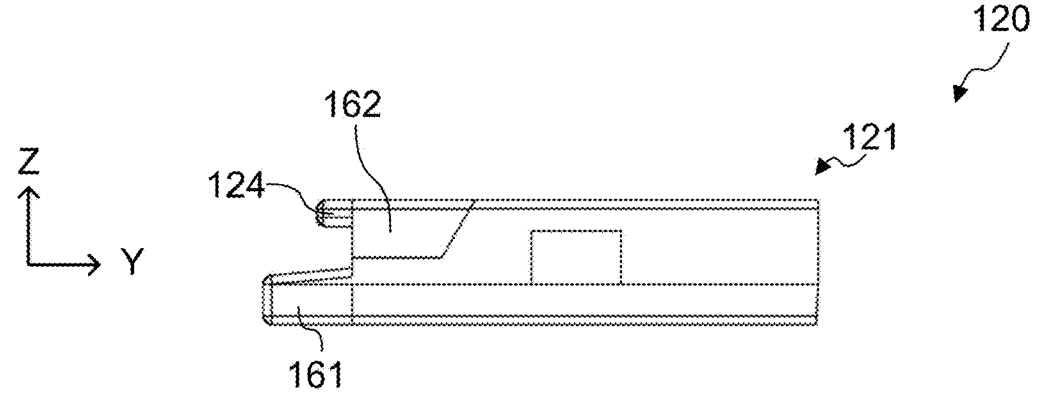
Figure 5:
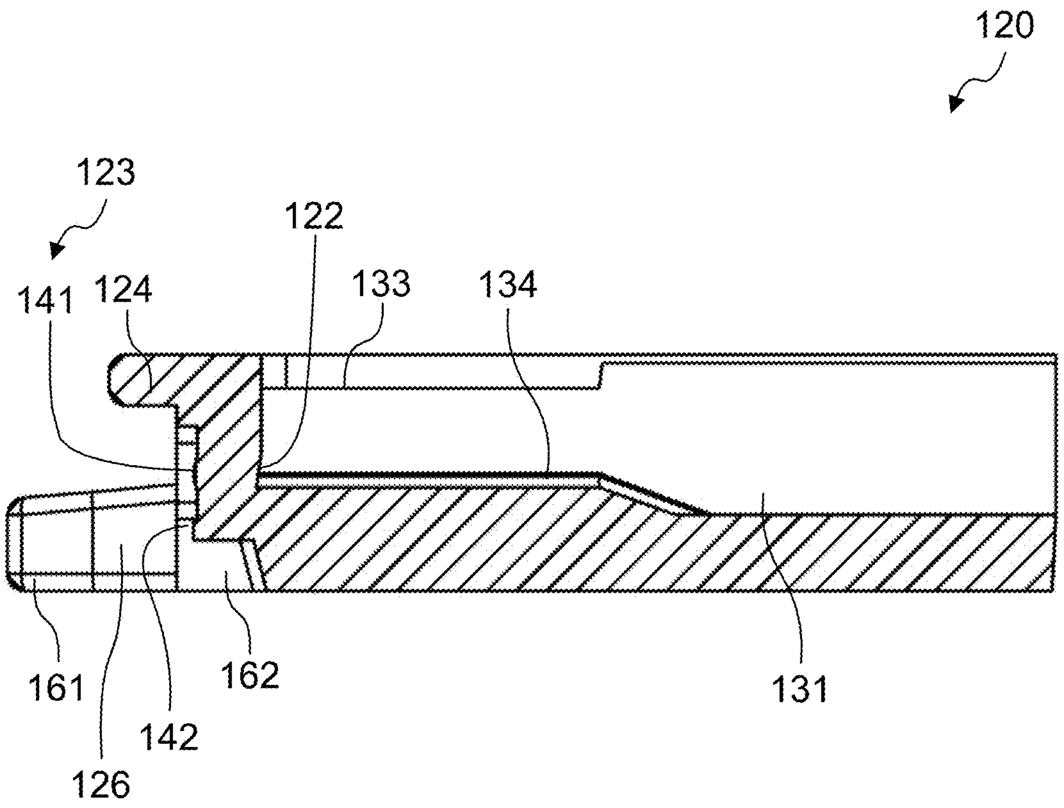
FIG. 5 is a sectional view of the optical connector from which the lid is detached according to Embodiment 1 of the present invention.

FIG. 2 is a perspective view as viewed from the upper side of optical connector 120 from which lid 132 is detached according to Embodiment 1 of the present invention. FIG. 3A is a plan view of optical connector 120 from which lid 132 is detached according to Embodiment 1 of the present invention, and FIG. 3B is a bottom view. FIG. 4A is a front view of optical connector 120 according to Embodiment 1 of the present invention, FIG. 4B is a rear view, FIG. 4C is a left side view, and FIG. 4D is a right side view. FIG. 5 is a sectional view taken along line A-A of FIG. 3A.

Note that in the following description, the direction in which optical transmission members 110 are disposed in parallel (the direction in which projecting surfaces 141 of second optical part 123 are arranged) is referred to as “first direction” or “X direction”, the direction orthogonal to the X direction in front view of second optical part 123 (as viewed in the direction along the optical path between two optical connectors 120) is referred to as “second direction”

or "Z direction", and the direction orthogonal to the X direction and the Z direction is referred to as "third direction" or "Y direction".

As illustrated in FIGS. 2 to 5, optical connector 120 is a member with a substantially cuboid shape. Optical connector 120 includes holding part 121, first optical part 122, second optical part 123, protrusion 124, recess 125, first inward regulation surface 126, and first outward regulation surface 127.

Note that in the present invention, the fitting shape is a shape required for achieving the fitting. The fitting shape is provided at a contact portion of the engagement of the optical connector and the other optical connector, for example. For example, in the present embodiment, first optical part 122, second optical part 123, protrusion 124 and recess 125, first inward regulation surface 126, and first outward regulation surface 127 have fitting shapes.

Optical connector 120 is formed of a material that is optically transparent to light with wavelengths used for optical communications. The examples of the material of optical connector 120 include polyetherimide (PEI) such as ULTEM (registered trademark) and transparent resins such as cyclic olefin resins. In addition, optical connector 120 may be manufactured by injection molding, for example.

Holding part 121 holds the end portions of the plurality of optical transmission members 110. The configuration of holding part 121 is not limited as long as the end portions of the plurality of optical transmission members 110 can be held at an appropriate position. Holding part 121 may be configured to hold the end portion of optical transmission member 110 by pushing it, or configured to hold the end portion of optical transmission member 110 with the end portion inserted thereto (see Embodiment 2). In the present embodiment, holding part 121 holds the end portion of optical transmission member 110 by pushing it. In the present embodiment, holding part 121 includes holding recess 131, and lid 132 (see FIG. 4B). Holding recess 131 is open at the top surface and the back surface of optical connector 120. The plan shape of holding recess 131 is not limited as long as the end portions of the plurality of optical transmission members 110 can be disposed at an appropriate position. In the present embodiment, the plan shape of holding recess 131 is a rectangular shape. Notch part 133 for disposing lid 132 at a predetermined position is disposed at both end portions of holding recess 131 in the first direction (the X direction). In this manner, deviation of installed lid 132 in the third direction (the Y direction) can be prevented.

A plurality of grooves 134 defined in an irregular shape is disposed at the bottom surface of holding recess 131. The irregular shape may be composed of a plurality of ridges, or a plurality of valleys. In the present embodiment, a plurality of grooves 134 defined by a plurality of valleys is disposed at the bottom surface of holding recess 131. In the present embodiment, groove 134 is configured to hold each of a plurality of optical transmission members with peeled tip-end coating of the ribbon-shaped optical transmission member. The arrangement of the plurality of grooves 134 is not limited as long as the end portions of the plurality of optical transmission members 110 can be appropriately positioned. The plurality of grooves 134 may be disposed in the entire bottom surface of holding recess 131, or in a part of the bottom surface of holding recess 131. In the present embodiment, groove 134 is disposed in a part of the region on first optical part 122 side in the bottom surface of holding recess 131. The number of grooves 134 needs only to be equal to or greater than the number of optical transmission members 110 installed. Specifically, in the present embodiment, 16 grooves 134 are provided. The cross-sectional shape of groove 134 in the XZ cross-section is not limited. Groove 134 may be a V-shaped groove, or a U-shaped groove. In the present embodiment, groove 134 is a V-shaped groove. Preferably, the depth of groove 134 is a depth with which the upper end portion of optical transmission member 110 is located above the upper end portion of groove 134 (ridge) when optical transmission member 110 is disposed in groove 134. In this manner, drop off of optical transmission member 110 can be prevented by pressing optical transmission member 110 against groove 134 by means of lid 132 described later.

Groove 134 may be disposed parallel to the rear surface of optical connector 120, or may be disposed such that it comes closer to the rear surface of optical connector 120 with decreasing distance to first optical part 122. In the present embodiment, the valley of groove 134 is disposed parallel to the rear surface of optical connector 120.

Lid 132 presses the plurality of optical transmission members 110 against groove 134. In other words, lid 132 presses the plurality of optical transmission members 110 against the optical connector body including holding recess 131, first optical part 122, second optical part 123, a pair of protrusion 124 and recess 125, first inward regulation surface 126, and a pair of first outward regulation surfaces 127. Lid 132 is disposed to cover holding recess 131 where the end portion of optical transmission member 110 is disposed. The configuration of lid 132 is not limited as long as the above-mentioned function can be ensured. The surface of lid 132 on the optical transmission member side may be a flat surface or may be provided with grooves corresponding to the plurality of optical transmission members. In the present embodiment, lid 132 includes lid body 135, and protrusion part 136. Lid body 135 covers holding recess 131 from the front surface side of optical connector 120. Protrusion part 136 is disposed at both end portions of lid body 135 in the first direction (the X direction), and protruded to the rear side. The shape of protrusion part 136 is complementary to the shape of notch part 133 disposed in holding recess 131.

In the present embodiment, the end portions of the plurality of optical transmission members 110 are disposed on the plurality of grooves 134, and the end surfaces of the plurality of optical transmission members 110 are brought into contact with first optical part 122. In this state, adhesive is applied between the end surface of optical transmission member 110 and first optical part 122 with no air layer interposed therebetween. Before the adhesive is cured, the end portions of the plurality of optical transmission members 110 are pressed with lid 132 against the bottom surface (connector body) of holding recess 131. By curing the adhesive in this state, optical transmission member 110 can be fixed to optical connector 120. Note that the end surfaces of the plurality of optical transmission members 110 may not be brought into contact with the first optical part.

First optical part 122 is disposed to face the end surfaces of the plurality of optical transmission members 110 held by holding part 121. First optical part 122 allows incidence of light emitted from the plurality of optical transmission members 110, or emits light toward the end surfaces of the plurality of optical transmission members 110. The shape of first optical part 122 is not limited as long as the above-mentioned function can be ensured. First optical part 122 may include one or a plurality of projecting surfaces, or may be a flat surface. In the present embodiment, first optical part 122 is a flat surface. First optical part 122 is disposed in a part of the inner surface of holding recess 131.

The surface of first optical part 122 that makes contact with the end surface of optical transmission member 110 may be tilted toward second optical part 123 with decreasing distance to the rear surface of optical connector 120, or may be tilted away from second optical part 123 with decreasing distance to the rear surface of optical connector 120. It may be perpendicular to the rear surface of optical connector 120. In the present embodiment, the surface of first optical part 122 that makes contact with the end surface of optical transmission member 110 is tilted toward second optical part 123 with decreasing distance to the rear surface of optical connector 120 (see FIG. 5). Preferably, the inclination angle of first optical part 122 is the same as the inclination angle of the end surface of optical transmission member 110. With respect to the Z direction set as 0 degree, the inclination angle of first optical part 122 is within a range of 3 to 8 degrees, preferably 5 to 8 degrees. In the present embodiment, with respect to the Z direction set as 0 degree, the inclination angle of first optical part 122 is 5 degrees.

Second optical part 123 emits, to the outside, light entered from first optical part 122, or allows incidence of light from the other optical connector 120. The shape of second optical part 123 is not limited as long as the above-mentioned function can be ensured. Second optical part 123 may include a plurality of projecting surfaces, or may be a flat surface. In the present embodiment, second optical part 123 includes a plurality of projecting surfaces 141 that can focus light emitted from the optical transmission members. Projecting surfaces 141, which are disposed in parallel in the first direction (the X direction), emit light entered from first optical part 122 toward the other optical connector 120, or allow incidence of light from the other optical connector 120. For the other optical connector to be engaged with the optical connector, the fitting shapes are the same, while the shape of second optical part 123 is not limited. In the case of a projecting surface, it is preferable that the shapes be the same. Second optical part 123 is disposed at the front surface of optical connector 120. The plan shape of projecting surface 141 is not limited. The plan shape of projecting surface 141 may be a circular shape, or a rectangular shape. In the present embodiment, the plan shape of projecting surface 141 has a circular shape. In addition, the number of projecting surfaces 141 is the same as the number of optical transmission members 110. Specifically, in the present embodiment, 16 projecting surfaces 141 are provided.

In front view of second optical part 123 (as viewed along an optical path between optical connector 120 and the other optical connector 120), a pair of protrusions 124 and a pair of recesses 125 are disposed at line-symmetric positions with respect to the reference straight line parallel to the first direction (the X direction). In the present embodiment, in front view of second optical part 123 (as viewed along an optical path between optical connector 120 and the other optical connector 120), protrusion 124 and recess 125 are disposed with second optical part 123 therebetween in the second direction (the Z direction) orthogonal to the first direction (the X direction). In the present embodiment, at the front surface of optical connector 120, contact surface 142 where second optical part 123, protrusion 124 and recess 125 are not disposed is a flat surface. Contact surface 142 makes contact with contact surface 142 of the other optical connector 120. Contact surface 142 may be disposed perpendicularly to the rear surface of optical connector 120, or may be tilted with respect to the rear surface of optical connector 120. In the present embodiment, contact surface 142 is disposed perpendicularly to the rear surface of optical connector 120.

Protrusion 124 has a shape that can engage with recess 125 of the other optical connector 120. In the present embodiment, protrusion 124 is disposed on the front side (upper side) at the front surface of optical connector 120. The shape of protrusion 124 is not limited as long as the positional displacement of optical connector 120 in the second direction (the Z direction) can be suppressed. In the present embodiment, the shape of protrusion 124 is a ridge that is wide in the first direction (the X direction). Preferably, protrusion 124 includes second outward regulation surface 143. Note that in the case where recess 125 includes second outward regulation surface 143, it is preferable that protrusion 124 include second inward regulation surface 151. In the present embodiment, protrusion 124 includes second outward regulation surface 143, first surface 144 disposed on the side opposite to second outward regulation surface 143, second surface 145 and third surface 146 disposed facing each other, and top surface 147.

Second outward regulation surface 143 includes a flat surface disposed to face outward in the second direction (the Z direction). With a flat surface, rather than a curved surface, second outward regulation surface 143 can suppress the positional displacement in the second direction with respect to the other optical connector 120. One or a plurality of second outward regulation surfaces 143 may be provided. In the present embodiment, one second outward regulation surface 143 is provided. Second outward regulation surface 143 and first surface 144 are disposed along the first direction (the X direction), and second surface 145 and third surface 146 are disposed along the third direction (the Y direction). In addition, in the present embodiment, first surface 144 is disposed such that it is flush with the front surface of (top surface) optical connector 120. Second surface 145 and third surface 146 may be disposed in contact with second inner surface 153 and third inner surface 154 of recess 125 in the other optical connector 120. Note that in the present embodiment, second outward regulation surface 143 and first surface 144 are flat surfaces, and second surface 145, third surface 146 and top surface 147 are curved surfaces.

Recess 125 has a shape that can engage with protrusion 124 of the other optical connector 120. In the present embodiment, recess 125 is disposed on the rear side (lower side) at the front surface of optical connector 120. The shape of recess 125 is not limited as long as the positional displacement of optical connector 120 in the second direction can be suppressed. In the present embodiment, recess 125 is open at the front surface and bottom surface of optical connector 120. Preferably, recess 125 includes second inward regulation surface 151. Note that in the case where protrusion 124 includes second inward regulation surface 151, it is preferable that recess 125 include second outward regulation surface 143. In the present embodiment, recess 125 includes second inward regulation surface 151 on the front side, first inner surface 152 on the back side, and second inner surface 153 and third inner surface 154 on the lateral side.

Second inward regulation surface 151 includes a flat surface disposed to face inward in the second direction (the Z direction) perpendicular to the first direction (the X direction) as viewed along the optical path between optical connector 120 and the other optical connector 120. With a flat surface rather than a curved surface in this manner, second inward regulation surface 151 can suppress the positional displacement in the second direction with respect to the other optical connector 120. Second inward regulation surface 151 is disposed in contact with second outward regulation surface 143 of the other optical connector 120. Second inner surface 153 and third inner surface 154 may be disposed in contact with second surface 145 and third surface 146 of protrusion 124 in the other optical connector 120.

Note that in the present embodiment, protrusion 124 is disposed on the front surface side of second optical part 123, and recess 125 is disposed on the rear surface side of second optical part 123, but they may be disposed in the opposite manner. Specifically, recess 125 may be disposed on the front surface side of second optical part 123, and protrusion 124 may be disposed on the rear surface side of second optical part 123. In addition, protrusion 124 and recess 125 may have complementary shapes. In addition, protrusion 124 and recess 125 may be disposed in a line-symmetric manner with respect to a virtual line passing through the center in the front-to-back direction and extending in the first direction (the X direction) in front view of optical connector 120.

First inward regulation surface 126 is a flat surface disposed to face inward along the first direction (the X direction). In the present invention, with such a flat surface rather than a curved surface, first inward regulation surface 126 can suppress the positional displacement in the first direction (the X direction) with respect to the other optical connector 120. The number of first inward regulation surface 126 is not limited. In the present embodiment, two (a pair of) first inward regulation surfaces 126 are provided. In addition, in the present embodiment, first inward regulation surface 126 is a part of the outer surface of engaging protrusion 161 disposed with second optical part 123 therebetween in the first direction (the X direction).

Engaging protrusion 161 has a rectangular columnar shape disposed at both end portions of optical connector 120 in the first direction (the X direction) and on the rear surface side, and protruded from the front surface of optical connector 120. In the present embodiment, in plan view of second optical part 123, the inner flat surface of engaging protrusion 161 is first inward regulation surface 126. In addition, in the present embodiment, in front view of optical connector 120, the pair of engaging protrusions 161 is disposed in a line-symmetric manner with respect to a virtual line passing through the center in the horizontal direction and extending in the second direction (the Y direction).

First outward regulation surface 127 includes a flat surface disposed to face outward along the first direction (the X direction). With a flat surface rather than a curved surface in this manner, first outward regulation surface 127 can suppress the positional displacement in the first direction (the X direction) with respect to the other optical connector 120. The number of first outward regulation surface 127 is not limited. In the present embodiment, two (a pair of) first outward regulation surfaces 127 are provided. In addition, in the present embodiment, first outward regulation surface 127 is a part of the inner surface of engaging recess 162 disposed with second optical part 123 therebetween in the first direction (the X direction).

Engaging recess 162 is a recess that is open at both end portions in the first direction (the X direction), and at corners on the front surface (top surface) side. In the present embodiment, in front view of second optical part 123, the inner flat surface of engaging recess 162 is first outward regulation surface 127. In addition, in the present embodiment, in front view of optical connector 120, the pair of engaging recesses 162 is disposed in a line-symmetric manner with respect to a virtual line passing through the center in the horizontal direction and extending in the second direction.

When optical connector 120 and the other optical connector 120 are engaged with each other, at least a pair of first inward regulation surfaces 126 makes contact with a pair of first outward regulation surfaces 127 of the other optical connector 120, and at least a pair of first outward regulation surfaces 127 makes contact with at least a pair of first inward regulation surfaces 126 of the other optical connector 120, thus regulating the position in the first direction (the X direction).

Usage of Optical Connector Module

Figure 6A:
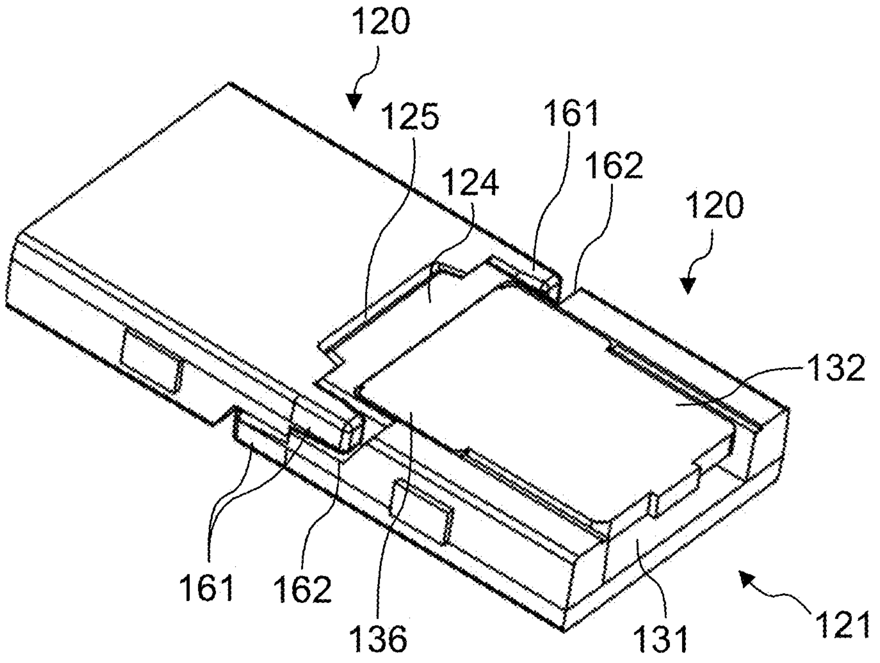
FIGS. 6A and 6B are perspective views for describing usage of the optical connector module according to Embodiment 1.
Figure 6B:
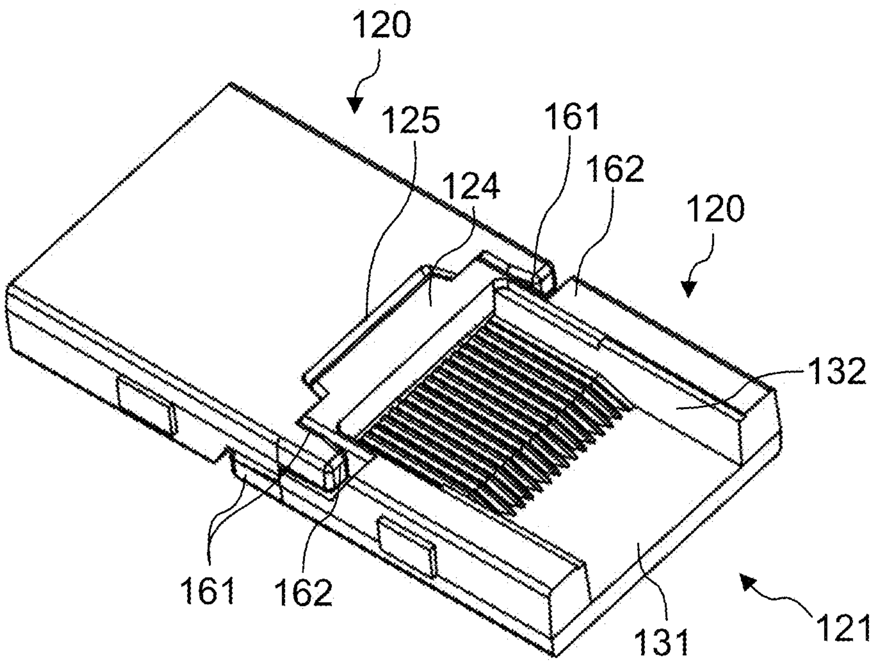

Now, usage of optical connector module 100 is described. FIGS. 6A and 6B are perspective views illustrating a state where optical connector modules 100 are connected to each other. Note that in FIGS. 6A and 6B, optical transmission member 110 is omitted.

As illustrated in FIGS. 6A and 6B, one optical connector module 100 is set with lid 132 facing the upper side, and the other optical connector module 100 is rotated (turned upside down) with a straight line along the first direction (the X direction) as a rotation axis. Further, protrusion 124 of one optical connector module 100 and recess 125 of the other optical connector module 100 are engaged with each other, and recess 125 of one optical connector module 100 and protrusion 124 of the other optical connector module 100 are engaged with each other. This regulates the positional displacement between one optical connector module 100 and the other optical connector module 100 in the second direction (the Z direction). In addition, engaging protrusion 161 of one optical connector module 100 and engaging recess 162 of the other optical connector module 100 are engaged with each other, and engaging recess 162 of one optical connector module 100 and engaging protrusion 161 of the other optical connector module 100 are engaged with each other. This regulates the positional displacement between one optical connector module 100 and the other optical connector module 100 in the first direction (the X direction). In this manner, the plurality of optical transmission members 110 connected to one optical connector module 100 and optical transmission member 110 connected to the other optical connector module 100 are optically connected.

Figure 7:
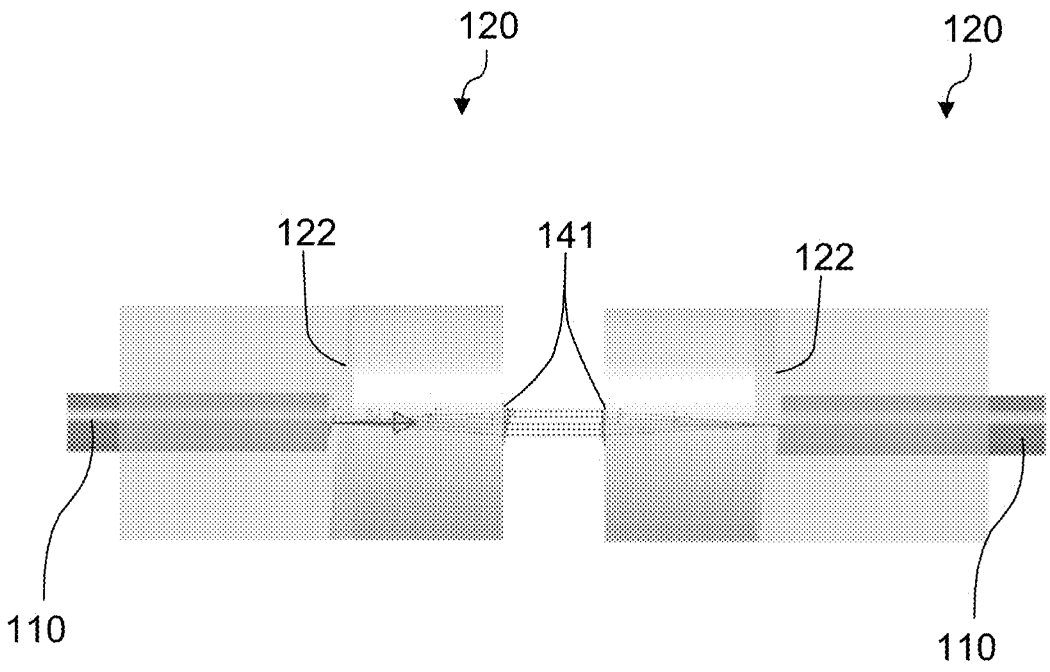
FIG. 7 is a diagram illustrating optical paths between one optical connector module and the other optical connector module.

Now, optical paths between one optical connector module 100 and the other optical connector module 100 are described. FIG. 7 is a diagram illustrating optical paths between one optical connector module 100 and the other optical connector module 100.

As illustrated in FIG. 7, in the state where optical connector module 100 and the other optical connector module 100 are connected to each other, one optical transmission member 110 and the other optical transmission member 110 are disposed on substantially the same straight line. Light emitted from one optical transmission member 110 substantially horizontally travels, and enters optical connector 120 of first optical part 122. Light having entered optical connector 120 is emitted from projecting surface 141 of second optical part 123. Light emitted from one optical connector module 100 is entered from projecting surface 141 of second optical part 123 of the other optical connector module 100. Light having entered optical connector 120 is emitted from first optical part 122 and enters optical transmission member 110 fixed to the other optical connector module 100. In this manner, when optical connector modules 100 according to the present embodiment are connected to each other, light emitted from optical transmission member 110 of one optical connector module 100 travels substantially straight, and reaches optical transmission member 110 of the other optical connector module 100. In the case where the end surface of optical transmission member 110 is tilted with respect to a plane orthogonal to the extending direction of optical transmission member 110, it is preferable that in one or the other optical connector module 100, the central axis of one projecting surface 141 of the plurality of projecting surfaces 141, and a virtual line passing through the center the end surface of one optical transmission member 110 corresponding to one projecting surface 141 of the plurality of optical transmission members 110 and extending along the third direction perpendicular to the first direction (the X direction) and the second direction be not intersect with the reference straight line. With the central axis of projecting surface 141, the central axis of optical transmission member 110, and the virtual line that do not coincide with each other, two optical connectors 120 with the same shape can be engaged with each other. If the central axis of optical transmission member 110 and the virtual line coincide with each other, light emitted from optical transmission member 110 of one optical connector module 100 cannot appropriately reach optical transmission member 110 of the other optical connector module 100.

Effects

With optical connector module 100 of the present embodiment, the positional displacement in the first direction (the X direction) can be suppressed with the pair of first inward regulation surfaces 126 and the pair of first outward regulation surfaces 127. In addition, with protrusion 124 and recess 125, two optical connectors 120 with the same shape can be engaged with each other without increasing the number of components.

Modifications

Next, an optical connector module according to a modification of Embodiment 1 is described. The optical connector module according to the modification is different from optical connector module 100 according to Embodiment 1 only in the configuration of optical connector 220. In view of this, optical connector 220 is mainly described below.

Figure 8:
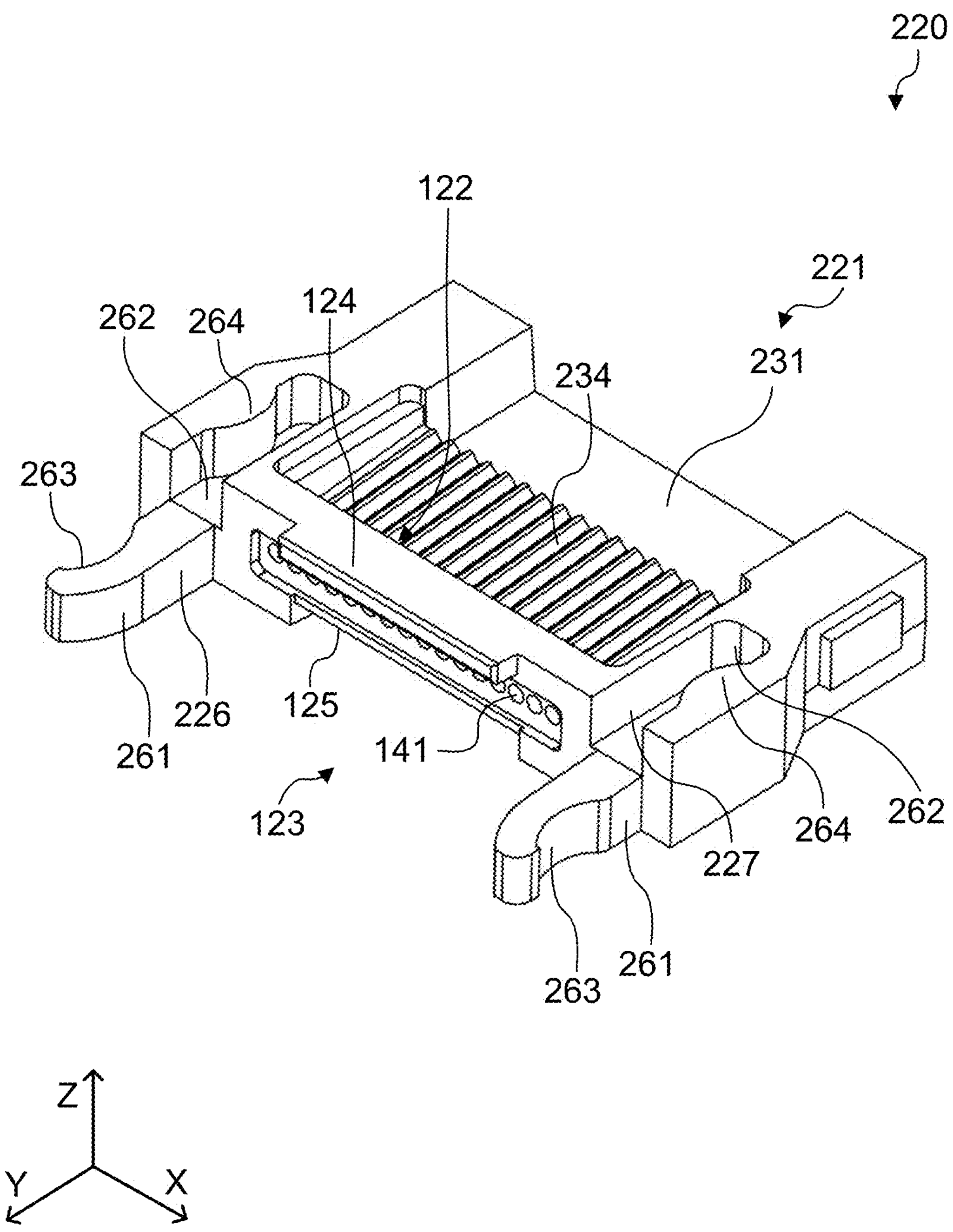
FIG. 8 is a perspective view as viewed from the upper side of an optical connector from which a lid is detached according to a modification of Embodiment 1 of the present invention.

FIG. 8 is a perspective view as viewed from the upper side of optical connector 220 from which lid 132 is detached according to a modification of Embodiment 1 of the present invention.

As illustrated in FIG. 8, optical connector 220 according to the modification includes holding part 221, first optical part 122, second optical part 123, protrusion 124, recess 125, first inward regulation surface 226, and first outward regulation surface 227.

Holding part 221 of the present modification includes holding recess 231 and lid 132. A plurality of grooves 234 is composed of a plurality of ridges at the bottom surface of holding recess 231. In the present modification, groove 234 is disposed in a part of the region on the first optical part 122 side in the bottom surface of holding recess 131. The number of grooves 234 is the same as the number of optical transmission member 110. Specifically, in the present embodiment, 16 grooves 234 are provided. In the present modification, groove 234 is a V-shaped groove. Preferably, the depth of groove 234 is a depth with which the upper end portion of optical transmission member 110 is located above the upper end portion of groove 234 (ridge) in the state where optical transmission member 110 is disposed in groove 234. In the present modification, groove 234 is disposed such that it comes closer to second optical part 123 with decreasing distance to the rear surface of optical connector 220.

First inward regulation surface 226 is a flat surface of a part of engaging protrusion 261, and first outward regulation surface 227 is a flat surface of a part of engaging recess 262. Engaging protrusion 261 and engaging recess 262 make up a latch structure. Engaging protrusion 261 includes first engaging portion 263 for engaging with second engaging portion 264 of engaging recess 262 of the other optical connector 220. Engaging recess 262 includes second engaging portion 264 for engaging with first engaging portion 263 of engaging protrusion 261 of the other optical connector 220. When first engaging portion 263 of engaging protrusion 261 and second engaging portion 264 of engaging recess 262 are engaged with each other, the positional displacement of optical connector 220 in the third direction (the Y direction) can be prevented.

Effects

The optical connector module according to the present modification has the same effects as those of Embodiment 1. In addition, with the latch structure, the optical connector module according to the present modification can easily couple and release optical connectors 220 with the same shape.

Embodiment 2

Next, the optical connector module according to Embodiment 2 is described. The optical connector module according to Embodiment 2 is different from optical connector module 100 according to Embodiment 1 only in the configuration of optical connector 320. In view of this, optical connector 320 is mainly described below.

Figure 9:
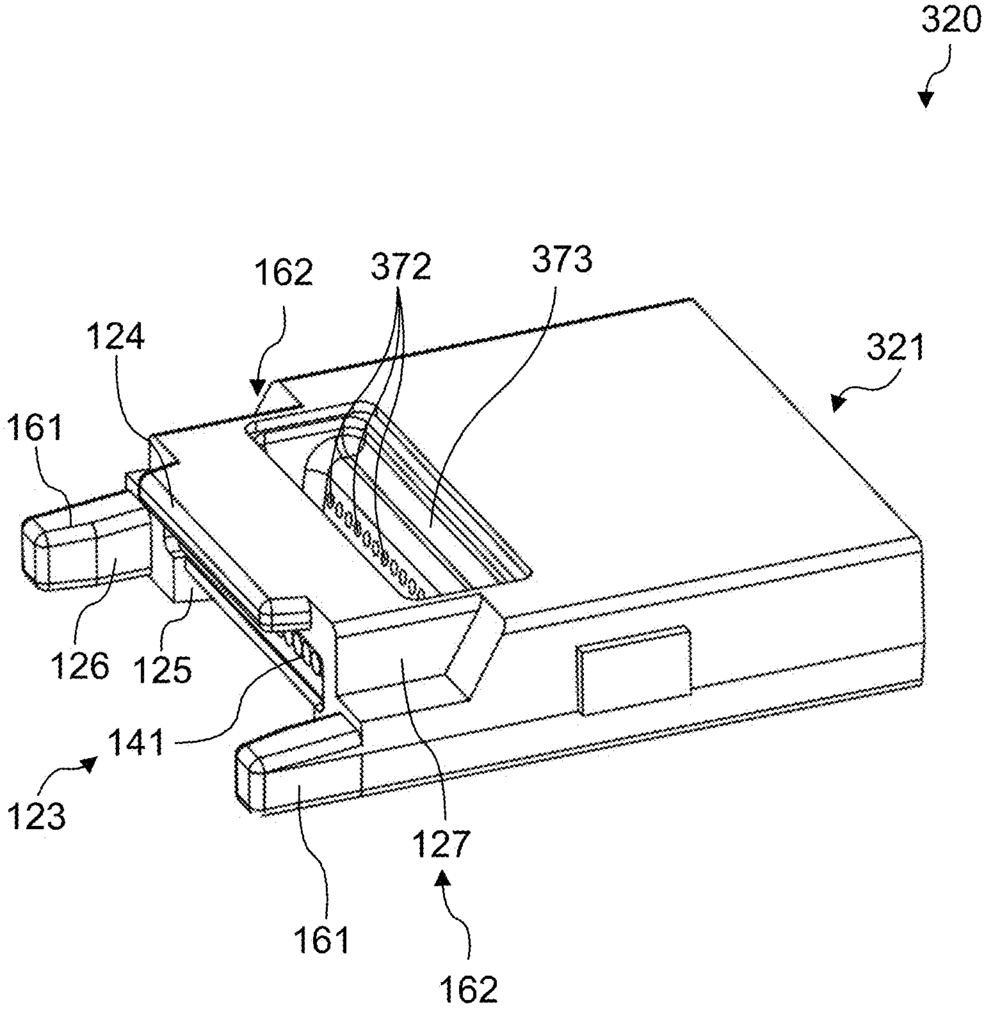
FIG. 9 is a perspective view as viewed from the upper side of an optical connector from which a lid is detached according to Embodiment 2 of the present invention.
Figure 10A:
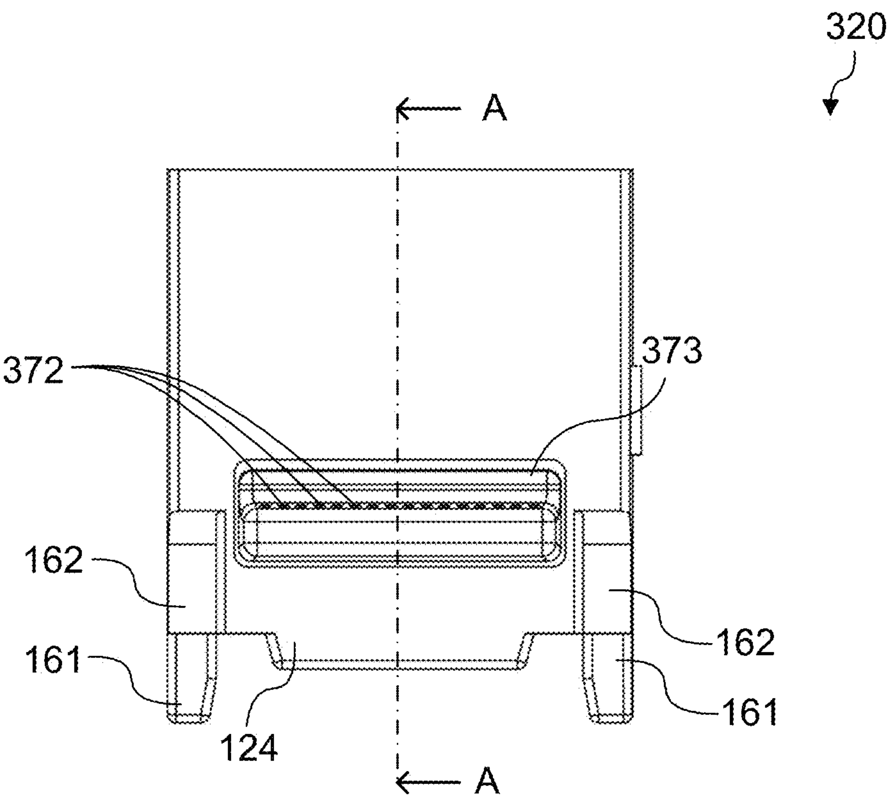
FIGS. 10A and 10B are diagrams illustrating a configuration of the optical connector from which the lid is detached according to Embodiment 2 of the present invention.
Figure 10B:
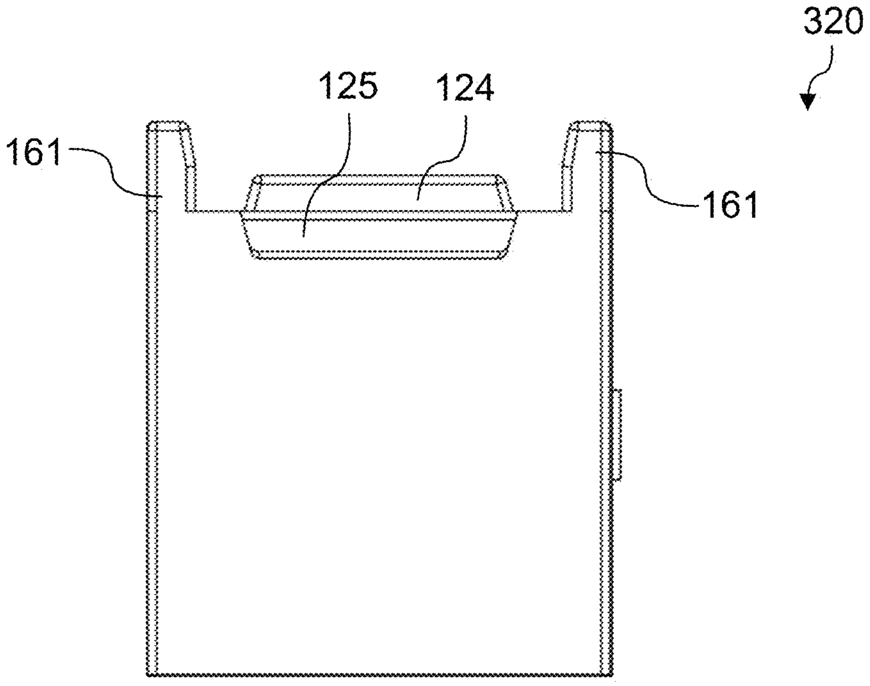
Figure 11A:
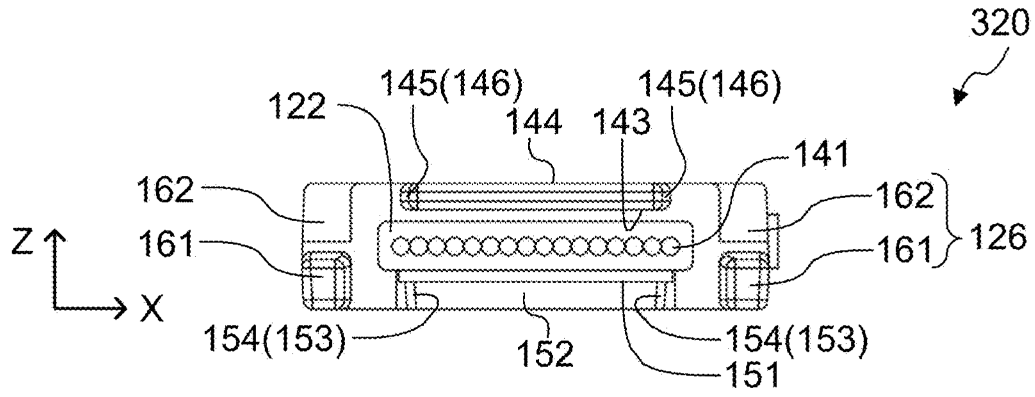
FIGS. 11A to 11D are other diagrams illustrating a configuration of the optical connector from which the lid is detached according to Embodiment 2 of the present invention.
Figure 11B:
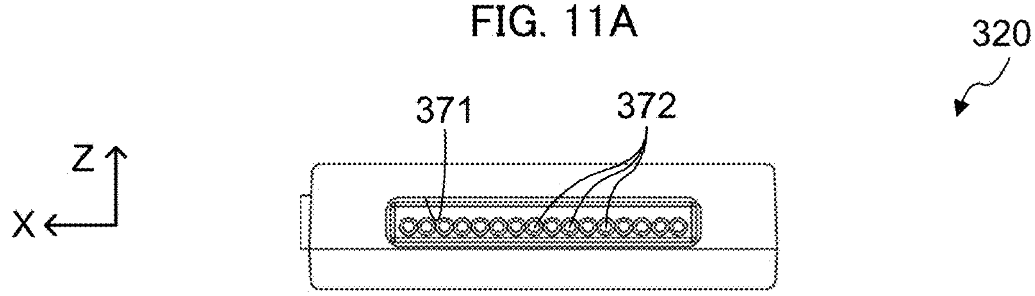
Figure 11C:
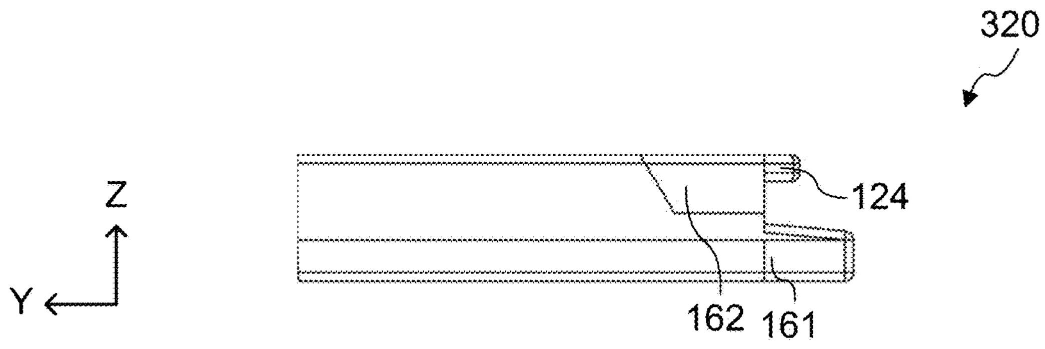
Figure 11D:
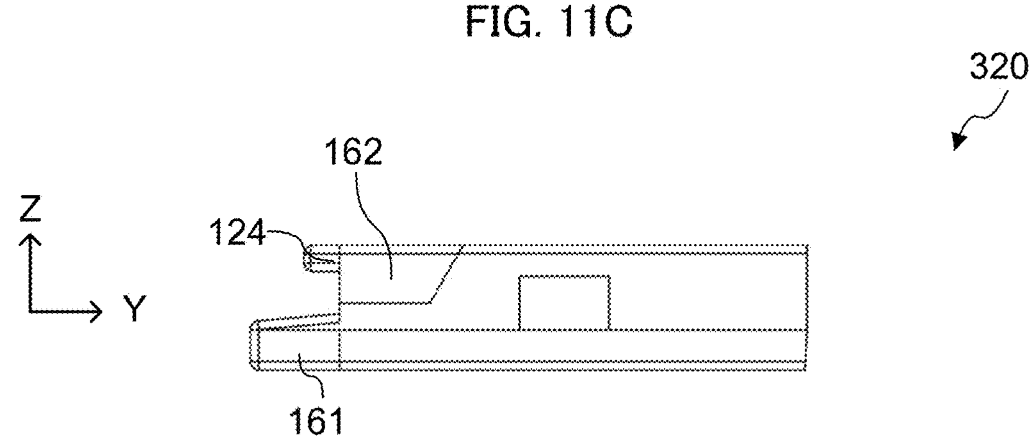
Figure 12:
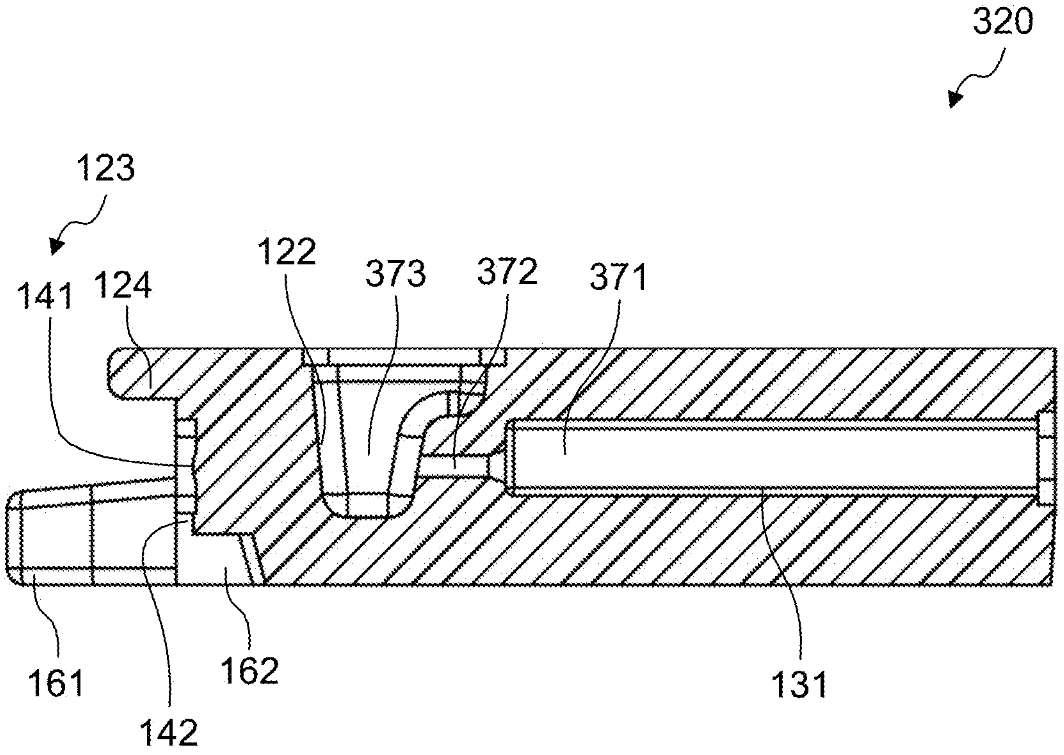
FIG. 12 is a sectional view of the optical connector according to Embodiment 2 of the present invention.

FIG. 9 is perspective view of optical connector 320 according to Embodiment 2 of the present invention. FIG. 10A is a plan view of optical connector 320 according to Embodiment 2 of the present invention, and FIG. 10B is a bottom view. FIG. 11A is a front view of optical connector 320 according to Embodiment 2 of the present invention, FIG. 11B is a rear view, FIG. 11C is a left side view, and FIG. 11D is a right side view. FIG. 12 is a sectional view taken along line A-A of FIG. 10A.

As illustrated in FIGS. 9 to 12, optical connector 320 according to Embodiment 2 includes holding part 321, first optical part 122, second optical part 123, protrusion 124, recess 125, first inward regulation surface 126, and first outward regulation surface 127.

Holding part 321 holds optical transmission member 110. In the present embodiment, holding part 321 includes insertion part 371, a plurality of through holes 372, and adhesive recess 373.

Insertion part 371 is for inserting the plurality of optical transmission members 110. Insertion part 371 is open at the back surface of optical connector 320, with a size that enables insertion of the plurality of optical transmission members 110. The plurality of through holes 372 is formed at the bottom portion of insertion part 371. Insertion part 371 sets optical transmission member 110 such that optical transmission member 110 is parallel to the rear surface of optical connector 320.

The plurality of through holes 372 sets the plurality of optical transmission members 110 at a predetermined interval. It suffices that through hole 372 has a size with which optical transmission member 110 can be inserted. One side of through hole 372 is open at insertion part 371, and the other side is open at adhesive recess 373.

Adhesive is injected to adhesive recess 373 to fix optical transmission member 110 to first optical part 122. A part of the inner surface of adhesive recess 373 is first optical part 122. In addition, through hole 372 is open at the inner surface facing first optical part 122.

In optical connector 320 according to Embodiment 2, the end portion of optical transmission member 110 is inserted from insertion part 371 and passed through hole 372, and the end surface of optical transmission member 110 is brought into contact with first optical part 122. Next, optical transmission member 110 is fixed to optical connector 320 by injecting adhesive from adhesive recess 373 and curing the adhesive. Finally, optical connectors 320 are coupled with each other with the other optical connector 320 turned upside-down with respect to one optical connector 320. In this manner, optical transmission members 110 are optically coupled with each other.

Effects

The optical connector module according to Embodiment 2 has the same effects as those of Embodiment 1. In addition, since the optical connector module according to Embodiment 2 does not include lid 132, the number of components can be further reduced, and the cost can be reduced.

Reference Example

Here, the optical connector module according to a reference example of Embodiment 1 is described. In the optical connector module according to the reference example, the shapes of one optical connector 120 and the other optical connector 520 are different from each other. The configuration of one optical connector 120 is the same as that of optical connector 120 according to Embodiment 1. Therefore, mainly the other optical connector 520 is described below. In addition, the other optical connector 520 of the reference example is different from optical connector 120 according to Embodiment 1 in that fixing part 528 for the substrate is provided. In view of this, the same components as those of optical connector 120 according to Embodiment 1 are denoted with the same reference numerals and the description thereof will be omitted.

Configuration of Optical Connector

Figure 13A:
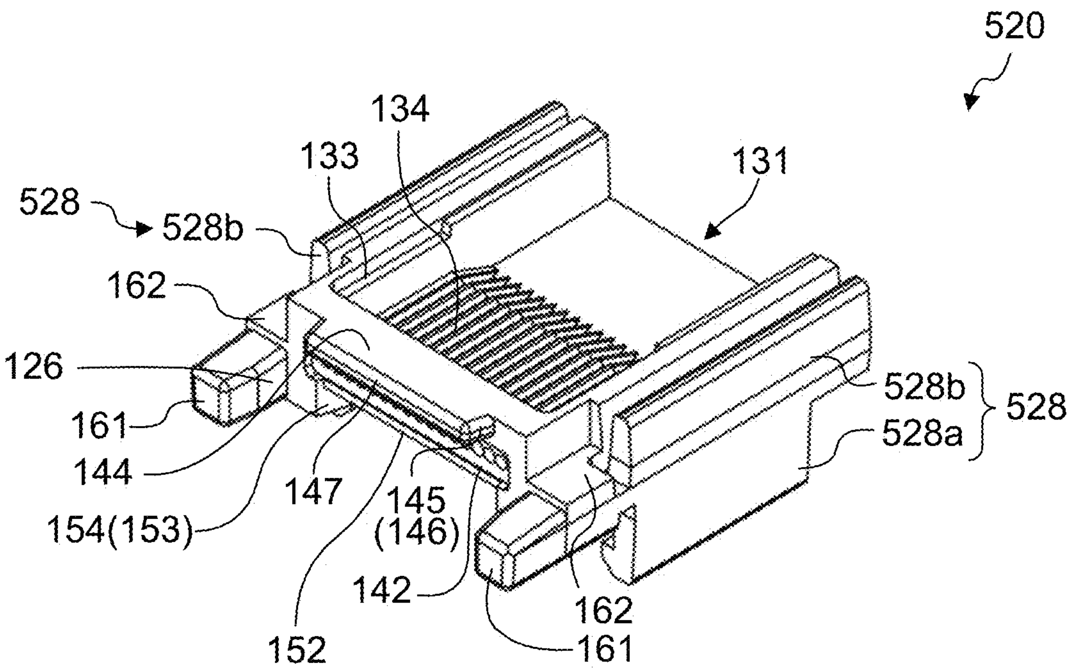
FIGS. 13A and 13B are diagrams illustrating a configuration of an optical connector from which a lid is detached according to a reference example of Embodiment 1.
Figure 13B:
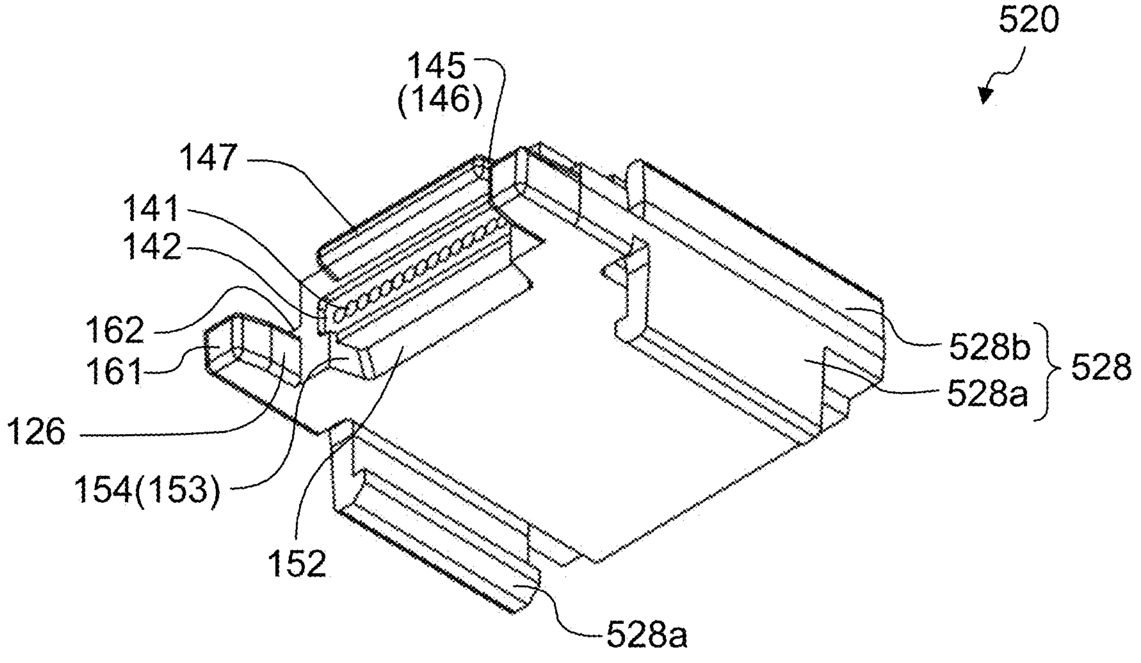
Figure 14A:
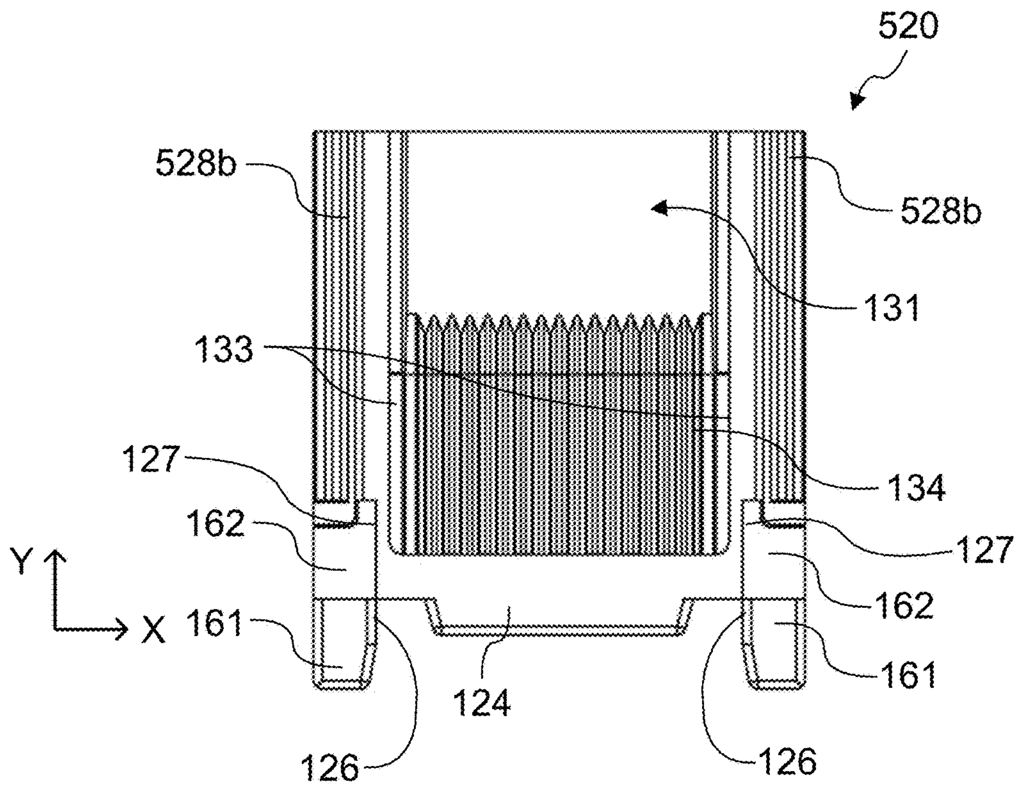
FIGS. 14A and 14B are other diagrams illustrating a configuration of the optical connector from which the lid is detached according to the reference example of Embodiment 1.
Figure 14B:
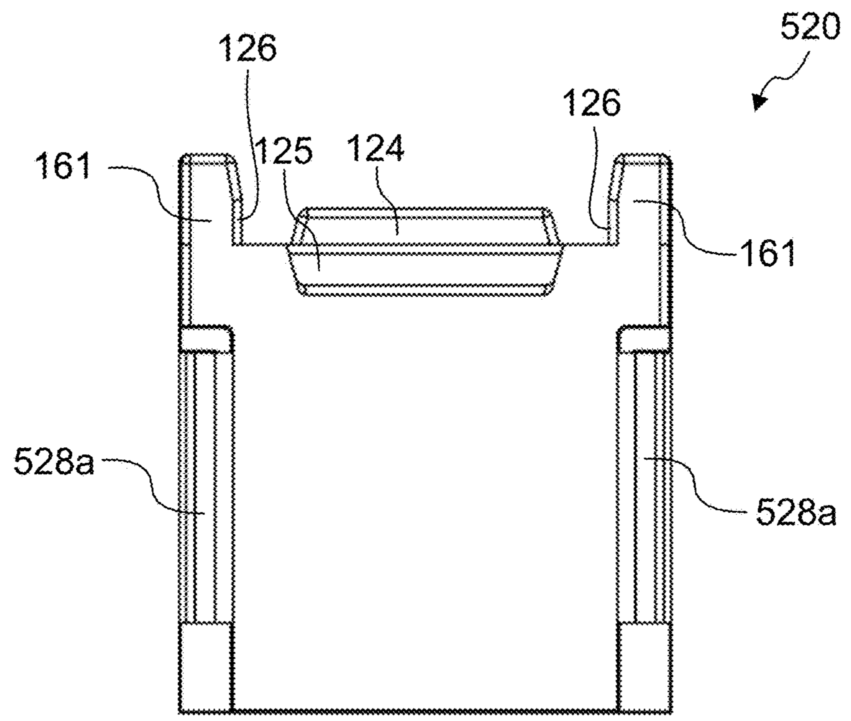
Figure 15A:
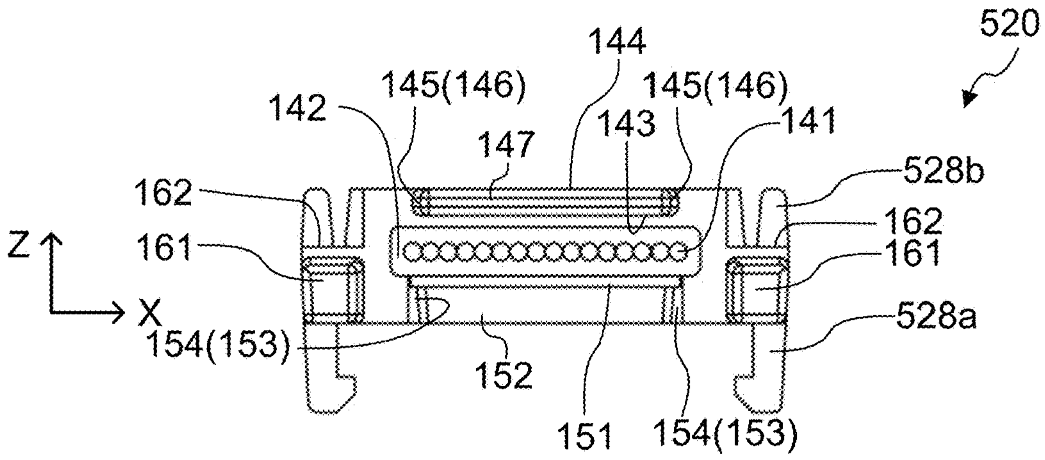
FIGS. 15A to 15C are other diagrams illustrating a configuration of the optical connector from which the lid is detached according to the reference example of Embodiment 1.
Figure 15B:
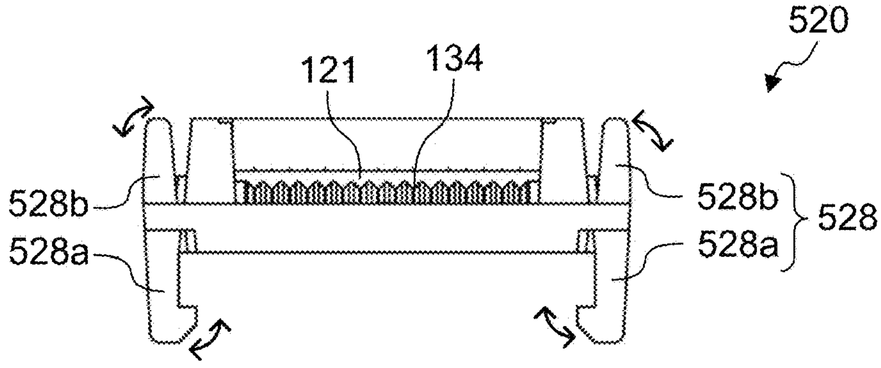
Figure 15C:
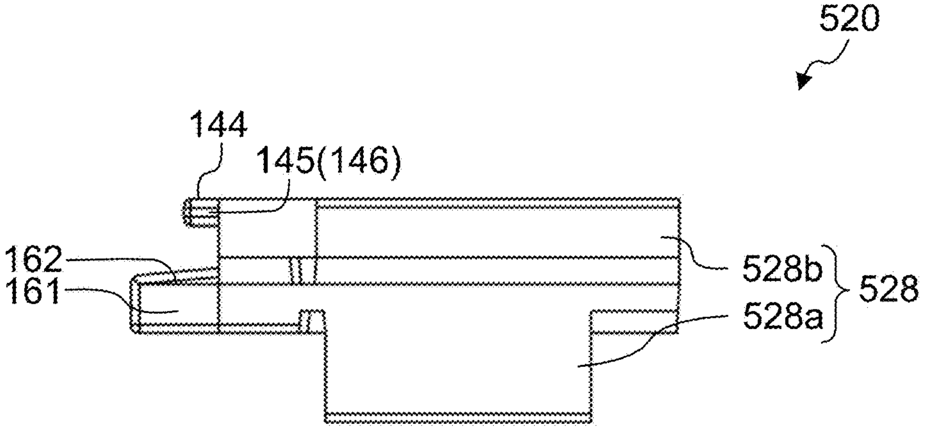

FIG. 13A is a perspective view as viewed from the upper side of optical connector 520 from which a lid is detached according to the reference example, and FIG. 13B is a perspective view as viewed from the lower side. FIG. 14A is a plan view of optical connector 520 from which the lid is detached according to the reference example, and FIG. 14B is a bottom view. FIG. 15A is a front view of optical connector 520 from which the lid is detached according to the reference example, FIG. 15B is a rear view, and FIG. 15C is a right side view.

As illustrated in FIGS. 13A to 15C, the other optical connector 520 according to the reference example includes holding part 121, first optical part 122, second optical part 123, protrusion 124 and recess 125, first inward regulation surface 126, first outward regulation surface 127, and fixing part 528. Holding part 121, first optical part 122, second optical part 123, protrusion 124, recess 125, first inward regulation surface 126, and first outward regulation surface 127 are the same as the components of Embodiment 1, and therefore the description thereof will be omitted.

Fixing part 528 includes claw part 528*a* and nob 528*b*. Claw part 528*a* engages with substrate 600 to fix optical connector 520 to substrate 600. The number of claw parts 528*a* is not limited. In the present embodiment, two (a pair of) claw parts 528*a* are provided. In addition, in the present embodiment, claw part 528*a* protrudes to the lower side (the Z direction) than the bottom surface of optical connector 520. In addition, claw part 528*a* is disposed along the third direction (the Y direction) at both end portions of optical connector 520 in the first direction (the X direction). Claw part 528*a* is inserted to through hole 601 formed in substrate 600 from one surface of substrate 600. When claw part 528*a* is engaged with substrate 600 (through hole 601), optical connector 520 is fixed to substrate 600.

Nob 528*b* is used for releasing substrate 600 and optical connector 520. The number of nobs 528*b* is not limited. In the present embodiment, two (a pair of) nobs 528*b* are provided. In addition, in the present embodiment, nob 528*b* protrudes to the upper side (the Z direction) than the top surface of optical connector 520. In addition, nob 528*b* is disposed along the third direction (the Y direction) at both end portions of optical connector 520 in the first direction (the X direction). Claw part 528*a* and nob 528*b* are formed as one piece, and the boundary portion between claw part 528*a* and nob 528*b* is connected to the connector body. This boundary portion functions as a fulcrum for moving claw part 528*a* when nob 528*b* is moved. Specifically, in the present embodiment, nob 528*b* is disposed on the side opposite to claw part 528*a*.

As illustrated in FIG. 15B, when a pair of nobs 528*b* is pinched (when an inward force is applied in the first direction (the X direction)), nob 528*b* is tilted inward. In this manner, claw part 528*a* is tilted such that the tip end portion of claw part 528*a* moves outward. In this state, optical connector 520 can be inserted to or detached from through hole 601 of substrate 600.

Usage of Optical Connector Module

Figure 16A:
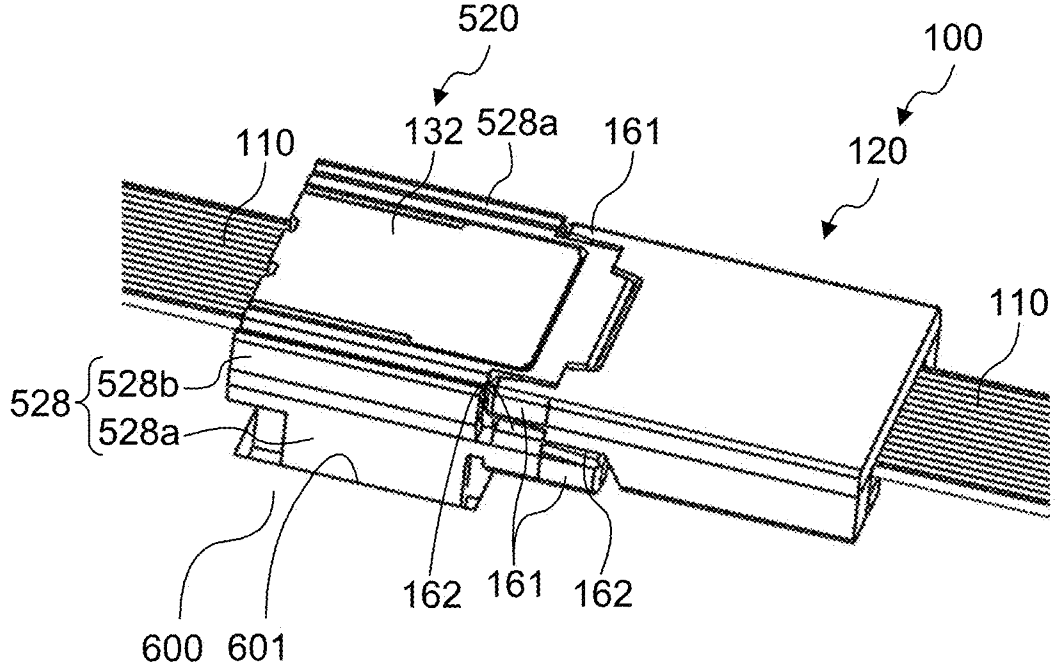
FIGS. 16A and 16B are perspective views for describing usage of the optical connector module according to the reference example of Embodiment 1.

Now, usage of the optical connector module is described below. FIG. 16A is a perspective view for describing usage of connector 520, and FIG. 16B is a side view for describing usage of connector 520.

Figure 16B:
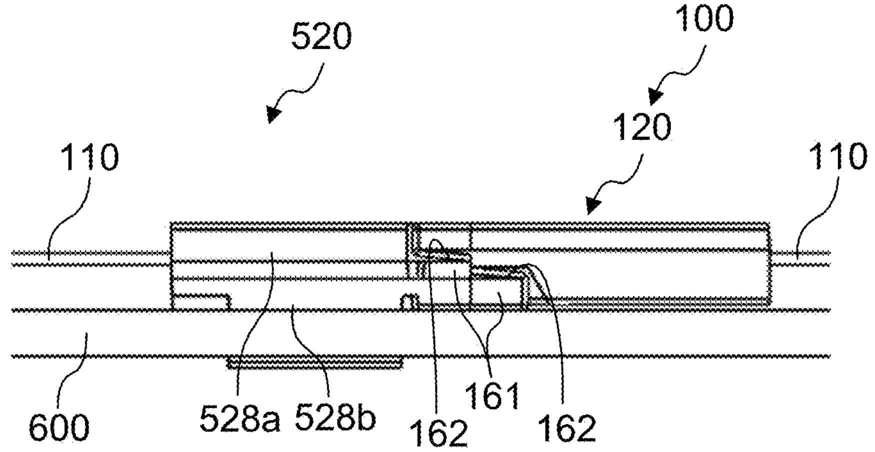

As illustrated in FIGS. 16A and 16B, optical connector 520 of the other optical connector module is fixed to substrate 600 by inserting claw part 528*a* to through hole 601 of substrate 600 while expanding claw part 528*a* by pinching the pair of nobs 528*b*, and then releasing the force applied to the pair of nobs 528*b*, with lid 132 facing the upper side. One optical connector module 100 is connected to optical connector 520 of the other optical connector module in an upside-down manner. At this time, protrusion 124 of the other optical connector module and recess 125 of one optical connector module 100 are engaged with each other, and recess 125 of the other optical connector module and protrusion 124 of one optical connector module 100 are engaged with each other. In this manner, in the second direction (the Z direction), the positional displacement between the other optical connector module and one optical connector module 100 is regulated. In addition, engaging protrusion 161 of the other optical connector module and engaging recess 162 of one optical connector module 100 are engaged with each other, and engaging recess 162 of the other optical connector module and engaging protrusion 161 of one optical connector module 100 are engaged with each other. In this manner, in the first direction (the X direction), the positional displacement between the other optical connector module and one optical connector module 100 is regulated. In this manner, the plurality of optical transmission members 110 connected to the other optical connector module and optical transmission member 110 connected to one optical connector module 100 are optically connected to each other.

Effects

The optical connector module of the present embodiment can fix the other optical connector 520 to the substrate without using other components while achieving the effects of Embodiment 1, and thus the other optical connector 520 can be densely installed on substrate 600. In addition, the height (the Z direction) of the connecting part of one connector 120 and the other connector 520 can be reduced, and thus the generated heat can be easily dissipated.

Embodiment 3

Next, optical connector module 600 according to Embodiment 3 is described. Optical connector module 600 according to Embodiment 3 is different from optical connector module 100 according to Embodiment 1 only in the configuration of optical connector 620. In view of this, optical connector 620 is mainly described below. Optical connector 620 according to the present embodiment can suppress the damage to protrusion 124 even when a stress is applied from the second direction (the Z direction).

Figure 17:
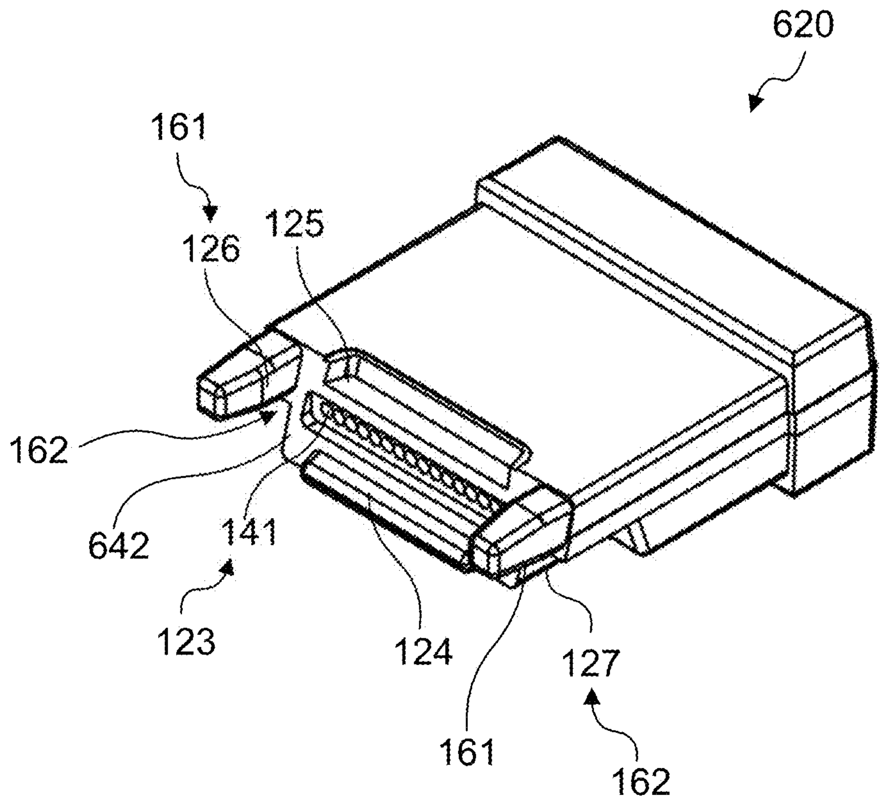
FIG. 17 is a perspective view of an optical connector according to Embodiment 3 of the present invention as viewed from the lower side.
Figure 18A:
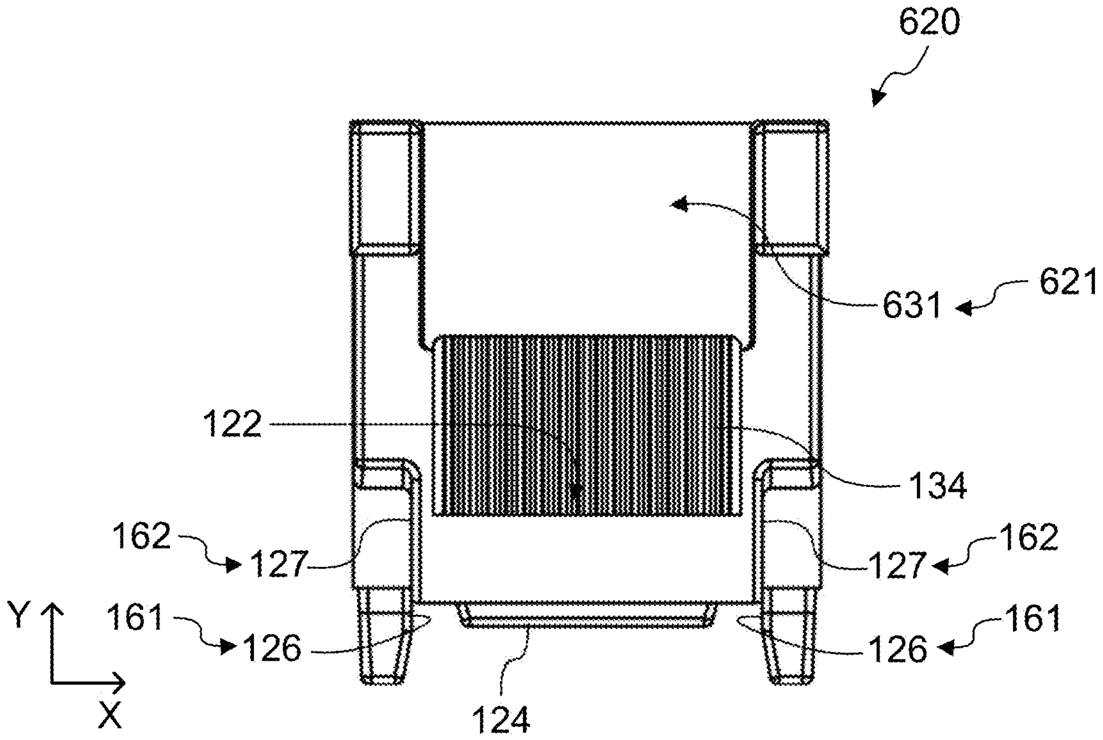
FIGS. 18A and 18B are diagrams illustrating a configuration of the optical connector from which a lid is detached according to Embodiment 3 of the present invention.
Figure 18B:
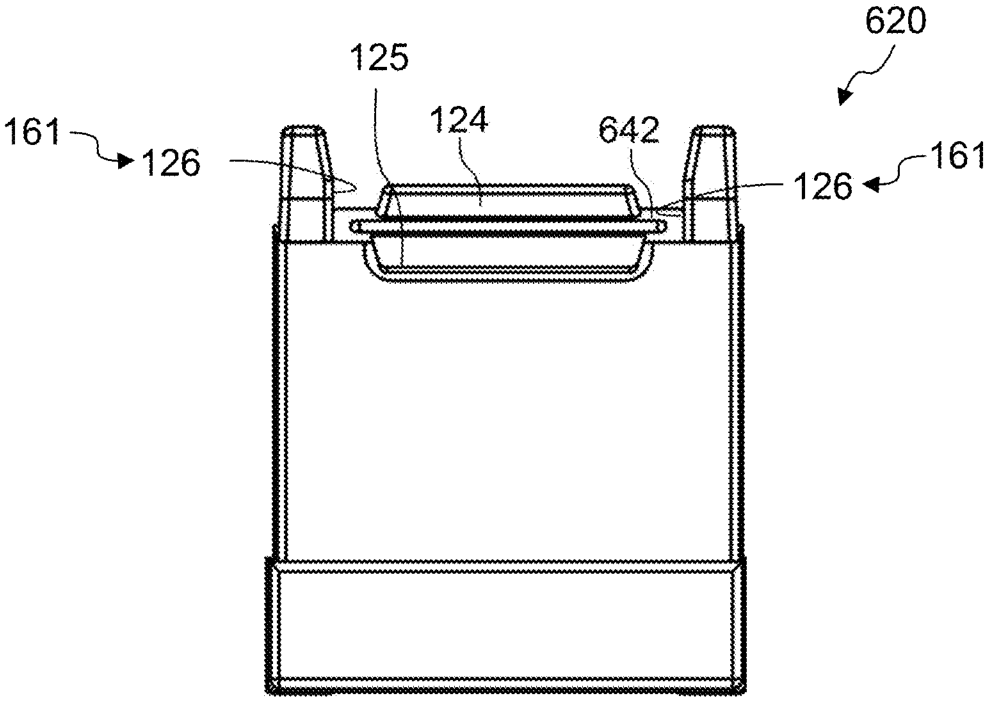
Figure 19A:
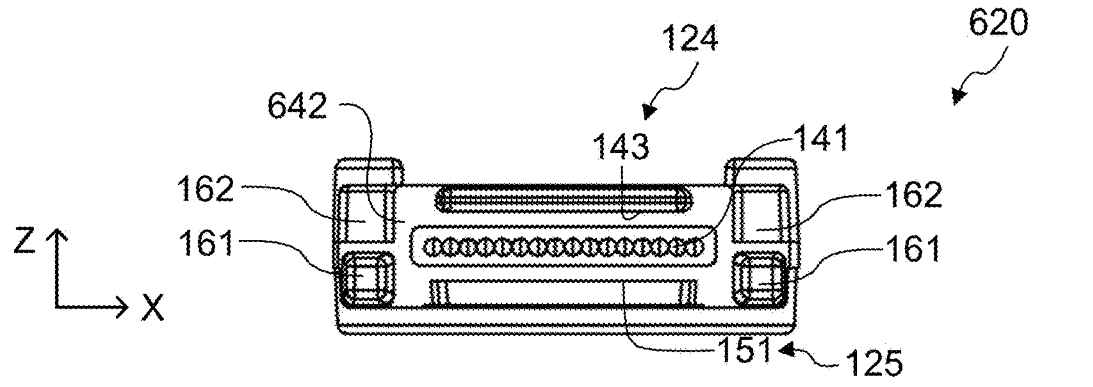
FIGS. 19A to 19D are diagrams illustrating a configuration of the optical connector according to Embodiment 3 of the present invention.
Figure 19B:
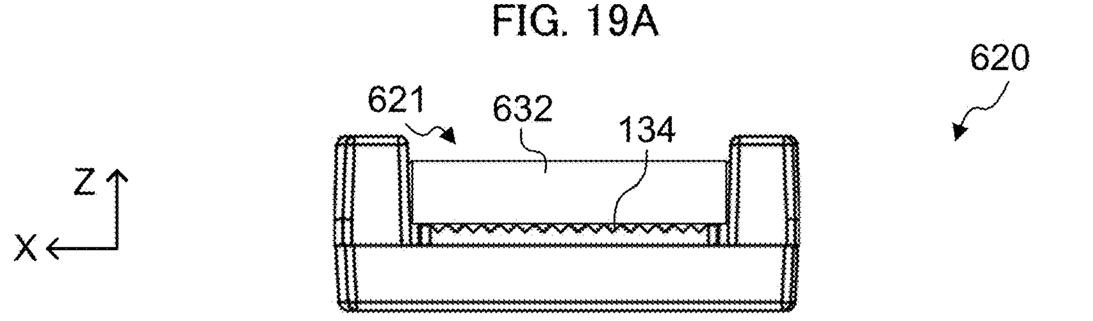
Figure 19C:
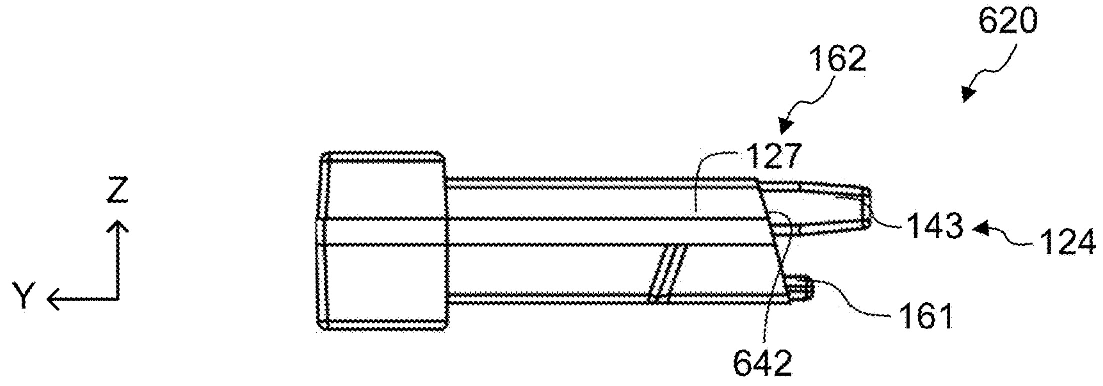
Figure 19D:
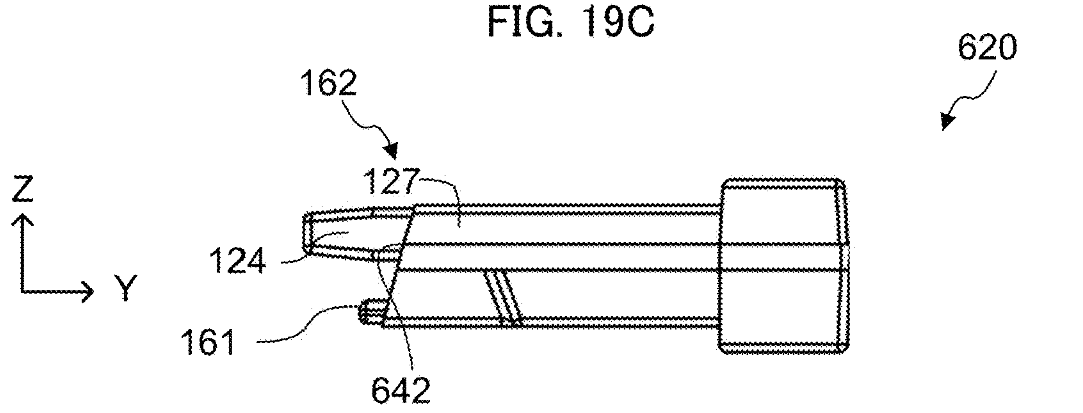

FIG. 17 is a perspective view of optical connector 620 according to Embodiment 3 of the present invention as viewed from the lower side. FIG. 18A is a plan view of optical connector 620 according to Embodiment 3 of the present invention, and FIG. 18B is a bottom view. FIG. 19A is a front view of optical connector 620 according to Embodiment 3 of the present invention, FIG. 19B is a rear view, FIG. 19C is a left side view, and FIG. 19D is a right side view.

As illustrated in FIGS. 17 to 19D, optical connector 620 according to Embodiment 3 includes holding part 621, first optical part 122, second optical part 123, protrusion 124, recess 125, first inward regulation surface 126, and first outward regulation surface 127.

Holding part 621 holds the end portions of the plurality of optical transmission members 110. In the present embodiment, holding part 621 holds the end portion of optical transmission member 110 by pushing it. In the present embodiment, holding part 621 includes holding recess 631 and lid 632 (see FIG. 20). Holding recess 631 is open at the top surface and back surface of optical connector 620. In the present embodiment, holding recess 631 has a rectangular plan shape. Note that in the present embodiment, the notch part for disposing lid 632 at a predetermined position is not disposed at both end portions of holding recess 631 in the first direction (the X direction).

In the present embodiment, at the front surface of optical connector 620, contact surface 642 where second optical part 123, protrusion 124 and recess 125 are not disposed is a flat surface. Contact surface 642 makes contact with contact surface 642 of the other optical connector 620. In the present embodiment, contact surface 642 is tilted with respect to the rear surface of optical connector 620. More specifically, as viewed along the first direction (the X direction), contact surface 642 is a tilted surface tilted toward first optical part 122 side as it goes from protrusion 124 toward recess 125.

It is assumed that a stress is applied to optical connector 620 from the second direction (the Z direction). In this case, the stress is applied not only to the base end portion of protrusion 124, but also to contact surface 642. In this manner, the stress applied in the direction along the second direction (the Z direction) is dispersed to the base end portion of stress protrusion 124 and contact surface 642. In this manner, even when a stress is applied from the second direction (the Z direction), damage to protrusion 124 can be suppressed.

Usage of Optical Connector Module

Figure 20:
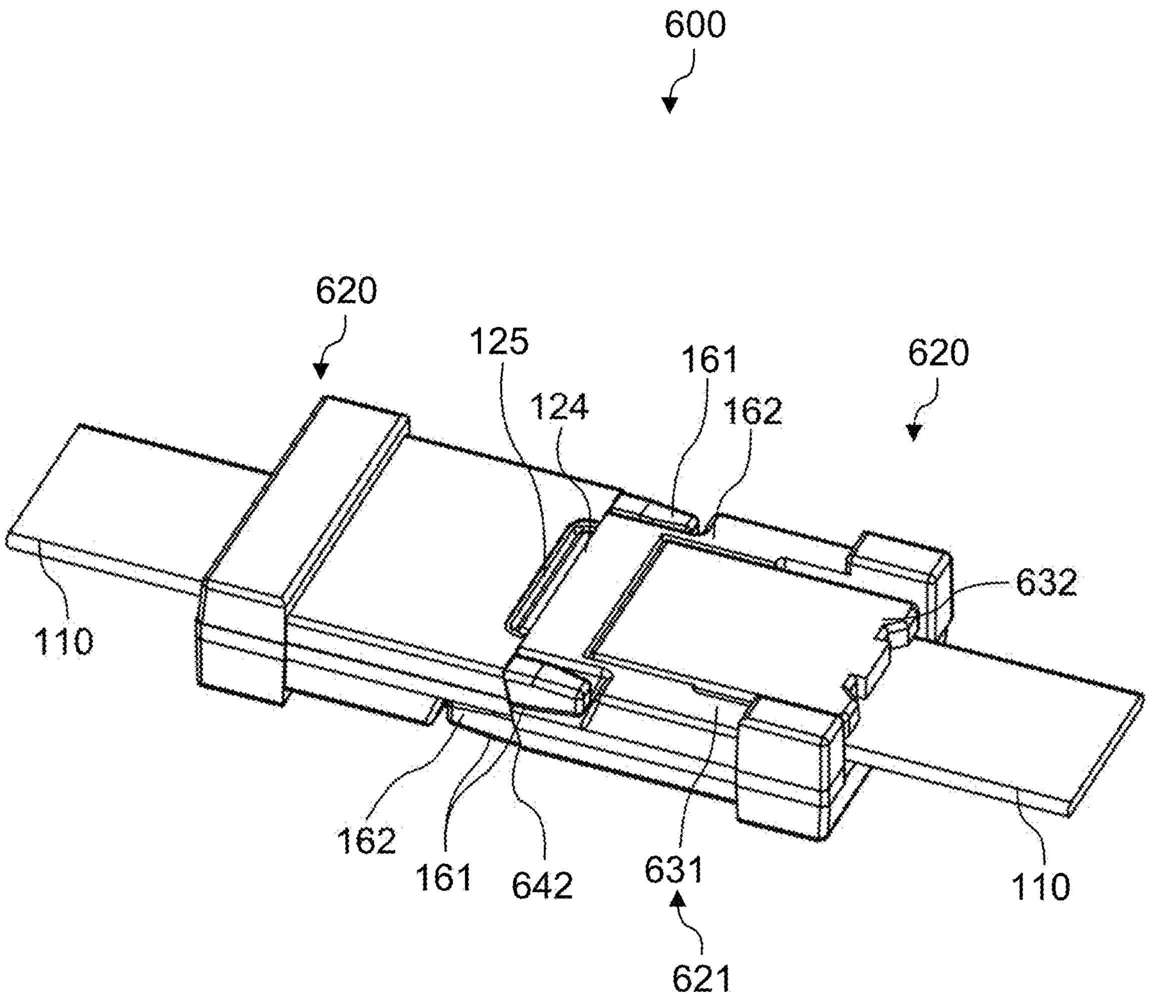
FIG. 20 is a perspective view for describing usage of the optical connector module according to Embodiment 3.

FIG. 20 is a perspective view for describing usage of optical connector module 600 according to Embodiment 3 of the present invention.

As illustrated in FIG. 20, one optical connector module 600 is connected to optical connector 620 of the other optical connector module 600 in an upside-down manner. At this time, protrusion 124 of the other optical connector module 600 and recess 125 of one optical connector module 600 are engaged with each other, and recess 125 of the other optical connector module 600 and protrusion 124 of one optical connector module 600 are engaged with each other. In this manner, in the second direction (the Z direction), the positional displacement between the other optical connector module 600 and one optical connector module 600 is regulated. In addition, engaging protrusion 161 of the other optical connector module 600 and engaging recess 162 of one optical connector module 600 are engaged with each other, and engaging recess 162 of the other optical connector module and engaging protrusion 161 of one optical connector module 600 are engaged with each other. In this manner, in the first direction (the X direction), the positional displacement between the other optical connector module 600 and one optical connector module 600 is regulated. In addition, contact surface 642 of one optical connector module 600 and contact surface 642 of the other optical connector module 600 are brought into contact with each other. In this manner, the plurality of optical transmission members 110 connected to the other optical connector module 600 and optical transmission member 110 connected to one optical connector module 600 are optically connected to each other.

Effects

Optical connector module 600 of the present embodiment has the same effects as those of optical connector module 100 according to Embodiment 1. In addition, optical connector module 600 of the present embodiment can suppress the damage to protrusion 124 even when a stress is applied along the second direction (the Z direction).

Although not illustrated in the drawings, the connecting part of protrusion 124 and contact surface 642 may be formed in an R shape. Even in this case, the stress applied to protrusion 124 along the second direction (the Z direction) can be dispersed, and thus damage to protrusion 124 can be suppressed.

Embodiment 4

Next, optical connector module 700 according to Embodiment 4 is described. Optical connector module 700 according to Embodiment 4 is different from optical connector module 100 according to Embodiment 1 only in the configuration of optical connector 720. In view of this, optical connector 720 is mainly described below.

Configuration of Optical Connector

Figure 21:
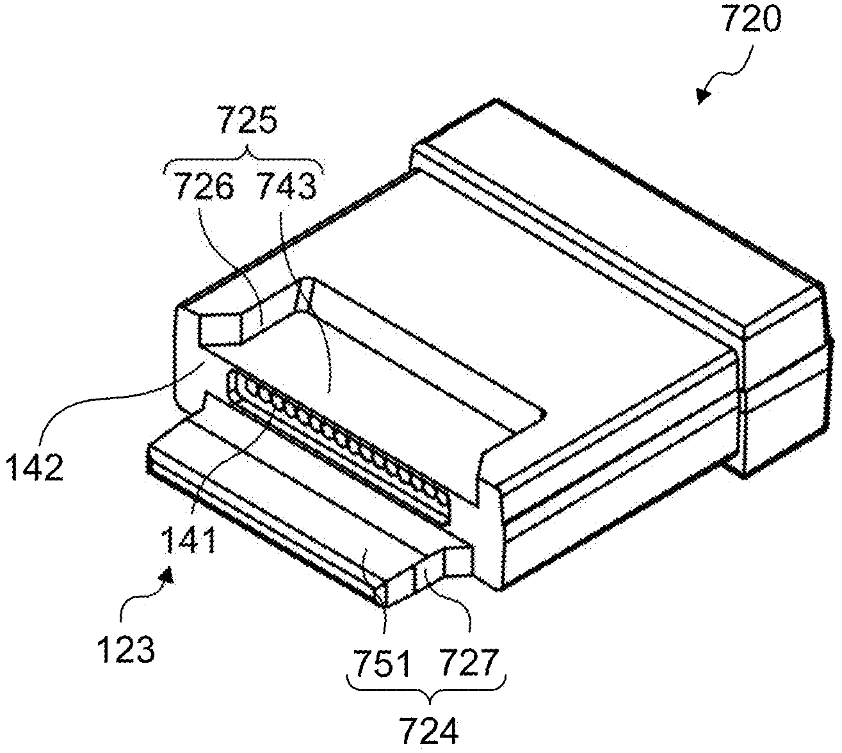
FIG. 21 is a perspective view of an optical connector according to Embodiment 4 of the present invention as viewed from the lower side.
Figure 22A:
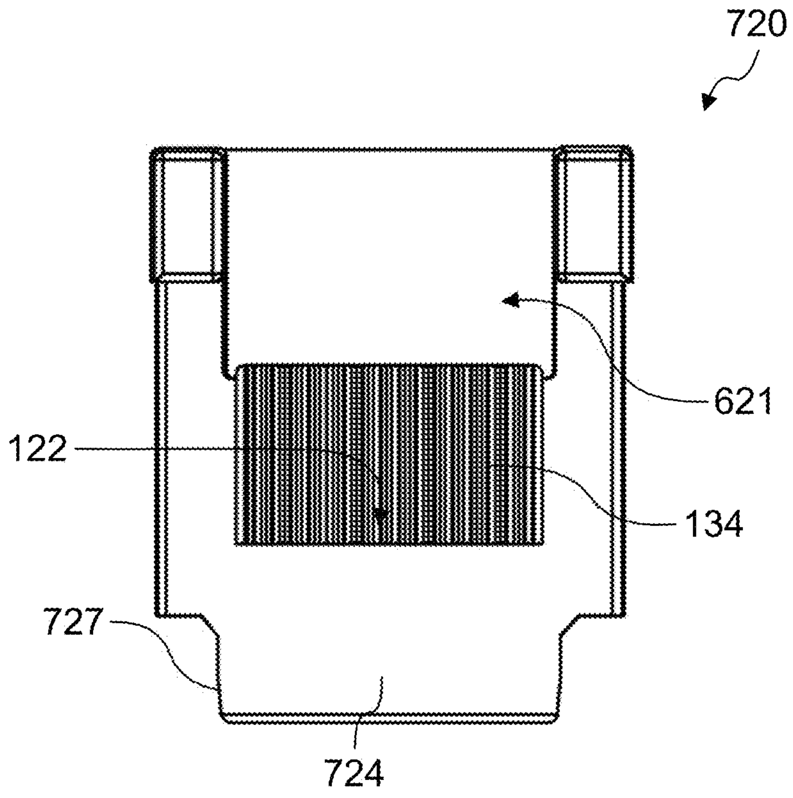
FIGS. 22A and 22B are diagrams illustrating a configuration of the optical connector from which a lid is detached according to Embodiment 4 of the present invention.
Figure 22B:
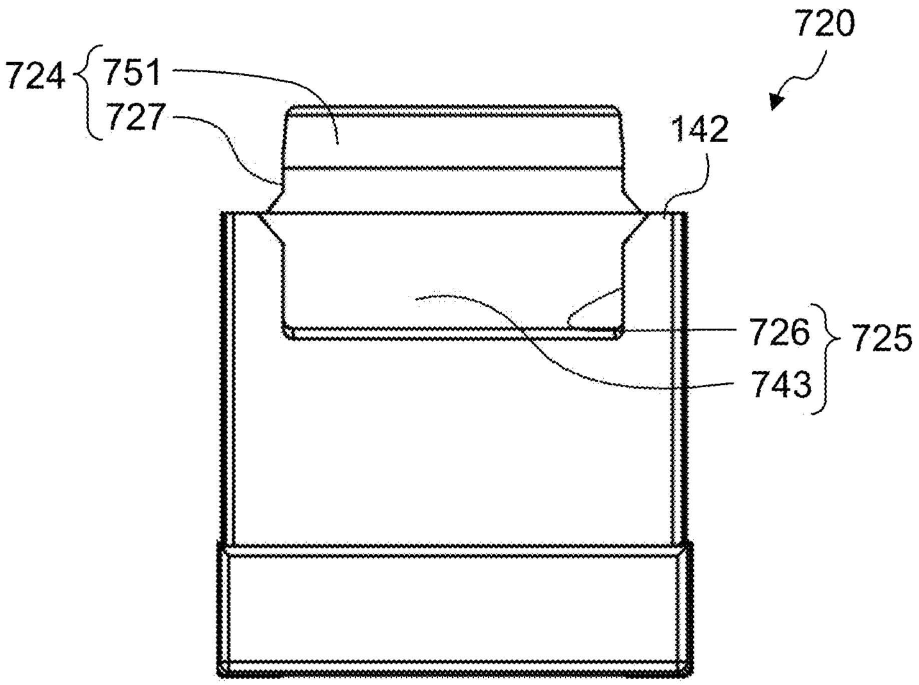
Figure 23A:
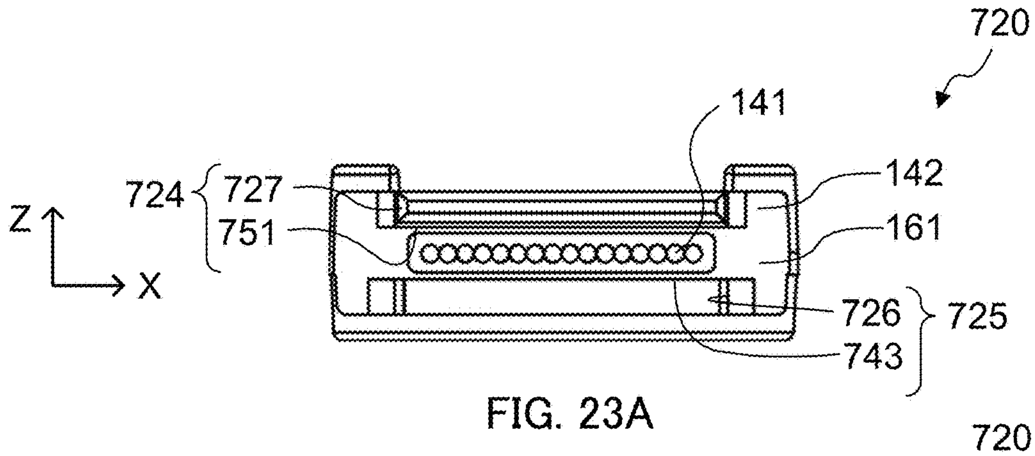
FIGS. 23A to 23D are diagrams illustrating a configuration of the optical connector according to Embodiment 4 of the present invention.
Figure 23B:
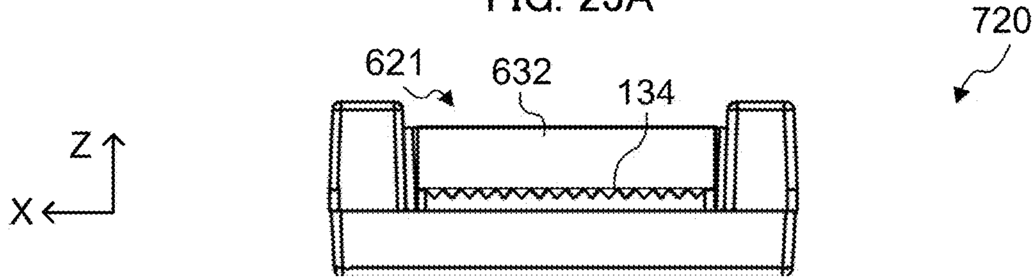
Figure 23C:
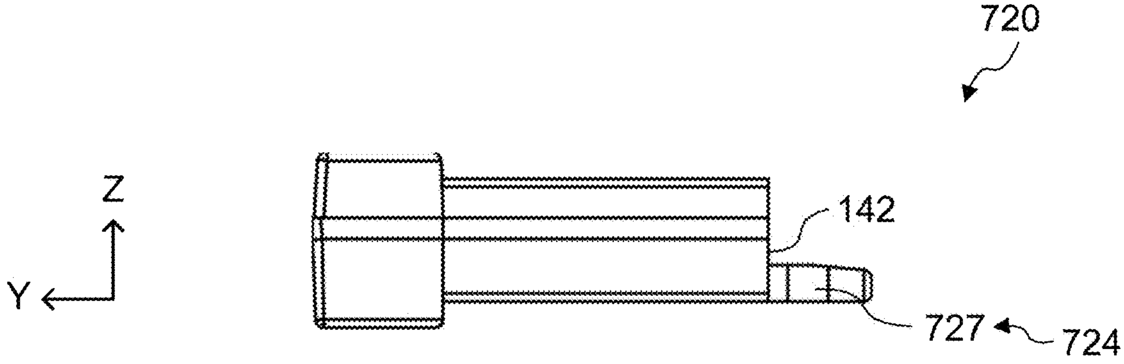
Figure 23D:
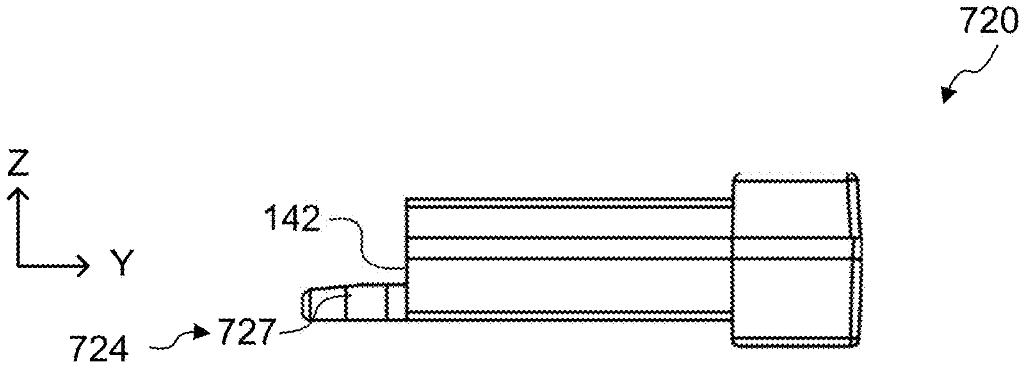

FIG. 21 is a perspective view of optical connector 720 according to Embodiment 4 of the present invention as viewed from the lower side. FIG. 22A is a plan view of optical connector 720 according to Embodiment 4 of the present invention, and FIG. 22B is a bottom view. FIG. 23A is a front view of optical connector 720 according to Embodiment 4 of the present invention, FIG. 23B is a rear view, FIG. 23C is a left side view, and FIG. 23D is a right side view.

As illustrated in FIGS. 21 to 23D, optical connector 720 according to Embodiment 4 includes holding part 621, first optical part 122, second optical part 123, protrusion 724, recess 725, first inward regulation surface 726, and first outward regulation surface 727.

Holding part 621 is the same as optical connector 620 according to Embodiment 3, and the notch part for disposing the lid 632 at a predetermined position is not disposed at both end portions of holding recess 631 in the first direction (the X direction).

In front view of second optical part 123 (as viewed along an optical path between optical connector 720 and the other optical connector 720), a pair of protrusion 724 and recess 725 is disposed at line-symmetric positions with respect to the reference straight line parallel to the first direction (the X direction). In the present embodiment, in front view of second optical part 123 (as viewed along an optical path between optical connector 720 and the other optical connector 720), protrusion 724 and recess 725 are disposed with second optical part 123 therebetween in the second direction (the Z direction) orthogonal to the first direction (the X direction). In the present embodiment, at the front surface of optical connector 720, contact surface 142 where second optical part 123, protrusion 724 and recess 725 are not disposed is a flat surface that is disposed perpendicularly to the rear surface of optical connector 720.

In the present embodiment, protrusion 724 includes first outward regulation surface 727 and second inward regulation surface 751, and recess 725 includes first inward regulation surface 726 and second outward regulation surface 743.

First outward regulation surface 727 includes a flat surface disposed to face outward along the first direction (the X direction). With a flat surface rather than a curved surface in this manner, first outward regulation surface 727 can suppress the positional displacement in the first direction (the X direction) with respect to the other optical connector 720. In the present embodiment, two (a pair of) first outward regulation surfaces 727 are provided. In addition, in the present embodiment, first outward regulation surface 727 is a part of the outer surface of protrusion 724 in the first direction (the X direction).

Second inward regulation surface 751 includes a flat surface disposed to face inward in the second direction (the Z direction). As a flat surface, rather than a curved surface, second inward regulation surface 751 can suppress the positional displacement in the second direction (the Z direction) with respect to the other optical connector 720. In the present embodiment, one second inward regulation surface 751 is provided. In addition, in the present embodiment, second inward regulation surface 751 is a part of the outer surface of protrusion 724 in the Z direction (the second direction).

First inward regulation surface 726 includes a flat surface disposed to face inward along the first direction (the X direction). As a flat surface rather than a curved surface in this manner, first inward regulation surface 726 can suppress the positional displacement in the first direction (the X direction) with respect to the other optical connector 720. In the present embodiment, two (a pair of) first outward regulation surfaces 727 are provided. In addition, in the present embodiment, first inward regulation surface 726 is a part of the inner surface of recess 725 in the first direction (the X direction).

Second outward regulation surface 743 includes a flat surface disposed to face outward in the second direction (the Z direction). As a flat surface, rather than a curved surface, second outward regulation surface 743 can suppress the positional displacement in the second direction with respect to the other optical connector 720. In the present embodiment, one second outward regulation surface 743 is provided. In addition, in the present embodiment, second outward regulation surface 743 is a part of the inner surface of recess 725 in the Z direction (the second direction).

Usage of Optical Connector Module

Figure 24:
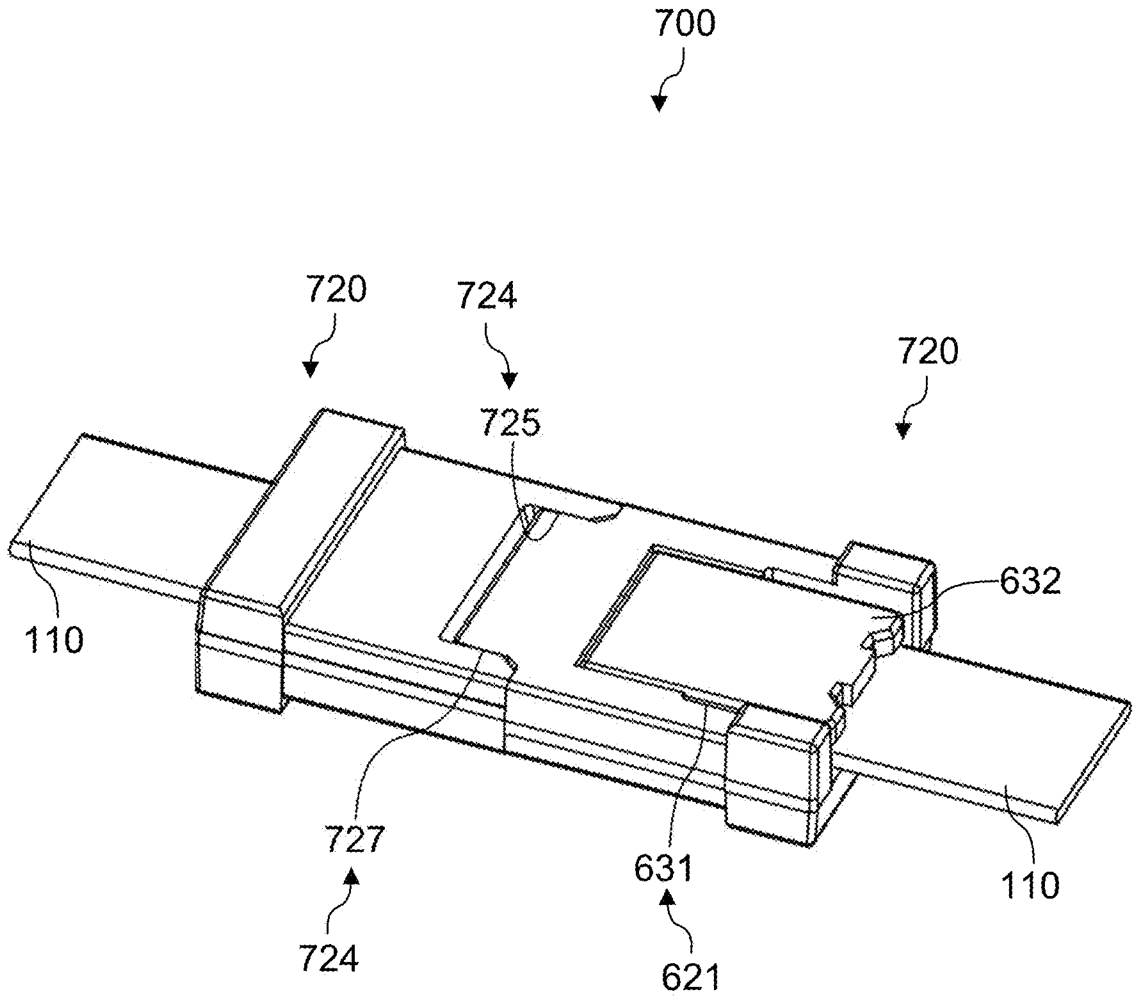
FIG. 24 is a perspective view for describing usage of the optical connector module according to Embodiment 4.

FIG. 24 is a perspective view for describing usage of optical connector module 700 according to Embodiment 4 of the present invention.

As illustrated in FIG. 24, one optical connector module 700 is connected to optical connector 720 of the other optical connector module 700 in an upside-down manner. At this time, protrusion 724 of the other optical connector module 700 and recess 725 of one optical connector module 700 are engaged with each other. In this manner, in the first direction (the X direction) and the second direction (the Z direction), the positional displacement between the other optical connector module 700 and one optical connector module 700 is regulated. In this manner, the plurality of optical transmission members 110 connected to the other optical connector module 700 and optical transmission member 110 connected to one optical connector module 700 are optically connected to each other.

Effects

Optical connector module 700 of the present embodiment has the same effects as those of optical connector module 100 according to Embodiment 1.

Embodiment 5

Next, optical connector module 800 according to Embodiment 5 is described. Optical connector module 800 according to Embodiment 5 is different from optical connector module 100 according to Embodiment 1 only in the configuration of optical connector 820. In view of this, optical connector 820 is mainly described below.

Configuration of Optical Connector

Figure 25:
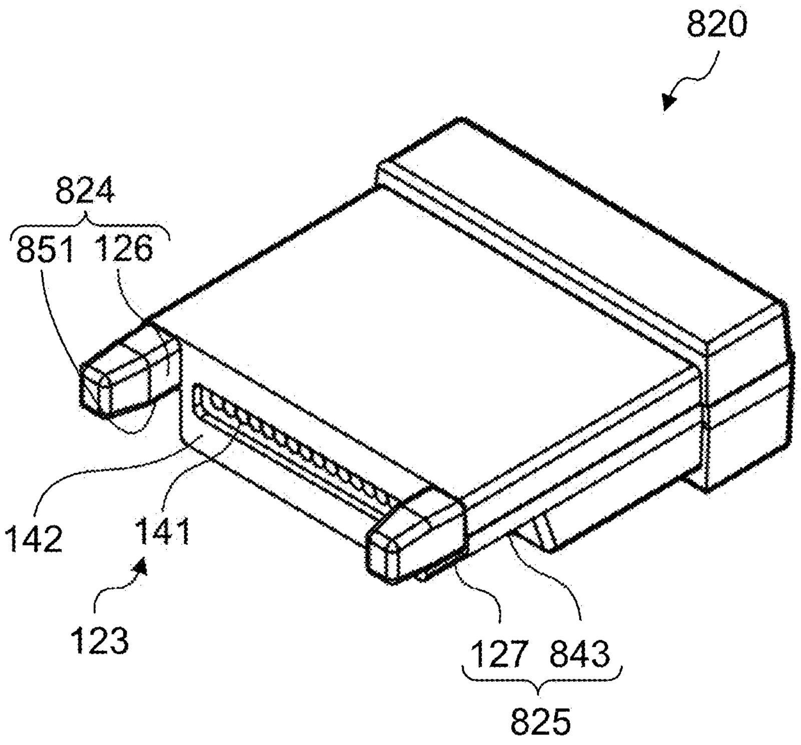
FIG. 25 is a perspective view of an optical connector according to Embodiment 5 of the present invention as viewed from the lower side.
Figure 26A:
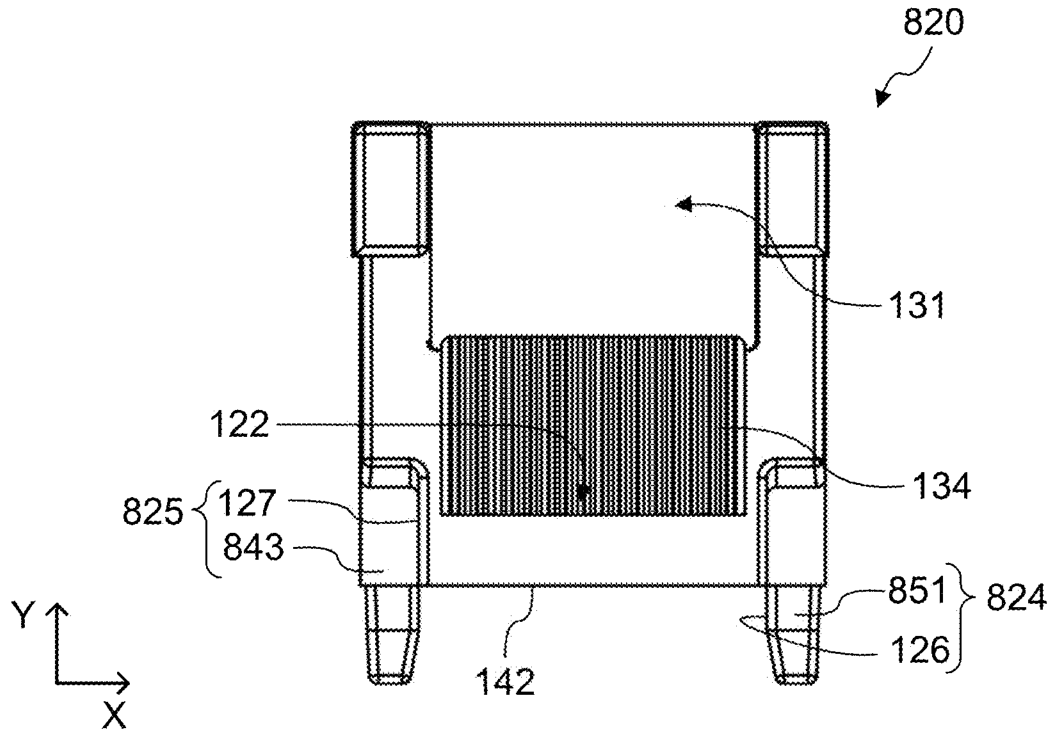
FIGS. 26A and 26B are diagrams illustrating a configuration of the optical connector from which a lid is detached according to Embodiment 5 of the present invention.
Figure 26B:
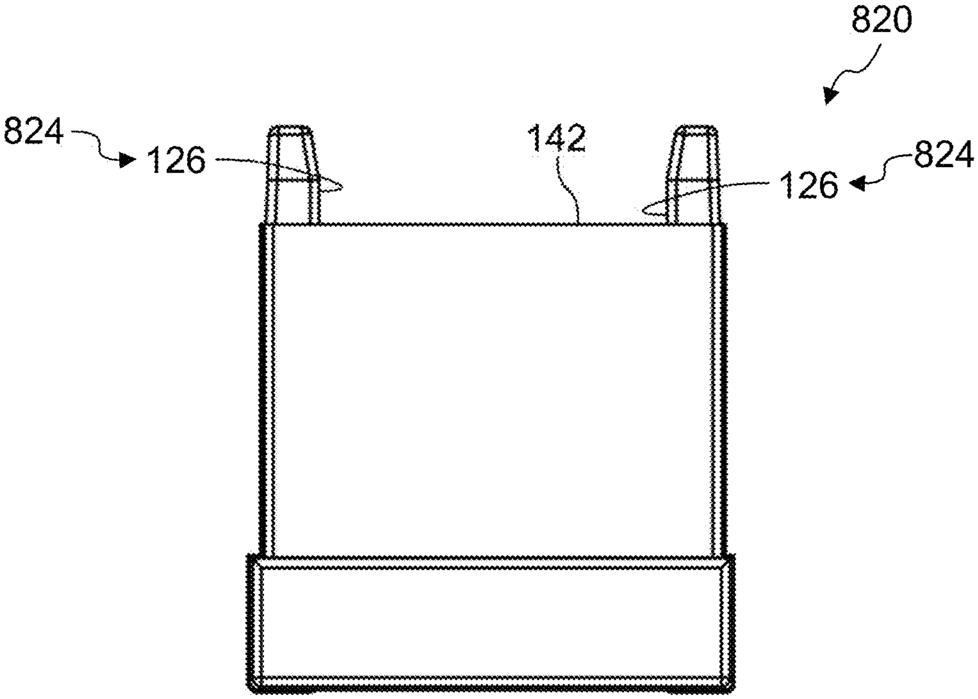
Figure 27A:
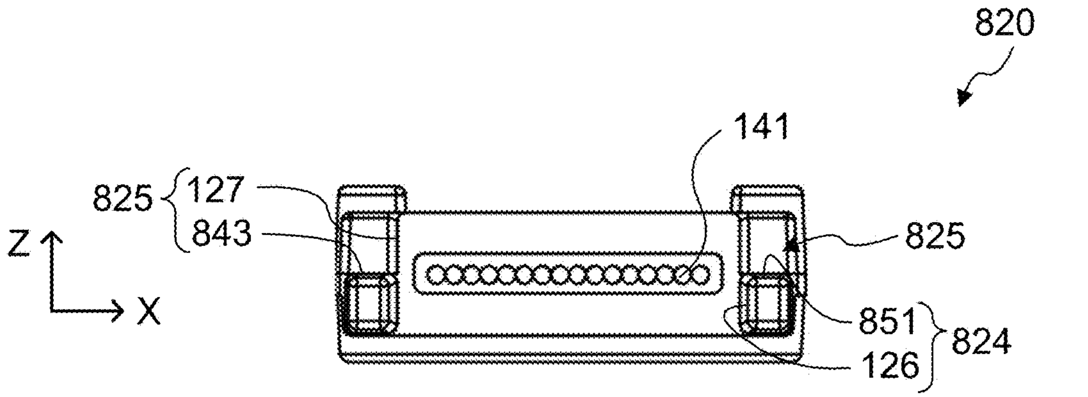
FIGS. 27A to 27D are diagrams illustrating a configuration of the optical connector according to Embodiment 5 of the present invention.
Figure 27B:
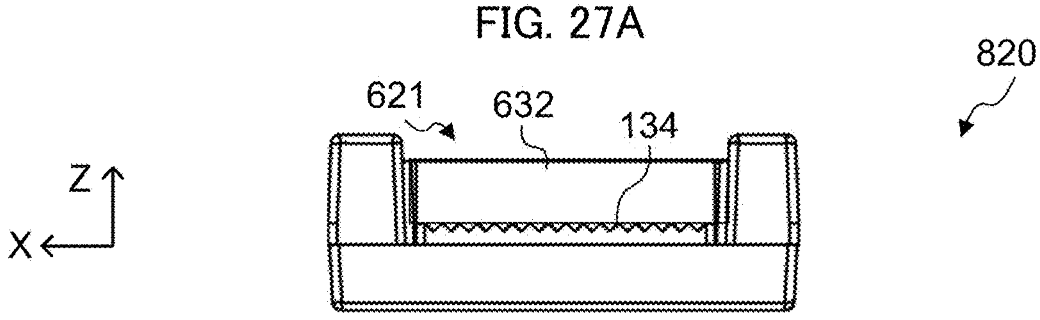
Figure 27C:
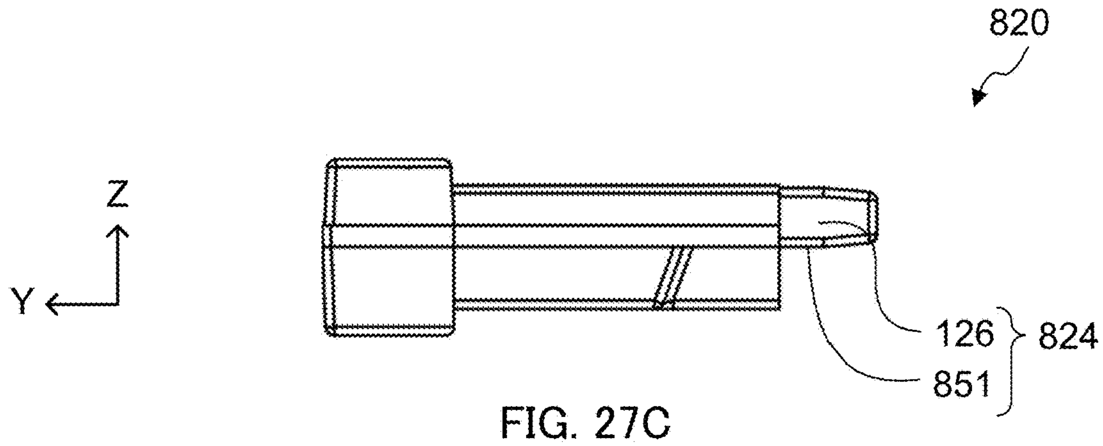
Figure 27D:
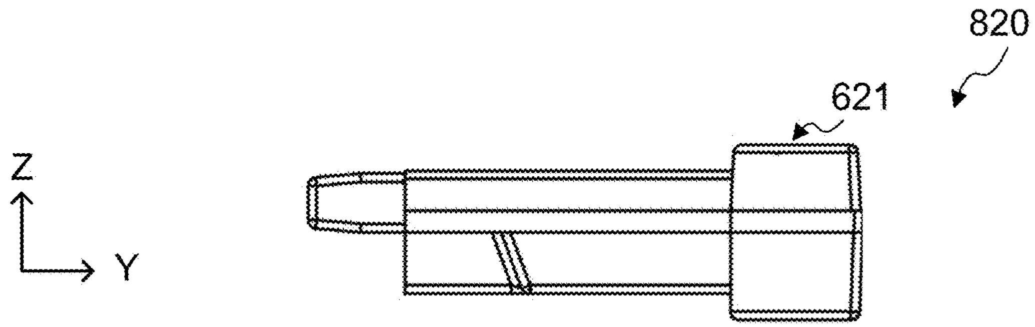

FIG. 25 is a perspective view of optical connector 820 according to Embodiment 5 of the present invention as viewed from the lower side. FIG. 26A is a plan view of optical connector 820 according to Embodiment 5 of the present invention, and FIG. 26B is a bottom view. FIG. 27A is a front view of optical connector 820 according to Embodiment 5 of the present invention, FIG. 27B is a rear view, FIG. 27C is a left side view, and FIG. 27D is a right side view.

As illustrated in FIGS. 25 to 27D, optical connector 820 according to Embodiment 5 includes holding part 621, first optical part 122, second optical part 123, protrusion 824, recess 825, first inward regulation surface 126, and first outward regulation surface 127.

Holding part 621 is the same as optical connector 620 according to Embodiment 3, and the notch part for disposing the lid 632 at a predetermined position is not disposed at both end portions of holding recess 631 in the first direction (the X direction).

In front view of second optical part 123 (as viewed along an optical path between optical connector 820 and the other optical connector 820), a pair of protrusions 824 and a pair of recesses 825 are disposed at line-symmetric positions with respect to the reference straight line parallel to the first direction (the X direction). In the present embodiment, in front view of second optical part 123 (as viewed along an optical path between optical connector 820 and the other optical connector 820), protrusion 824 and recess 825 are disposed in the second direction (the Z direction) orthogonal to the first direction (the X direction). In the present embodiment, at the front surface of optical connector 820, contact surface 142 where second optical part 123, protrusion 824 and recess 825 are not disposed is a flat surface that is disposed perpendicularly to the rear surface of optical connector 820.

In the present embodiment, protrusion 824 includes first inward regulation surface 126 and second inward regulation surface 851, and recess 825 includes first outward regulation surface 127 and second outward regulation surface 843.

First inward regulation surface 126 includes a flat surface disposed to face inward along the first direction (the X direction). As a flat surface rather than a curved surface in this manner, first inward regulation surface 126 can suppress the positional displacement in the first direction (the X direction) with respect to the other optical connector 820. In the present embodiment, two (a pair of) first inward regulation surfaces 126 are provided. In addition, in the present embodiment, first inward regulation surface 126 is a part of the outer surface of protrusion 824 in the first direction (the X direction).

Second inward regulation surface 851 includes a flat surface disposed to face inward in the second direction. As a flat surface, rather than a curved surface, second inward regulation surface 851 can suppress the positional displacement in the second direction (the Z direction) with respect to the other optical connector 820. In the present embodiment, two (a pair of) second inward regulation surfaces 851 are provided. In addition, in the present embodiment, second inward regulation surface 851 is a part of the outer surface of protrusion 824 in the Z direction (the second direction).

First outward regulation surface 127 includes a flat surface disposed to face outward along the first direction (the X direction). With a flat surface rather than a curved surface in this manner, first outward regulation surface 127 can suppress the positional displacement in the first direction (the X direction) with respect to the other optical connector 820. In the present embodiment, two (a pair of) first outward regulation surfaces 127 are provided. In addition, in the present embodiment, first outward regulation surface 127 is a part of the inner surface of recess 825 in the first direction (the X direction).

Second outward regulation surface 843 includes a flat surface disposed to face outward in the second direction. As a flat surface, rather than a curved surface, second outward regulation surface 843 can suppress the positional displacement in the second direction with respect to the other optical connector 820. In the present embodiment, two (a pair of) second outward regulation surfaces 843 are provided. In addition, in the present embodiment, second outward regulation surface 843 is a part of the inner surface of recess 825 in the Z direction (the second direction).

Usage of Optical Connector Module

Figure 28:
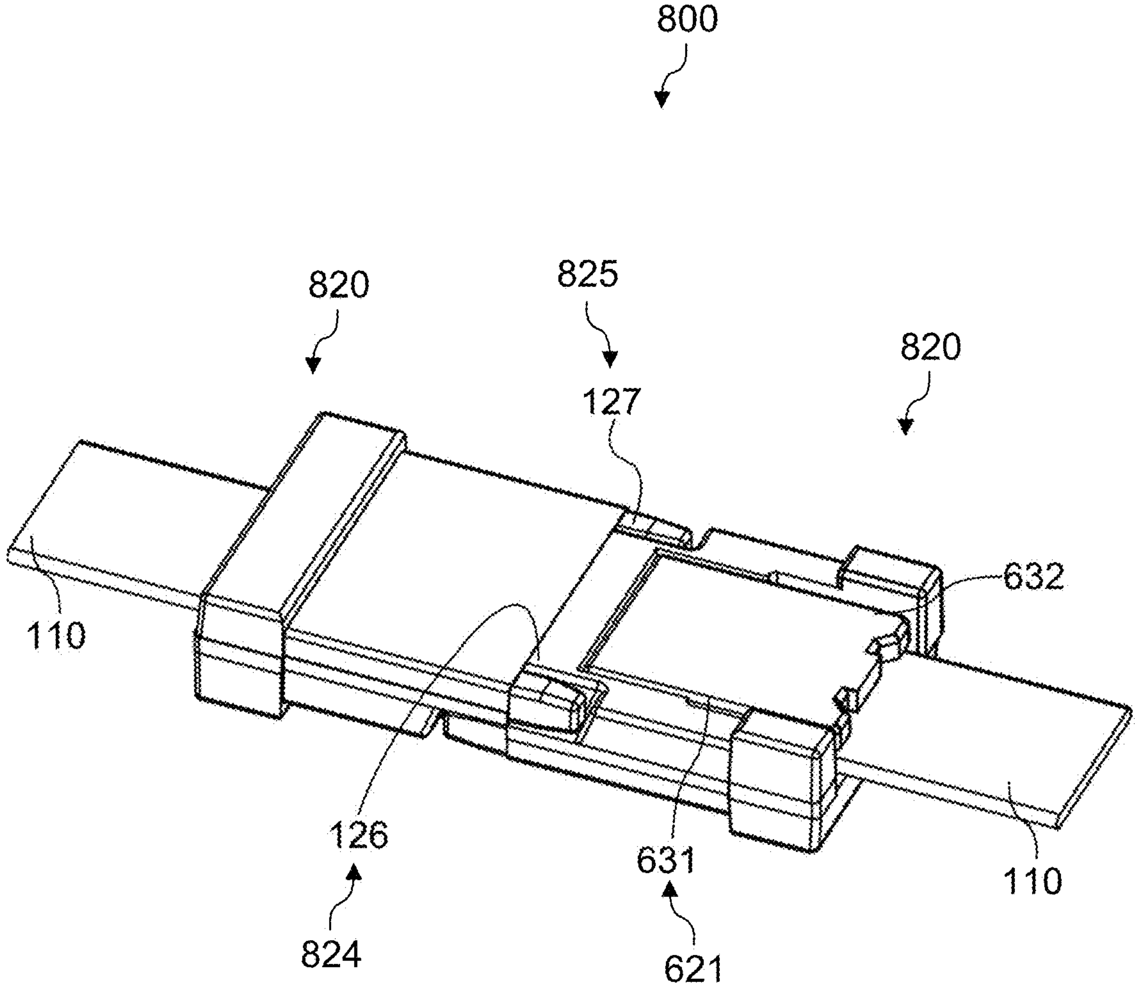
FIG. 28 is a perspective view for describing usage of the optical connector module according to Embodiment 5.

FIG. 28 is a perspective view for describing usage of optical connector module 800 according to Embodiment 5 of the present invention.

As illustrated in FIG. 28, one optical connector module 800 is connected to optical connector 820 of the other optical connector module 800 in an upside-down manner. At this time, protrusion 824 of the other optical connector module 800 and recess 825 of one optical connector module 800 are engaged with each other. In this manner, in the first direction (the X direction) and the second direction (the Z direction), the positional displacement between the other optical connector module 800 and one optical connector module 800 is regulated. In this manner, the plurality of optical transmission members 110 connected to the other optical connector module 800 and optical transmission member 110 connected to one optical connector module 800 are optically connected to each other.

Effects

Optical connector module 800 of the present embodiment has the same effects as those of optical connector module 100 according to Embodiment 1.

Embodiment 6

Next, the optical connector module according to Embodiment 6 is described. The optical connector module according to Embodiment 6 is different from optical connector module 100 according to Embodiment 1 only in the configuration of optical connector 920. In view of this, optical connector 920 is mainly described below.

Configuration of Optical Connector

Figure 29:
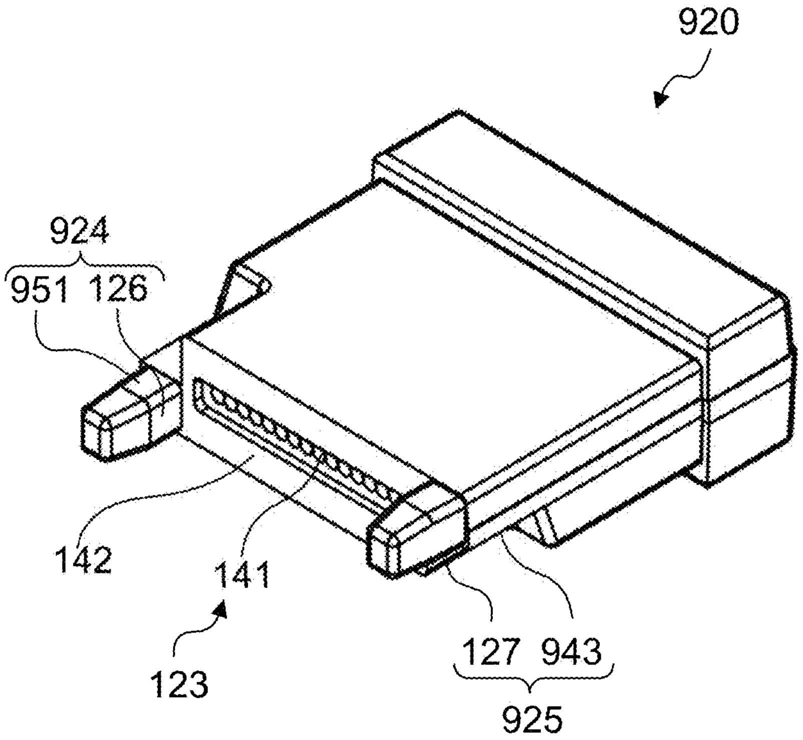
FIG. 29 is a perspective view of an optical connector according to Embodiment 6 of the present invention as viewed from the lower side.
Figure 30A:
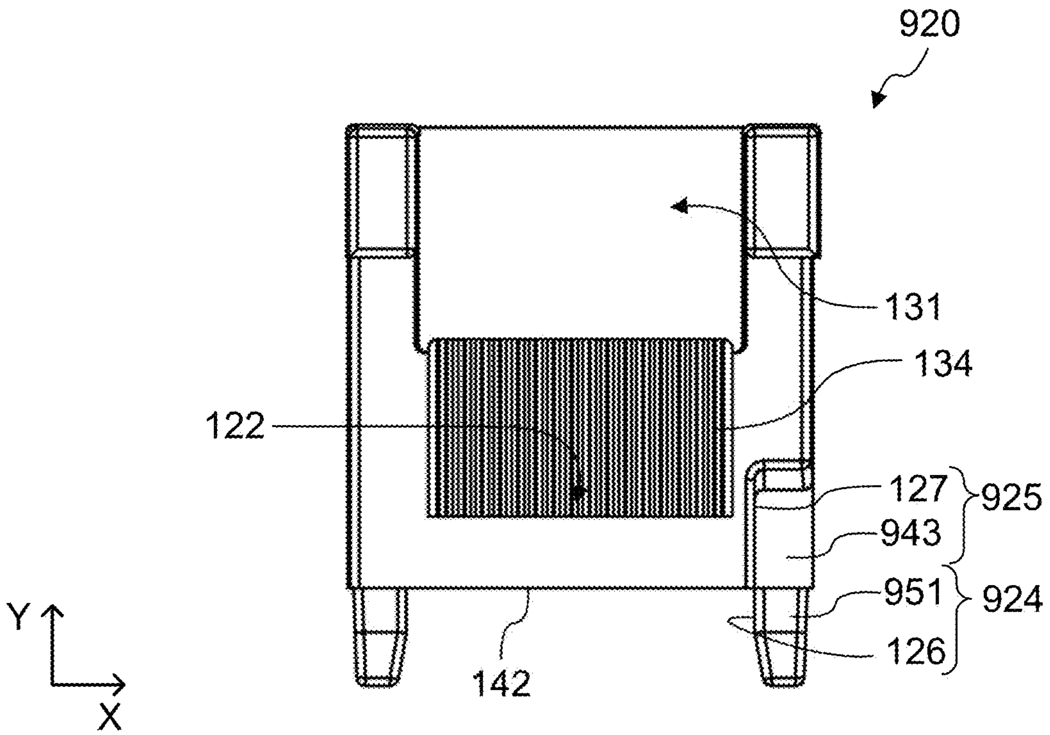
FIGS. 30A and 30B are diagrams illustrating a configuration of the optical connector from which a lid is detached according to Embodiment 6 of the present invention.
Figure 30B:
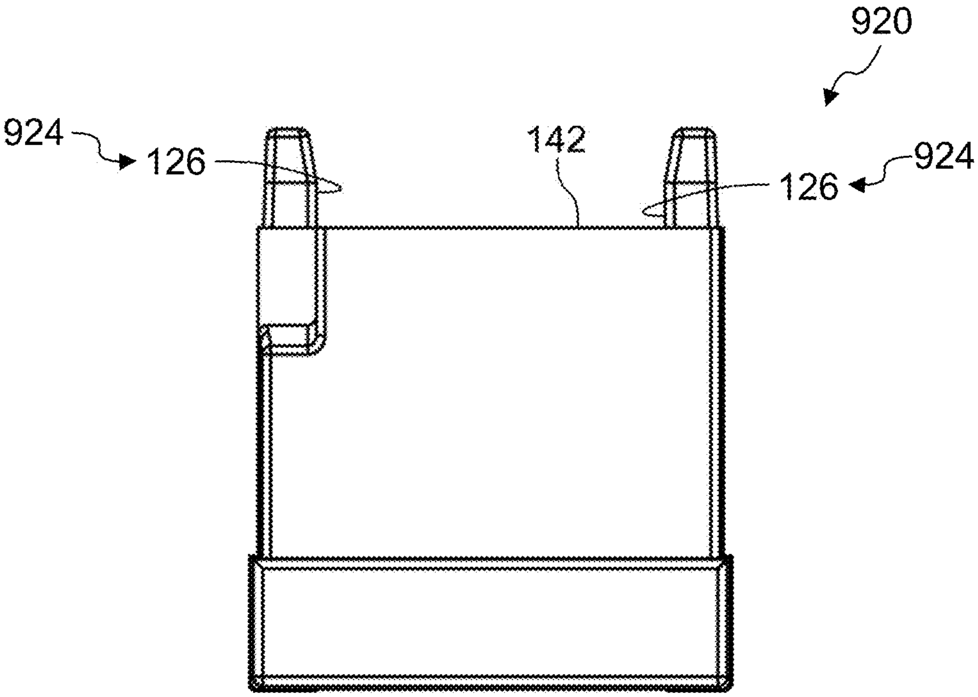
Figure 31A:
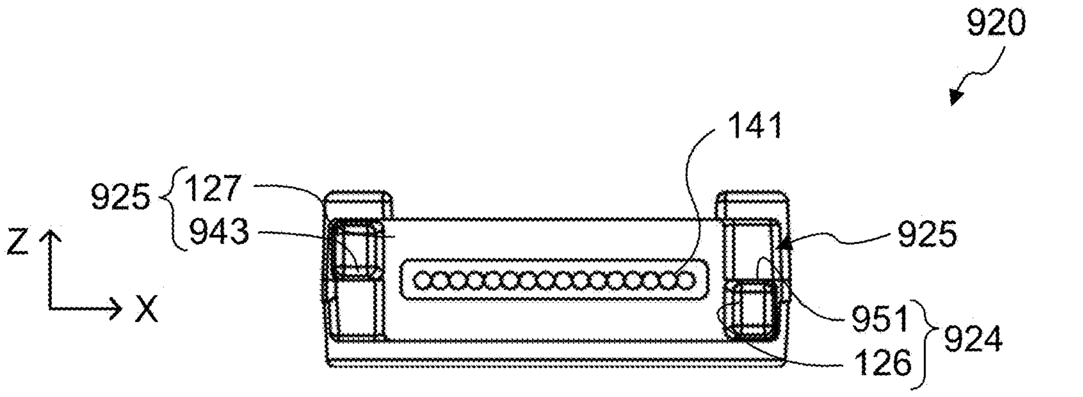
FIGS. 31A to 31D are diagrams illustrating a configuration of the optical connector according to Embodiment 6 of the present invention.
Figure 31B:
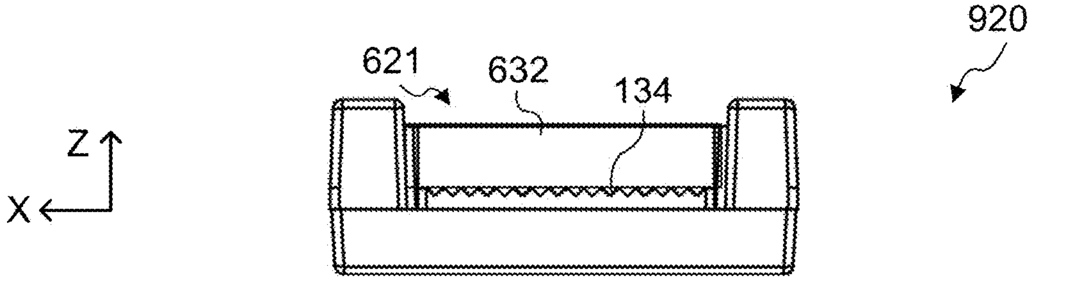
Figure 31C:
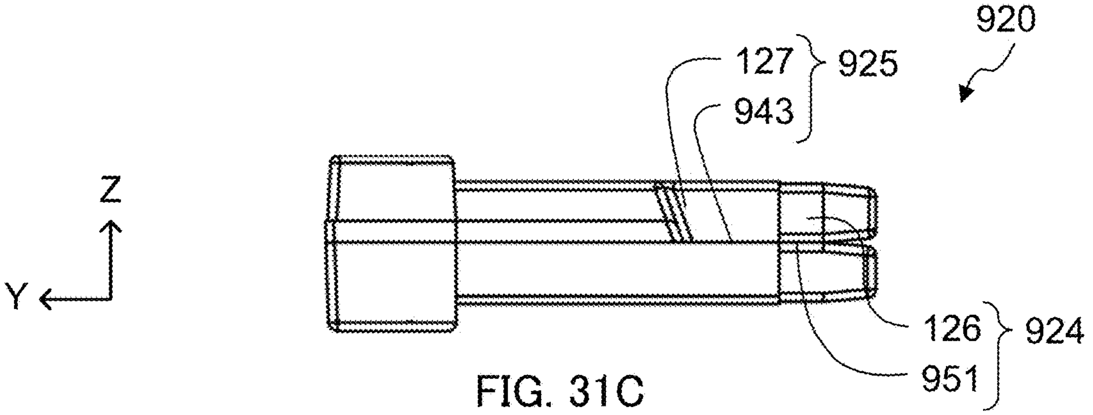
Figure 31D:
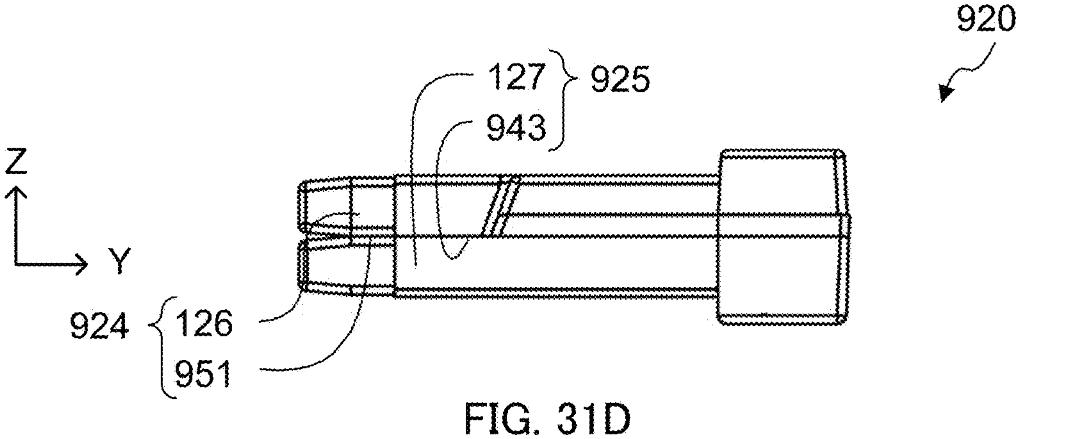

FIG. 29 is a perspective view of optical connector 920 according to Embodiment 6 of the present invention as viewed from the lower side. FIG. 30A is a plan view of optical connector 920 according to Embodiment 6 of the present invention, and FIG. 30B is a bottom view. FIG. 31A is a front view of optical connector 920 according to Embodiment 6 of the present invention, FIG. 31B is a rear view, FIG. 31C is a left side view, and FIG. 31D is a right side view.

As illustrated in FIGS. 29 to 31D, optical connector 920 according to Embodiment 6 includes holding part 621, first optical part 122, second optical part 123, protrusion 924, recess 925, first inward regulation surface 126, and first outward regulation surface 127.

Holding part 621 is the same as optical connector 620 according to Embodiment 3, and the notch part for disposing the lid 632 at a predetermined position is not disposed at both end portions of holding recess 631 in the first direction (the X direction).

In front view of second optical part 123 (as viewed along an optical path between optical connector 920 and the other optical connector 920), a pair of protrusions 924 and a pair of recesses 925 are disposed at line-symmetric positions with respect to the reference straight line parallel to the first direction (the X direction). In the present embodiment, in front view of second optical part 123 (as viewed along an optical path between optical connector 920 and the other optical connector 920), protrusion 924 and recess 925 are disposed in the second direction (the Z direction) orthogonal to the first direction (the X direction). In the present embodiment, protrusion 924 and recess 925 are disposed on one side with respect to the reference straight line, and protrusion 924 and recess 925 are disposed also on the other side. In the present embodiment, at the front surface of optical connector 920, contact surface 142 where second optical part 123, protrusion 924 and recess 925 are not disposed is a flat surface that is disposed perpendicularly to the rear surface of optical connector 920.

In the present embodiment, protrusion 924 includes first inward regulation surface 126 and second inward regulation surface 951, and recess 925 includes first outward regulation surface 127 and second outward regulation surface 943.

First inward regulation surface 126 includes a flat surface disposed to face inward along the first direction (the X direction). As a flat surface rather than a curved surface in this manner, first inward regulation surface 126 can suppress the positional displacement in the first direction (the X direction) with respect to the other optical connector 920. In the present embodiment, two (a pair of) first inward regulation surfaces 126 are provided. In addition, in the present embodiment, first inward regulation surface 126 is a part of the outer surface of protrusion 924 in the first direction (the X direction).

Second inward regulation surface 951 includes a flat surface disposed to face inward in the second direction (the Z direction). As a flat surface, rather than a curved surface, second inward regulation surface 951 can suppress the positional displacement in the second direction (the Z direction) with respect to the other optical connector 920. In the present embodiment, two (a pair of) second inward regulation surfaces 951 are provided. In addition, in the present embodiment, second inward regulation surface 951 is a part of the outer surface of protrusion 924 in the second direction (the Z direction).

First outward regulation surface 127 includes a flat surface disposed to face outward along the first direction (the X direction). With a flat surface rather than a curved surface in this manner, first outward regulation surface 127 can suppress the positional displacement in the first direction (the X direction) with respect to the other optical connector 920. In the present embodiment, two (a pair of) first outward regulation surfaces 127 are provided. In addition, in the present embodiment, first outward regulation surface 127 is a part of the inner surface of recess 925 in the first direction (the X direction).

Second outward regulation surface 943 includes a flat surface disposed to face outward in the second direction (the Z direction). As a flat surface, rather than a curved surface, second outward regulation surface 943 can suppress the positional displacement in the second direction with respect to the other optical connector 920. In the present embodiment, two (a pair of) second outward regulation surfaces 943 are provided. In addition, in the present embodiment, second outward regulation surface 943 is a part of the inner surface of recess 925 in the second direction (the Z direction).

Note that although not illustrated in the drawings, one optical connector module is connected to optical connector 920 of the other optical connector module in an upside-down manner. At this time, protrusion 924 of the other optical connector module and recess 925 of one optical connector module are engaged with each other. In this manner, in the first direction (the X direction) and the second direction (the Z direction), the positional displacement between the other optical connector module and one optical connector module is regulated. In this manner, the plurality of optical transmission members 110 connected to the other optical connector module and optical transmission member 110 connected to one optical connector module are optically connected to each other.

Embodiment 7

Next, the optical connector module according to Embodiment 7 is described. The optical connector module according to Embodiment 7 is different from optical connector module 100 according to Embodiment 1 only in the configuration of optical connector 1020. In view of this, optical connector 1020 is mainly described below.

Configuration of Optical Connector

Figure 32A:
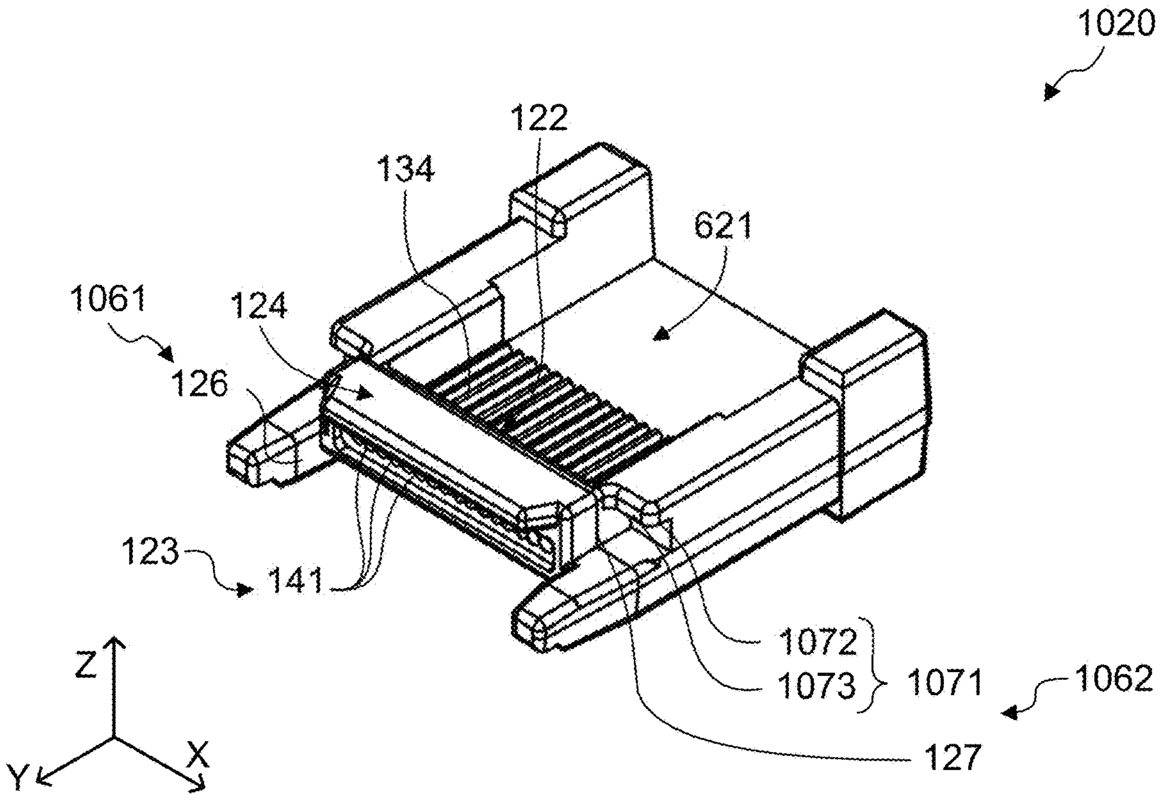
FIGS. 32A and 32B are perspective views of an optical connector according to Embodiment 7 of the present invention.
Figure 32B:
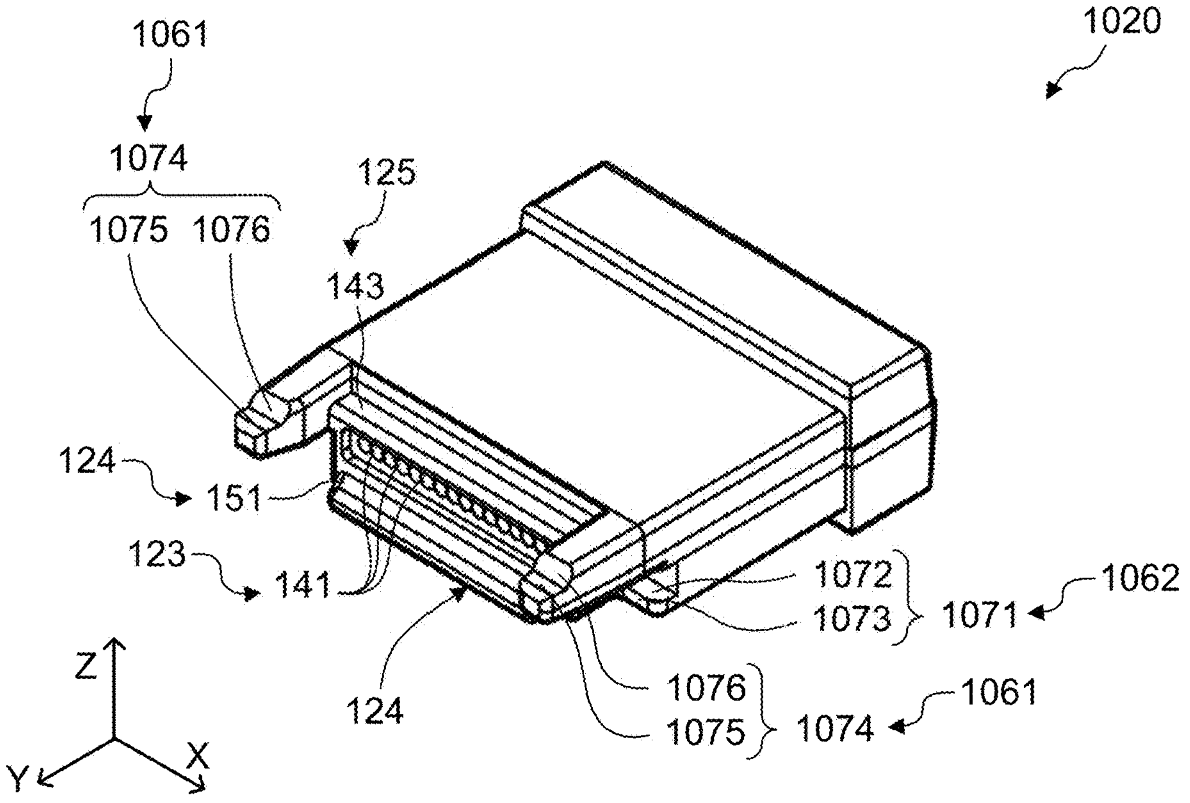

FIGS. 32A and 32B are perspective views of optical connector 1020 according to Embodiment 7 of the present invention. FIG. 32A is a perspective view as viewed from the upper side of optical connector 1020, and FIG. 32B is a perspective view as viewed from the lower side.

As illustrated in FIGS. 32A and 32B, optical connector 1020 according to Embodiment 7 includes holding part 621, first optical part 122, second optical part 123, protrusion 124, recess 125, first inward regulation surface 126, first outward regulation surface 127, inward regulation part 1071, and outward regulation part 1074.

Holding part 621 is the same as optical connector 620 according to Embodiment 3, and the notch part for disposing the lid 632 at a predetermined position is not disposed at both end portions of holding recess 631 in the first direction (the X direction).

In the present embodiment, protrusion 124 includes second inward regulation surface 151, and recess 125 includes second outward regulation surface 143.

First inward regulation surface 126 includes a flat surface disposed to face inward along the first direction (the X direction). In the present invention, with such a flat surface rather than a curved surface, first inward regulation surface 126 can suppress the positional displacement in the first direction (the X direction) with respect to the other optical connector 1020. The number of first inward regulation surfaces 126 is not limited. In the present embodiment, two (a pair of) first inward regulation surfaces 126 are provided. In addition, in the present embodiment, first inward regulation surface 126 is a part of the outer surface of engaging protrusion 1061 disposed with second optical part 123 therebetween in the first direction (the X direction).

First outward regulation surface 127 includes a flat surface disposed to face outward along the first direction (the X direction). With a flat surface rather than a curved surface in this manner, first outward regulation surface 127 can suppress the positional displacement in the first direction (the X direction) with respect to the other optical connector 1020. The number of first outward regulation surfaces 127 is not limited. In the present embodiment, two (a pair of) first outward regulation surfaces 127 are provided. In addition, in the present embodiment, first outward regulation surface 127 is a part of the inner surface engaging recess 1062 disposed with second optical part 123 therebetween in the first direction (the X direction).

Inward regulation part 1071 is disposed with second optical part 123 therebetween in the first direction (the X direction), and disposed to face the direction opposite to the inward direction (outward regulation part 1074) in the second direction (the Z direction) perpendicular to the first direction (the X direction) as viewed along the optical path between optical connector 1020 and the other optical connector 1020, so as to suppress the positional displacement in the second direction (the Z direction) with respect to the other optical connector 1020. In the present embodiment, inward regulation part 1071 includes first flat surface 1072 perpendicular to the second direction (the Z direction), and third flat surface 1073 perpendicular to first flat surface 1072. Note that the third flat surface may not be perpendicular to first flat surface 1072, and may be tilted to first flat surface 1072. With such a flat surface in this manner, the positional displacement in the second direction (the Z direction) with respect to the other optical connector 1020 can be suppressed. The number of inward regulation part 1071 is not limited. In the present embodiment, two (a pair of) inward regulation parts 1071 are provided. In addition, in the present embodiment, inward regulation part 1071 is an inner surface of a protrusion formed in engaging recess 1062 disposed with second optical part 123 therebetween in the first direction (the X direction). Outward regulation part 1074 is disposed to face outward (the direction opposite to inward regulation part 107) with second optical part 123 therebetween in the first direction (the X direction), so as to suppress the positional displacement in the second direction (the Z direction) with respect to the other optical connector 1020. Outward regulation part 1074 includes second flat surface 1075 perpendicular to the second direction (the Z direction), and second tilted surface 1076 tilted with respect to second flat surface 1075. With such a flat surface, the positional displacement in the second direction (the Z direction) with respect to the other optical connector 1020 can be suppressed. The number of outward regulation parts 1074 is not limited. In the present embodiment, two (a pair of) outward regulation parts 1074 are provided. In addition, in the present embodiment, outward regulation part 1074 is an inner surface of a notch part formed at the tip end of engaging protrusion 1061 disposed with second optical part 123 therebetween in the first direction (the X direction). Note that a second perpendicular surface may be provided instead of second tilted surface 1076. The second perpendicular surface is a surface perpendicular to second flat surface 1075.

Usage of Optical Connector Module

Figure 33A:
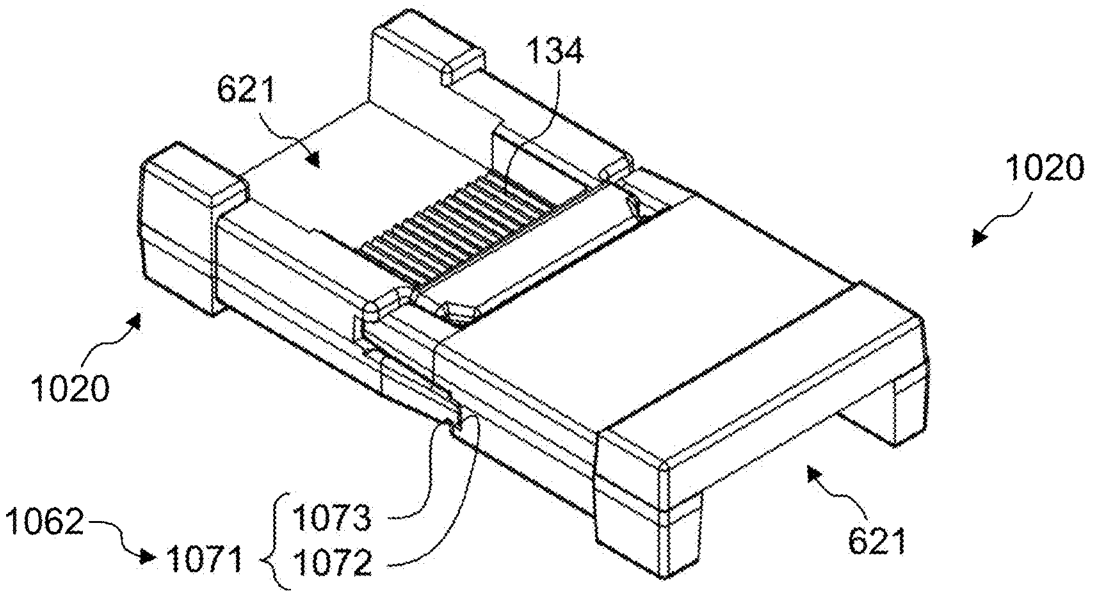
FIGS. 33A to 33C are diagrams for describing usage of the optical connector module according to Embodiment 7.
Figure 33B:
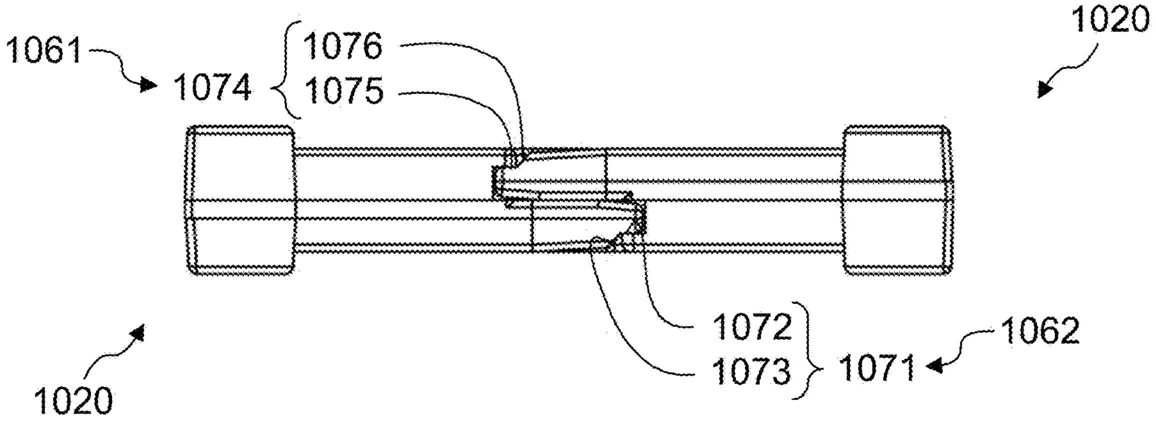
Figure 33C:
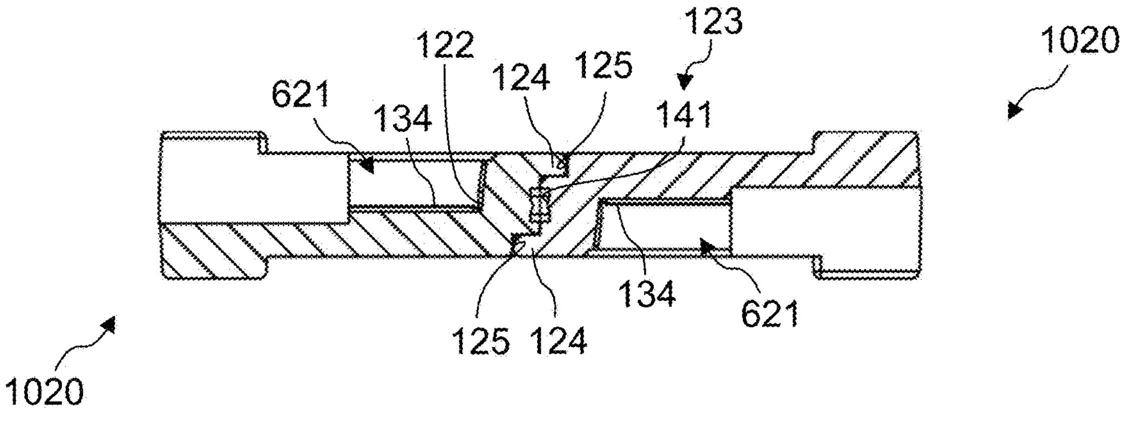

Now, usage of the optical connector module is described below. FIGS. 33A to 33C are perspective views illustrating a state where optical connector modules are connected to each other. FIG. 33A is a perspective view illustrating a state where optical connector modules are connected to each other, FIG. 33B is a side view illustrating a state where optical connector modules are connected to each other, and FIG. 33C is a sectional view illustrating a state where optical connector modules are connected to each other. Note that in FIGS. 33A to 33C, the optical transmission member and the lid are omitted.

As illustrated in FIGS. 33A to 33C, one optical connector module is set with the lid facing the upper side, and the other optical connector module is rotated (turned upside down) with a straight line along the first direction (the X direction) as a rotation axis. Then, protrusion 124 of one optical connector module and recess 125 of the other optical connector module are engaged with each other, and recess 125 of one optical connector module and protrusion 124 of the other optical connector module are engaged with each other.

In addition, engaging protrusion 1061 of one optical connector module and engaging recess 1062 of the other optical connector module are engaged with each other, and engaging recess 1062 of one optical connector module and engaging protrusion 1061 of the other optical connector module are engaged with each other. At this time, first outward regulation surface 127 of one optical connector module makes contact with first inward regulation surface 126 of the other optical connector module, and first inward regulation surface 126 of one optical connector module makes contact with first outward regulation surface 127 of the other optical connector module. In addition, a part of one optical connector module inward regulation part 1071 makes contact with outward regulation part 1074 of the other optical connector module 1000, and a part of outward regulation part 1074 of one optical connector module makes contact with inward regulation part 1071 of the other optical connector module 1000. Further, second inward regulation surface 151 of one optical connector module makes contact with second outward regulation surface 143 of the other optical connector module 1000, and second outward regulation surface 143 of one optical connector module makes contact with second inward regulation surface 151 of the other optical connector module 1000.

In this manner, in the first direction (the X direction) and the second direction (the Z direction), the positional displacement between one optical connector module and the other optical connector module is regulated, and, in the third direction (the Y direction), the twist between one optical connector module and the other optical connector module is regulated.

Effects

The optical connector module of the present embodiment has the same effects as those of optical connector module 100 according to Embodiment 1.

Embodiment 8

Next, the optical connector module according to Embodiment 8 is described. The optical connector module according to Embodiment 8 is different from optical connector module 100 according to Embodiment 1 only in the configuration of optical connector 1120. In view of this, optical connector 1120 is mainly described below.

Configuration of Optical Connector

Figure 34A:
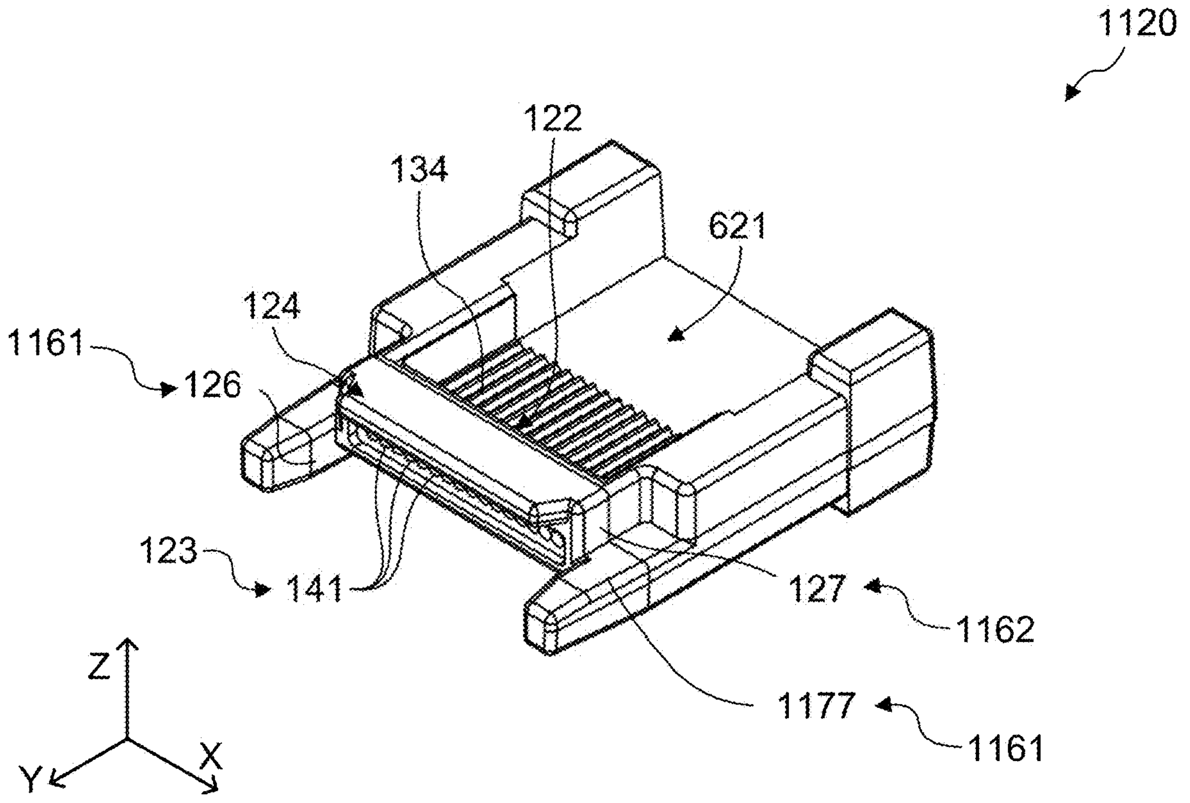
FIGS. 34A and 34B are perspective views of an optical connector according to Embodiment 8 of the present invention.
Figure 34B:
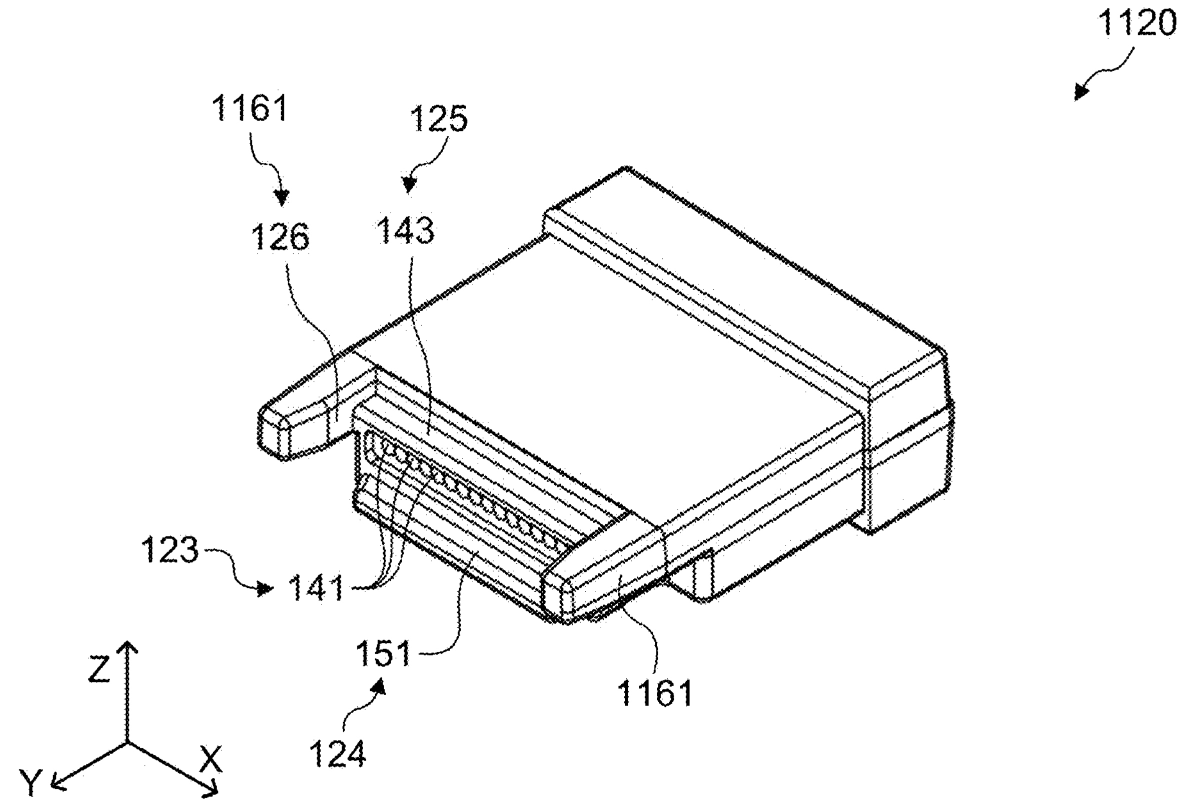

FIGS. 34A and 34B are perspective views of optical connector 1120 according to Embodiment 8 of the present invention. FIG. 34A is a perspective view as viewed from the upper side of optical connector 1120, and FIG. 34B is a perspective view as viewed from the lower side.

As illustrated in FIGS. 34A and 34B, optical connector 1120 according to Embodiment 8 includes holding part 621, first optical part 122, second optical part 123, protrusion 124, recess 125, first inward regulation surface 126, first outward regulation surface 127, and third inward regulation surface 1177.

Holding part 621 is the same as optical connector 620 according to Embodiment 3, and the notch part for disposing the lid 632 at a predetermined position is not disposed at both end portions of holding recess 631 in the first direction (the X direction).

In the present embodiment, protrusion 124 includes second inward regulation surface 151, and recess 125 includes second outward regulation surface 143.

First inward regulation surface 126 includes a flat surface disposed to face inward along the first direction (the X direction). In the present invention, with such a flat surface rather than a curved surface, first inward regulation surface 126 can suppress the positional displacement in the first direction (the X direction) with respect to the other optical connector 120. The number of first inward regulation surfaces 126 is not limited. In the present embodiment, two (a pair of) first inward regulation surfaces 126 are provided. In addition, in the present embodiment, first inward regulation surface 126 is a part of the outer surface of engaging protrusion 1161 disposed with second optical part 123 therebetween in the first direction (the X direction).

First outward regulation surface 127 includes a flat surface disposed to face outward along the first direction (the X direction). With a flat surface rather than a curved surface in this manner, first outward regulation surface 127 can suppress the positional displacement in the first direction (the X direction) with respect to the other optical connector 120. The number of first outward regulation surfaces 127 is not limited. In the present embodiment, two (a pair of) first outward regulation surfaces 127 are provided. In addition, in the present embodiment, first outward regulation surface 127 is a part of the inner surface of engaging recess 1162 disposed with second optical part 123 therebetween in the first direction (the X direction).

Third inward regulation surface 1177 is a flat surface disposed to face the reference straight line in the second direction (the Z direction) perpendicular to the first direction (the X direction) as viewed along the optical path between optical connector 1120 and the other optical connector 1120, so as to suppress the positional displacement in the second direction (the Z direction) with respect to the other optical connector 1120. With a flat surface rather than a curved surface in this manner, third inward regulation surface 1177 can suppress the positional displacement in the second direction (the Z direction) with respect to the other optical connector 120. The number of third inward regulation surfaces 1177 is not limited. In the present embodiment, two (a pair of) third inward regulation surfaces 1177 are provided. In addition, in the present embodiment, third inward regulation surface 1177 is a part of the top surface of engaging protrusion 1161 disposed with second optical part 123 therebetween in the first direction (the X direction), and a part of the inner surface of engaging recess 1162.

Usage of Optical Connector Module

Figure 35A:
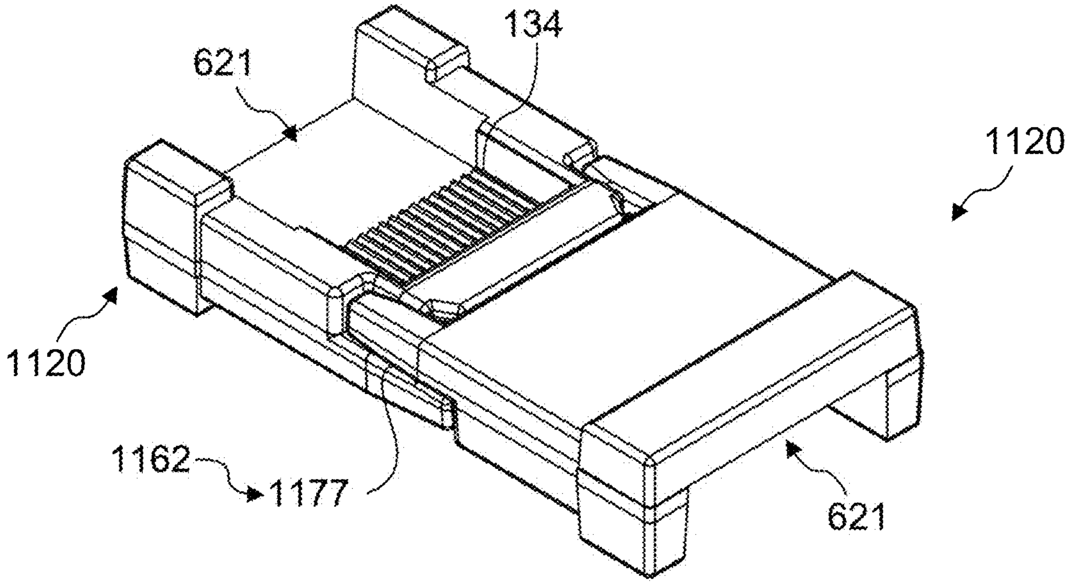
FIGS. 35A to 35C are diagrams for describing usage of the optical connector module according to Embodiment 8.
Figure 35B:
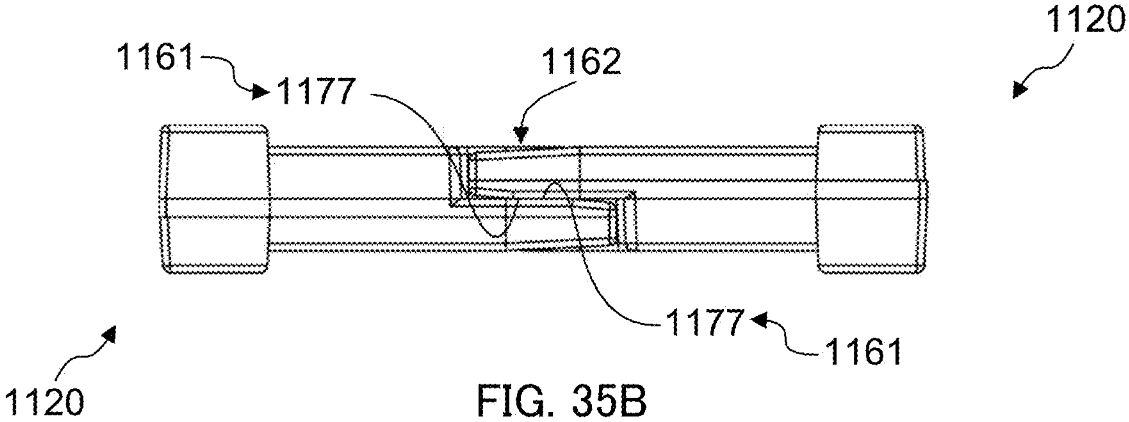
Figure 35C:
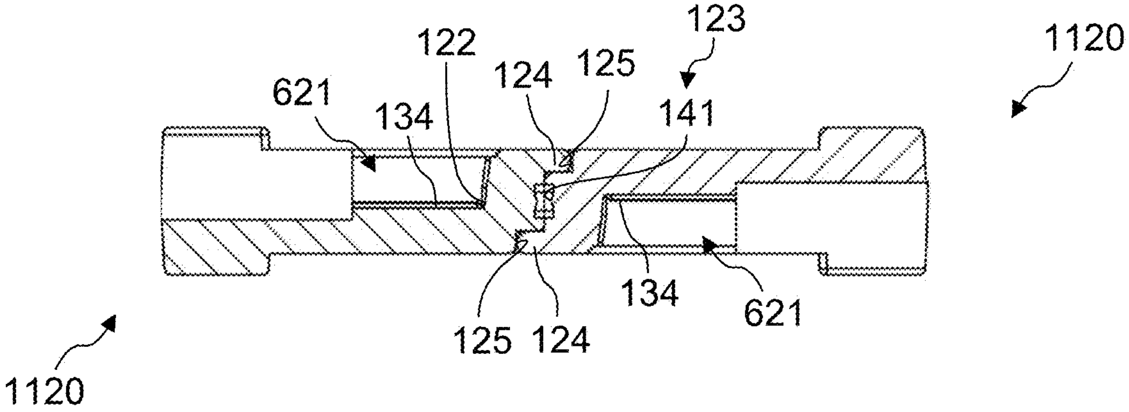

Now, usage of the optical connector module is described below. FIGS. 35A to 35C are perspective views illustrating a state where optical connector modules are connected to each other. FIG. 35A is a perspective view illustrating a state where optical connector modules are connected to each other, FIG. 35B is a side view illustrating a state where optical connector modules are connected to each other, and FIG. 35C is a sectional view illustrating a state where optical connector modules are connected to each other. Note that in FIGS. 35A to 35C, optical transmission member 110 and the lid are omitted.

As illustrated in FIGS. 35A to 35C, one optical connector module is set with the lid facing the upper side, and the other optical connector module is rotated (turned upside down) with a straight line along the first direction (the X direction) as a rotation axis. Then, protrusion 124 of one optical connector module and recess 125 of the other optical connector module are engaged with each other, and recess 125 of one optical connector module and protrusion 124 of the other optical connector module are engaged with each other.

In addition, engaging protrusion 1161 of one optical connector module and engaging recess 1162 of the other optical connector module are engaged with each other, and engaging recess 1162 of one optical connector module and engaging protrusion 1161 of the other optical connector module are engaged with each other. At this time, first outward regulation surface 127 of one optical connector module makes contact with first inward regulation surface 126 of the other optical connector module, and first inward regulation surface 126 of one optical connector module makes contact with first outward regulation surface 127 of the other optical connector module. Further, third inward regulation surface 1177 of one optical connector module makes contact with third inward regulation surface 1177 of the other optical connector module.

In this manner, in the first direction (the X direction) and the second direction (the Z direction), the positional displacement between one optical connector module and the other optical connector module is regulated, and, in the third direction (the Y direction), the twist between one optical connector module and the other optical connector module is regulated.

Effects

The optical connector module of the present embodiment has the same effects as those of optical connector module 100 according to Embodiment 1.

Embodiment 9

Next, the optical connector module according to Embodiment 9 is described. The optical connector module according to Embodiment 9 is different from optical connector module 100 according to Embodiment 1 only in the configuration of optical connector 1220. In view of this, optical connector 1220 is mainly described below.

Configuration of Optical Connector

Figure 36A:
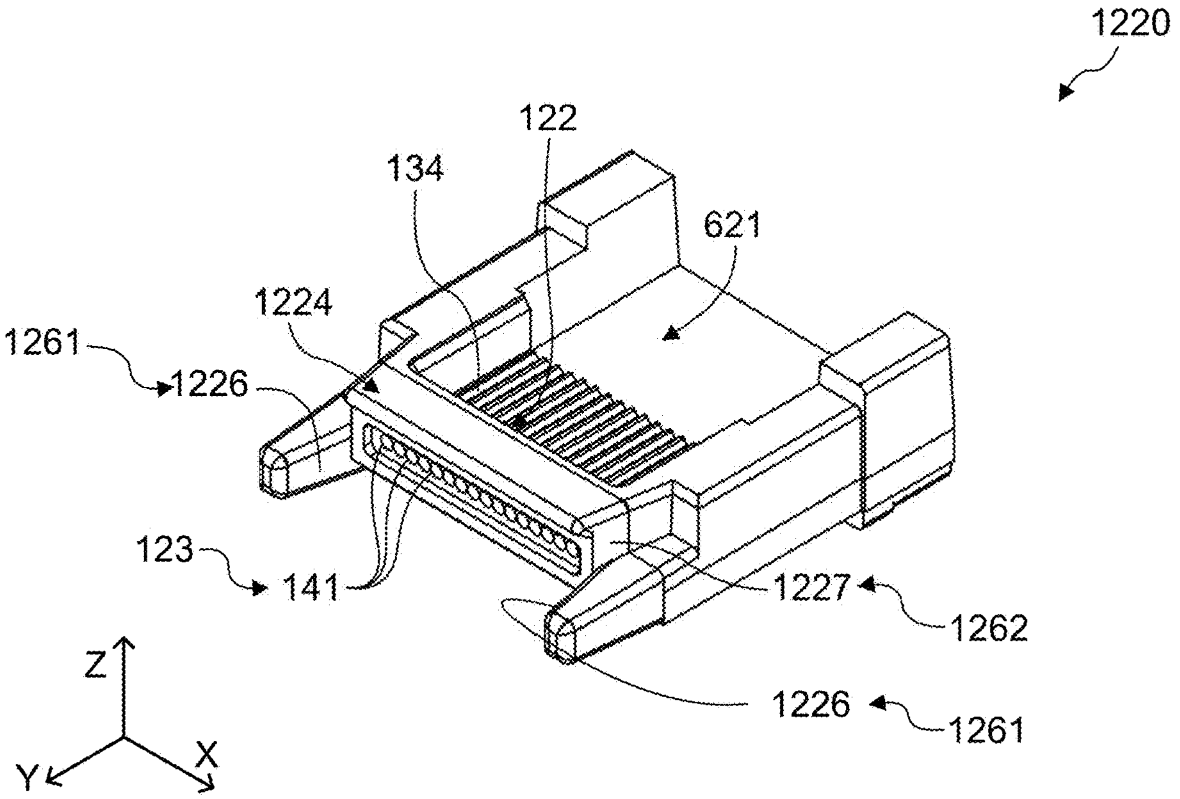
FIGS. 36A and 36B are perspective views of an optical connector according to Embodiment 9 of the present invention.
Figure 36B:
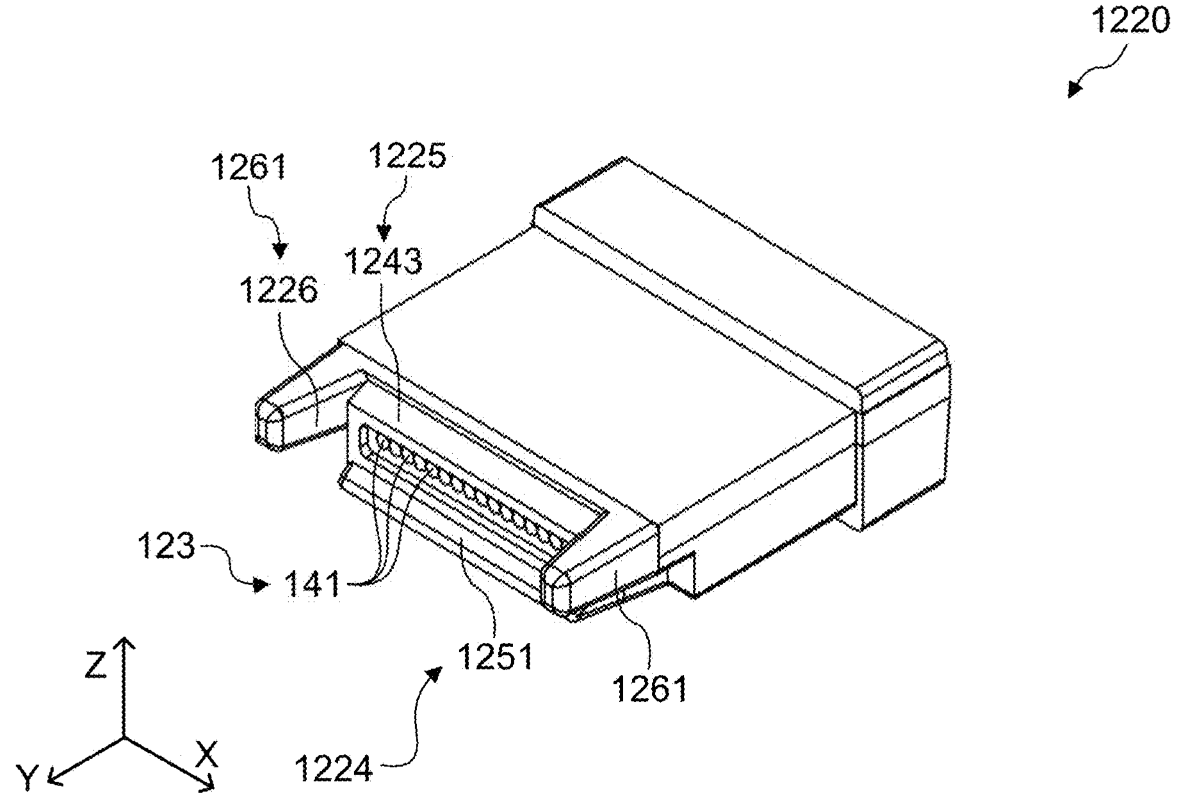

FIGS. 36A and 36B are perspective views of optical connector 1220 according to Embodiment 9 of the present invention. FIG. 36A is a perspective view as viewed from the upper side of optical connector 1220, and FIG. 36B is a perspective view as viewed from the lower side.

As illustrated in FIGS. 36A and 36B, optical connector 1220 according to Embodiment 9 includes holding part 621, first optical part 122, second optical part 123, protrusion 1224, recess 1225, first inward regulation surface 1226, and first outward regulation surface 1227.

Holding part 621 is the same as optical connector 620 according to Embodiment 3, and the notch part for disposing the lid at a predetermined position is not disposed at both end portions of holding recess 631 in the first direction (the X direction).

In the present embodiment, protrusion 1224 includes second inward regulation surface 1251, and recess 1225 includes second outward regulation surface 1243.

First inward regulation surface 1226 includes a flat surface disposed to face inward along the first direction (the X direction). In the present invention, with such a flat surface rather than a curved surface, first inward regulation surface 1226 can suppress the positional displacement in the first direction (the X direction) with respect to the other optical connector 1220. The number of first inward regulation surfaces 1226 is not limited. In the present embodiment, two (a pair of) first inward regulation surfaces 1226 are provided. In the present embodiment, first inward regulation surface 1226 is a part of the outer surface of engaging protrusion 1261. More specifically, first inward regulation surface 1226 is the inner side surface of engaging protrusion 1261. First inward regulation surface 1226 is tilted such that the distance between first inward regulation surfaces 1226 decreases as it goes from the front surface of optical connector 1220 toward the back surface.

First outward regulation surface 1227 includes a flat surface disposed to face outward along the first direction (the X direction). With a flat surface rather than a curved surface in this manner, first outward regulation surface 1227 can suppress the positional displacement in the first direction (the X direction) with respect to the other optical connector 1220. The number of first outward regulation surfaces 1227 is not limited. In the present embodiment, two (a pair of) first outward regulation surfaces 1227 are provided. In the present embodiment, first outward regulation surface 1227 is a part of protrusion 1224 and a part of the inner surface of engaging recess 1262. More specifically, first outward regulation surface 1227 is the inner surface of engaging recess 1262. First outward regulation surface 1227 is tilted such that the distance between first outward regulation surfaces 1227 increases as it goes from the front surface of optical connector 1220 toward the back surface.

Protrusion 1224 includes second inward regulation surface 1251. Second inward regulation surface 1251 is a tilted surface. Second inward regulation surface 1251 is tilted toward the rear surface side of optical connector 1220 as it goes from the front surface of optical connector 1220 toward the back surface.

Recess 1225 includes second outward regulation surface 1243. Second outward regulation surface 1243 is a tilted surface. Second outward regulation surface 1243 is tilted toward the rear surface side of optical connector 1220 as it goes from the front surface of optical connector 1220 toward the back surface.

Usage of Optical Connector Module

Figure 37A:
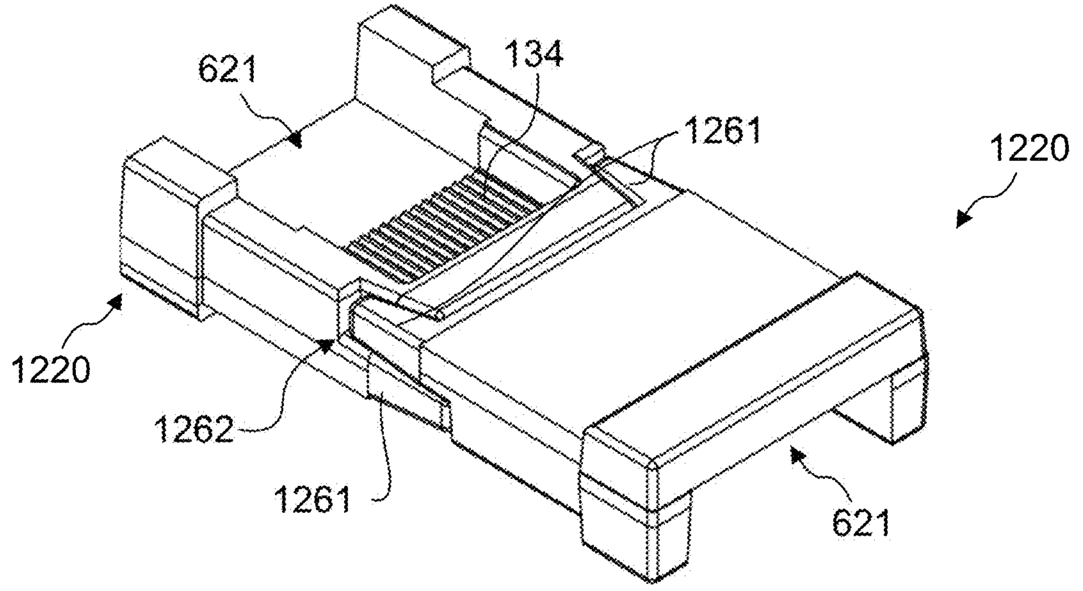
FIGS. 37A to 37C are diagrams for describing usage of the optical connector module according to Embodiment 9.
Figure 37B:
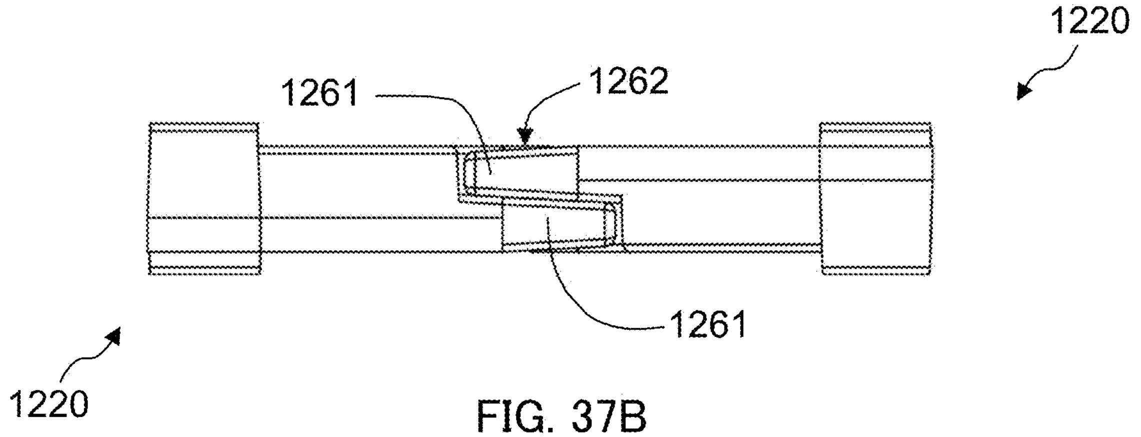
Figure 37C:
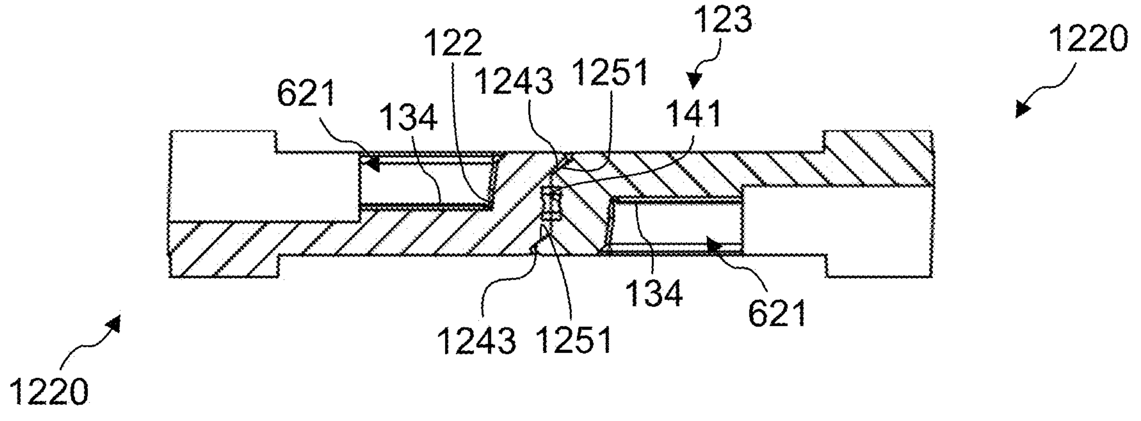

Now, usage of the optical connector module is described below. FIGS. 37A to 37C are perspective views illustrating a state where optical connector modules are connected to each other. FIG. 37A is a perspective view illustrating a state where optical connector modules are connected to each other, FIG. 37B is a side view illustrating a state where optical connector modules are connected to each other, and FIG. 37C is a sectional view illustrating a state where optical connector modules are connected to each other. Note that in FIGS. 37A to 37C, optical transmission member 110 and the lid are omitted.

As illustrated in FIGS. 37A to 37C, one optical connector module is set with lid 132 facing the upper side, and the other optical connector module is rotated (turned upside down) with a straight line along the first direction (the X direction) as a rotation axis. Then, protrusion 1224 of one optical connector module and recess 1225 of the other optical connector module 100 are engaged with each other, and recess 1225 of one optical connector module and protrusion 1224 of the other optical connector module are engaged with each other. At this time, second inward regulation surface 1251 of one optical connector module makes contact with second outward regulation surface 1243 of the other optical connector module, and second outward regulation surface 1243 of one optical connector module makes contact with second inward regulation surface 1251 of the other optical connector module.

In addition, engaging protrusion 1261 of one optical connector module and engaging recess 1262 of the other optical connector module are engaged with each other, and engaging recess 1262 of one optical connector module and engaging protrusion 1261 of the other optical connector module are engaged with each other. At this time, first outward regulation surface 1227 of one optical connector module and first inward regulation surface 1226 of the other optical connector module make contact with each other, and first inward regulation surface 1226 of one optical connector module and first outward regulation surface 1227 of the other optical connector module make contact with each other.

In this manner, in the first direction (the X direction) and the second direction (the Z direction), the positional displacement between one optical connector module and the other optical connector module is regulated, and, in the third direction (the Y direction), the twist between one optical connector module and the other optical connector module is regulated.

Effects

The optical connector module of the present embodiment has the same effects as those of optical connector module 100 according to Embodiment 1.

Note that in the present embodiment, first inward regulation surface 1226 and first outward regulation surface 1227, and second inward regulation surface 1251 and second outward regulation surface 1243 are both tilted, but only one of first inward regulation surface 1226 and first outward regulation surface 1227, or second inward regulation surface 1251 and second outward regulation surface 1243 may be tilted.

Embodiment 10

Next, the optical connector module according to Embodiment 10 is described. The optical connector module according to Embodiment 10 is different from optical connector module 100 according to Embodiment 1 only in the configuration of optical connector 1320.

In view of this, optical connector 1320 is mainly described below.

Configuration of Optical Connector

Figure 38A:
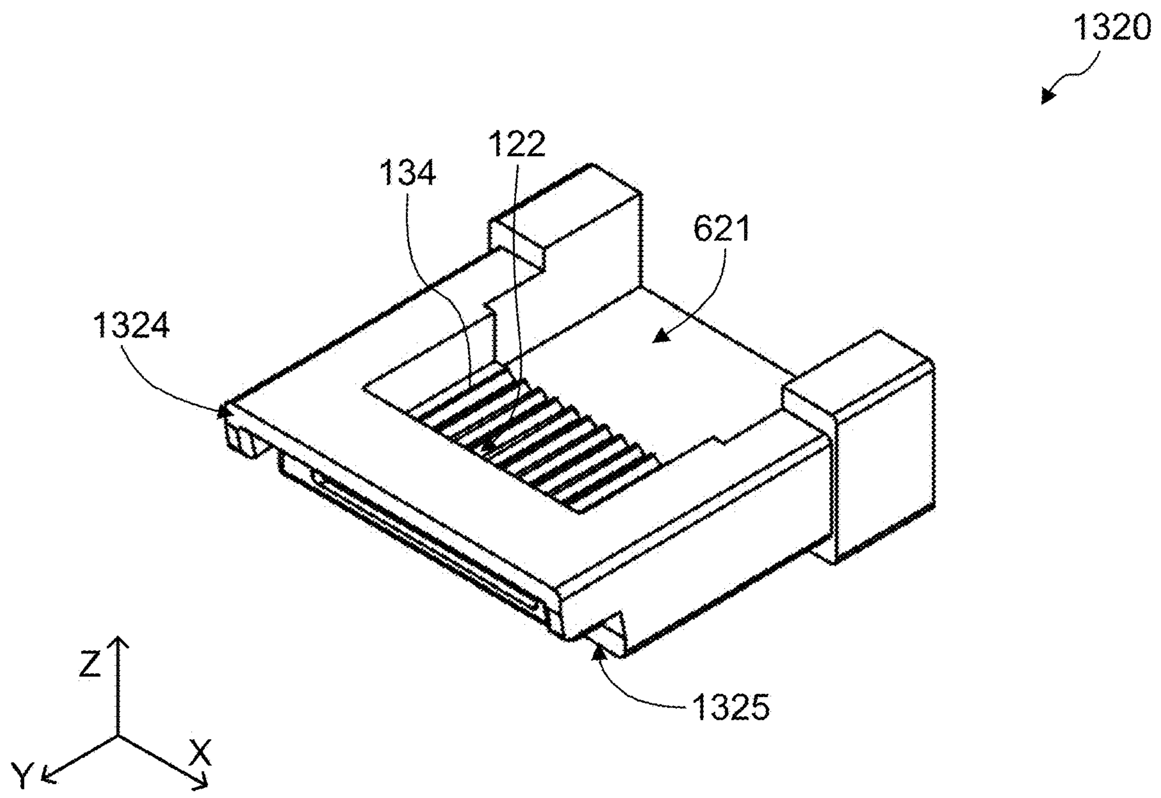
FIGS. 38A and 38B are perspective views of an optical connector according to Embodiment 10 of the present invention.
Figure 38B:
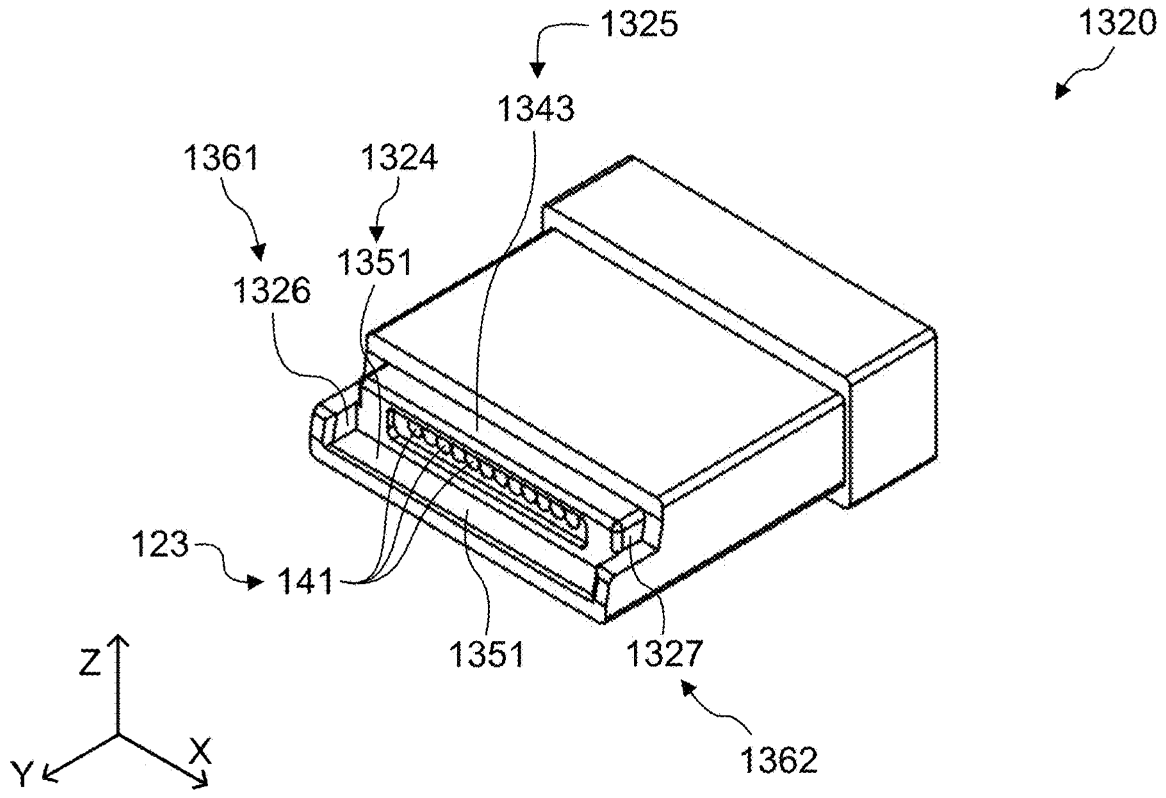

FIGS. 38A and 38B are perspective views of optical connector 1320 according to Embodiment 10 of the present invention. FIG. 38A is a perspective view as viewed from the upper side of optical connector 1320, and FIG. 38B is a perspective view as viewed from the lower side.

As illustrated in FIGS. 38A and 38B, optical connector 1320 according to Embodiment 10 includes holding part 621, first optical part 122, second optical part 123, protrusion 1324, recess 1325, first inward regulation surface 1326, and first outward regulation surface 1327.

Holding part 621 is the same as optical connector 620 according to Embodiment 3, and the notch part for disposing the lid at a predetermined position is not disposed at both end portions of holding recess 631 in the first direction (the X direction).

In the present embodiment, protrusion 1324 includes second inward regulation surface 1351, and recess 1325 includes second outward regulation surface 1343.

First inward regulation surface 1326 includes a flat surface disposed to face inward along the first direction (the X direction). In the present invention, with such a flat surface rather than a curved surface, first inward regulation surface 1326 can suppress the positional displacement in the first direction (the X direction) with respect to the other optical connector 1320. The number of first inward regulation surfaces 1326 is not limited. In the present embodiment, two (a pair of) first inward regulation surfaces 1326 are provided. In addition, in the present embodiment, first inward regulation surface 1326 is a part of the outer surface of engaging protrusion 1361 disposed with second optical part 123 therebetween in the first direction (the X direction). In the present embodiment, first inward regulation surface 1326 is parallel to the YZ plane.

First outward regulation surface 1327 includes a flat surface disposed to face outward along the first direction (the X direction). With a flat surface rather than a curved surface in this manner, first outward regulation surface 1327 can suppress the positional displacement in the first direction (the X direction) with respect to the other optical connector 1320. The number of first outward regulation surfaces 1327 is not limited. In the present embodiment, two (a pair of) first outward regulation surfaces 1327 are provided. In addition, in the present embodiment, first outward regulation surface 1327 is a part of the outer surface of engaging recess 1362 disposed with second optical part 123 therebetween in the first direction (the X direction). In the present embodiment, first outward regulation surface 1327 is parallel to the YZ plane.

Protrusion 1324 includes second inward regulation surface 1251. In the present embodiment, in front view, protrusion 1324 is disposed on the top surface side of optical connector 1320.

Recess 1325 includes second outward regulation surface 1343. In the present embodiment, in front view, recess 1325 is disposed on the bottom surface side of optical connector 1320.

In the present embodiment, protrusion 1324 and engaging protrusion 1361 are formed as one piece. In addition, in the present embodiment, recess 1325 and engaging recess 1362 are formed as one piece.

Usage of Optical Connector Module

Figure 39A:
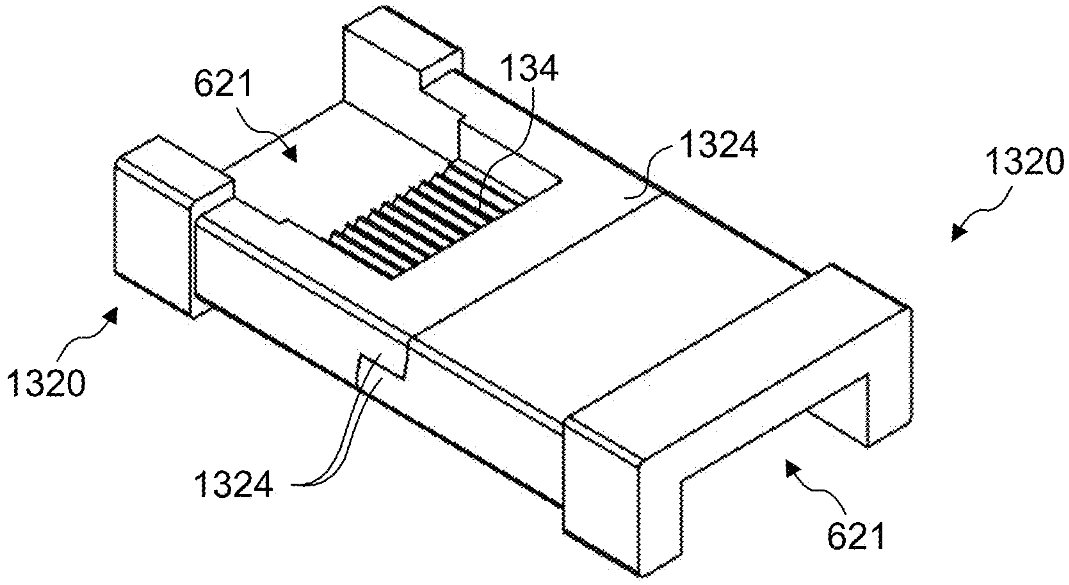
FIGS. 39A to 39C are diagrams for describing usage of the optical connector module according to Embodiment 10.
Figure 39B:
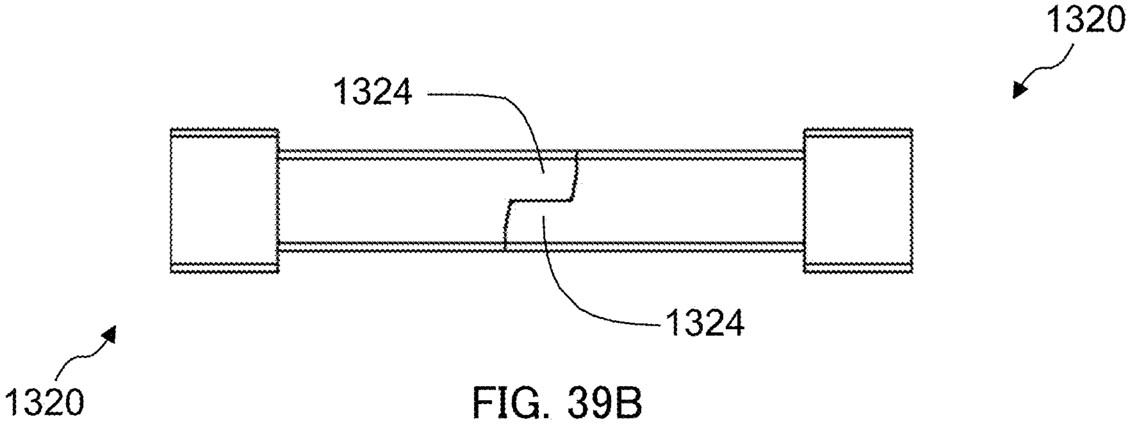
Figure 39C:
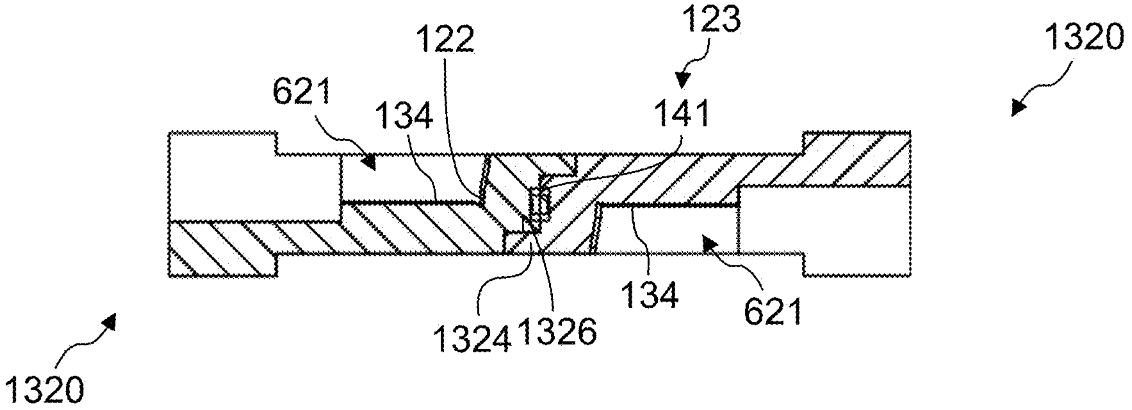

Now, usage of the optical connector module is described below. FIGS. 39A to 39C are perspective views illustrating a state where optical connector modules are connected to each other. FIG. 39A is a perspective view illustrating a state where optical connector modules are connected to each other, FIG. 39B is a side view illustrating a state where optical connector modules are connected to each other, and FIG. 39C is a sectional view illustrating a state where optical connector modules are connected to each other. Note that in FIGS. 39A to 39C, optical transmission member 110 and the lid are omitted.

As illustrated in FIGS. 39A to 39C, one optical connector module is set with lid 132 facing the upper side, and the other optical connector module is rotated (turned upside down) with a straight line along the first direction (the X direction) as a rotation axis. Then, protrusion 1324 of one optical connector module and recess 1325 of the other optical connector module 100 are engaged with each other. At this time, second inward regulation surface 1551 of one optical connector module and second outward regulation surface 1543 of the other optical connector module make contact with each other, and second outward regulation surface 1543 of one optical connector module and second inward regulation surface 1551 of the other optical connector module make contact with each other. In addition, first outward regulation surface 1327 of one optical connector module and first inward regulation surface 1326 of the other optical connector module make contact with each other, and first inward regulation surface 1326 of one optical connector module and first outward regulation surface 1327 of the other optical connector module make contact with each other.

In this manner, in the first direction (the X direction) and the second direction (the Z direction), the positional displacement between one optical connector module and the other optical connector module is regulated. Note that in the present embodiment, the positional displacement is regulated only in one of the third direction (the Y direction), and as such it is preferable to regulate the positional displacement by means of an adapter or the like.

Effects

The optical connector module of the present embodiment has the same effects as those of optical connector module 100 according to Embodiment 1.

Embodiment 11

Next, optical connector module 1400 according to Embodiment 11 is described. The optical connector module according to Embodiment 11 optically couples the plurality of optical transmission members 110 and the other optical transmission member 1420 by engaging the optical connector holding the plurality of optical transmission members 110 as optical fibers according to any of one Embodiments 1 to 10, and optical connector 1420 holding optical transmission member 1410 serving as an optical waveguide. The following describes an example using optical connector 620 according to Embodiment 3 serving as the optical connector holding the plurality of optical transmission members 110 as optical fibers.

Configuration of Optical Connector

Figure 40A:
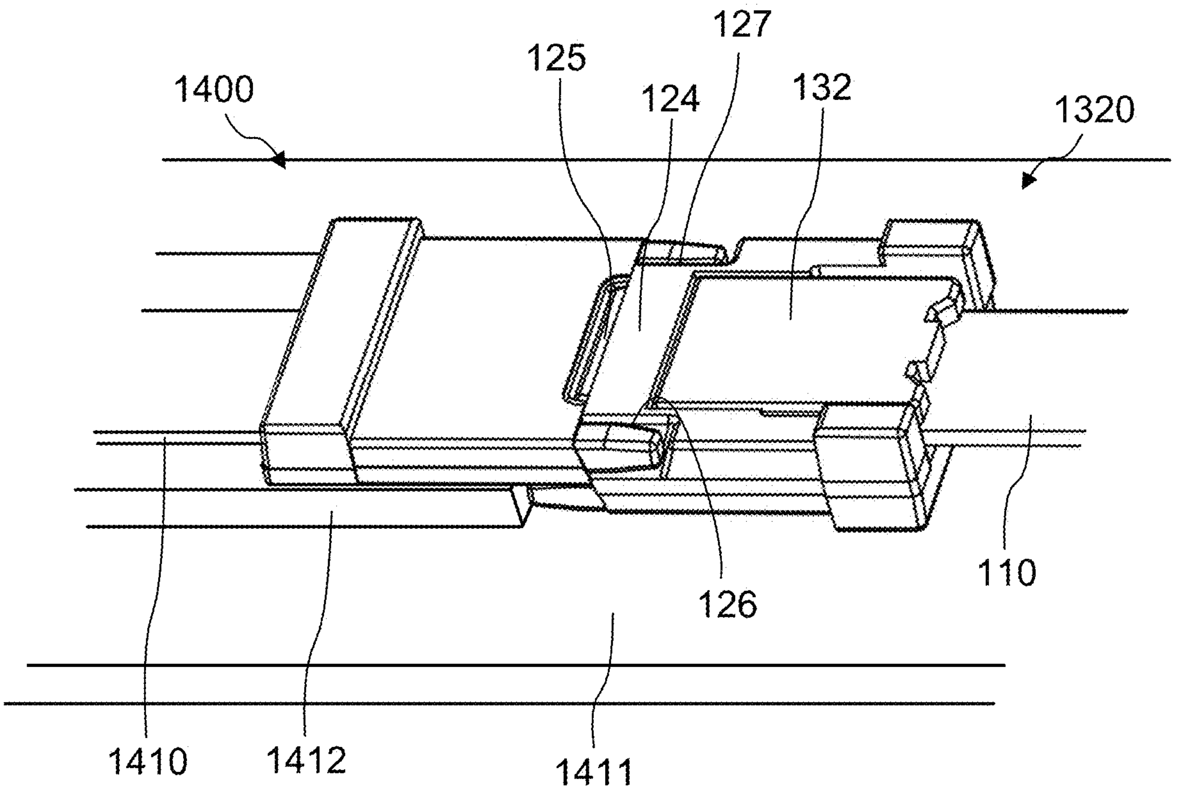
FIGS. 40A and 40B are diagrams for describing an optical connector module according to Embodiment 11.
Figure 40B:
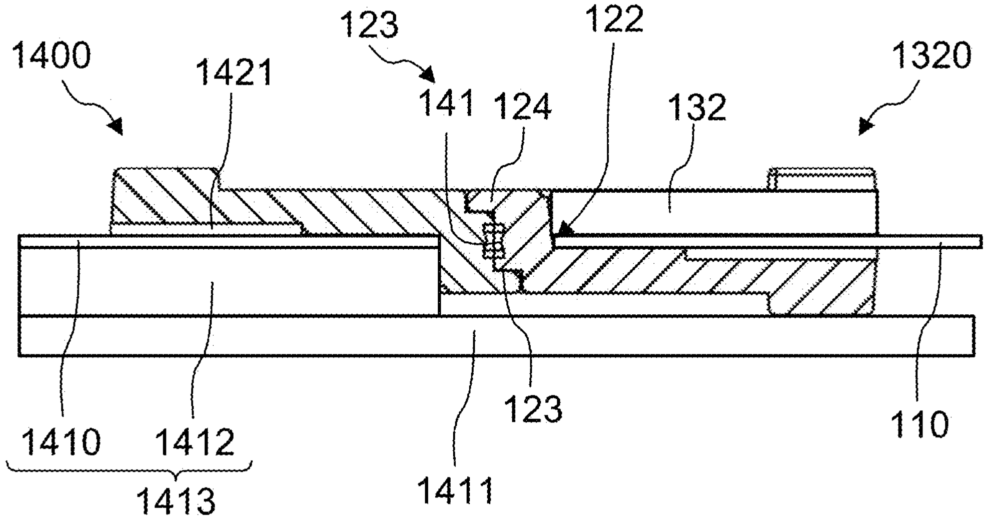

FIGS. 40A and 40B are diagrams illustrating a configuration of optical connector module 1400 according to Embodiment 11 of the present invention. FIG. 40A is a perspective view as viewed from the upper side of optical connector module 1400, and FIG. 40B is an YZ cross-sectional view.

As illustrated in FIGS. 40A and 40B, optical connector module 1400 according to Embodiment 11 is disposed on substrate 1411, and includes optical transmission members 110 and 1410, and optical connectors 620 and 1420. Optical transmission member 110 and optical connector 620 are the same as optical transmission member 110 and optical connector 620 of Embodiment 3, and therefore the description thereof will be omitted.

In the present embodiment, optical transmission member 1420 is an optical waveguide. Optical transmission member 1420 is disposed on silicon substrate 1412. Optical transmission member 1420 serving as an optical waveguide and silicon substrate 1412 make up photonic integrated circuit (PIC) 1413. While the position of the optical transmission member is not limited, it may be disposed so as to protrude upward from a recess formed in the top surface of photonic integrated circuit 1413, or may be embedded inside photonic integrated circuit 1413. In addition, in the present embodiment, the optical transmission member includes a clad and a plurality of cores.

Optical connector 1420 includes holding part 1421, first optical part 122, second optical part 123, protrusion 124, recess 125, first inward regulation surface 126, and first outward regulation surface 127. In this manner, optical connector 1420 of the present embodiment is the same as optical connector 620 in terms of the engaging shape.

Holding part (installation section) 1421 holds optical transmission member 1410 serving as an optical waveguide. The configuration of holding part 1421 is not limited as long as optical transmission member 1410 can be installed. In the present embodiment, holding part 1421 is the entire region on the back side of optical connector 1420 than second optical part 123. In addition, holding part (installation section) 1421 does not include groove 134 for disposing optical transmission member 1420 as an optical waveguide.

Usage of Optical Connector Module 1400

Now, usage of optical connector module 1400 is described.

As illustrated in FIGS. 40A and 40B, one optical connector module 600 is connected to optical connector 1420 of the other optical connector module 1400 in an upside-down manner. At this time, protrusion 124 of the other optical connector module 1400 and recess 125 of one optical connector module 600 are engaged with each other, and recess 125 of the other optical connector module 1400 and protrusion 124 of one optical connector module 600 are engaged with each other. In this manner, in the second direction (the Z direction), the positional displacement between the other optical connector module 1400 and one optical connector module 600 is regulated. In addition, engaging protrusion 161 of the other optical connector module 1400 and engaging recess 162 of one optical connector module 600 are engaged with each other, and engaging recess 162 of the other optical connector module and engaging protrusion 161 of one optical connector module 600 are engaged with each other. In this manner, in the first direction (the X direction), the positional displacement between the other optical connector module 1400 and one optical connector module 600 is regulated. In addition, contact surface 642 of one optical connector module 600 and contact surface 642 of the other optical connector module 1400 are brought into contact with each other. In this manner, the plurality of optical transmission members 110 connected to the other optical connector module 1400 and optical transmission member 110 connected to one optical connector module 600 are optically connected to each other.

Effects

Optical connector module 1400 of the present embodiment has the same effects as those of optical connector module 100 according to Embodiment 1.

This application is entitled to and claims the benefit of Japanese Patent Application No. 2021-144109 filed on Sep.

3, 2021, Japanese Patent Application No. 2021-177884 filed on Oct. 29, 2021, and Japanese Patent Application No. 2022-019614 filed on Feb. 10, 2022, the disclosure each of which including the specification, drawings and abstract is incorporated herein by reference in its entirety.

INDUSTRIAL APPLICABILITY

The optical connector and the optical connector module according to the present invention are suitable for optical communications using optical transmission members.

REFERENCE SIGNS LIST

100, 600, 700, 800, 900, 1400 Optical connector module
110, 1410 Optical transmission member
120, 220, 320, 520, 620, 720, 820, 920, 1020, 1120, 1220, 1320, 1420 Optical connector
121, 221, 321, 621, 1421 Holding part
122 First optical part
123 Second optical part
124, 724, 824 Protrusion
125, 725, 825 Recess
126, 226, 726, 1226, 1326 First inward regulation surface
127, 227, 727, 1227, 1327 First outward regulation surface
131, 231, 631 Holding recess
132, 632 Lid
133 Notch
134, 234 Groove
135 Lid body
136 Protrusion part
141 Projecting surface
142, 642 Contact surface
143, 743, 843, 943, 1243, 1343 Second outward regulation surface
144 First surface
145 Second surface
146 Third surface
147 Top surface
151, 751, 851, 951, 1251, 1351 Second inward regulation surface
152 First inner surface
153 Second inner surface
154 Third inner surface
161, 261, 1061, 1161, 1261, 1361 Engaging protrusion
162, 262, 1062, 1162, 1262, 1362 Engaging recess
263 First engaging portion
264 Second engaging portion
371 Insertion part
372 Through hole
373 Adhesive recess
528 Fixing part
528*a* Claw part
528*b* Nob
1071 Inward regulation part
1072 First flat surface
1073 Third flat surface
1074 Outward regulation part
1075 Second flat surface
1076 Second tilted surface
1177 Third inward regulation surface
1411 Substrate
1412 Silicon substrate
1413 Photonic integrated circuit

The invention claimed is:

1. An optical connector configured to hold a plurality of optical transmission members, and configured to be engaged with another optical connector with a same fitting shape holding a plurality of other optical transmission members to optically couple the plurality of optical transmission members and the plurality of other optical transmission members, the optical connector comprising:

a holding part configured to hold the plurality of optical transmission members disposed in parallel to each other in a first direction;

a first optical part disposed to face end surfaces of the plurality of optical transmission members held by the holding part, and configured to allow incidence of light emitted from the plurality of optical transmission members or emit light toward the plurality of optical transmission members;

a second optical part configured to emit toward the other optical connector light entered from the first optical part, or allow incidence of light from the other optical connector;

a protrusion and a recess disposed at positions in a line-symmetric manner with respect to a reference straight line extending in parallel to the first direction as viewed along an optical path between the optical connector and the other optical connector, the protrusion and the recess being configured for engaging with the other optical connector;

at least one pair of first inward regulation surfaces that are flat surfaces disposed to face inward in the first direction, and configured to suppress positional displacement with respect to the other optical connector in the first direction; and at least one pair of first outward regulation surfaces that are flat surfaces disposed to face outward in the first direction, and configured to suppress positional displacement with respect to the other optical connector in the first direction, an outward regulation part disposed to sandwich the second optical part in the first direction and to face outward in a second direction perpendicular to the first direction as viewed along the optical path between the optical connector and the other optical connector, the outward regulation part being configured to suppress positional displacement with respect to the other optical connector in the second direction; and an inward regulation part disposed to sandwich the second optical part in the first direction and to face away from the outward regulation part as viewed along the optical path between the optical connector and the other optical connector in the second direction, the inward regulation part being configured to suppress positional displacement with respect to the other optical connector in the second direction, wherein the inward regulation part includes a first flat surface perpendicular to the second direction, wherein the outward regulation part includes a second flat surface perpendicular to the second direction, and a second tilted surface tilted with respect to the second flat surface or a second perpendicular surface perpendicular to the second flat surface, wherein when the optical connector and the other optical connector are engaged with each other, the protrusion and the recess are engaged with a recess and a protrusion, respectively, of the other optical connector, the at least one pair of first inward regulation surfaces makes contact with at least one pair of first outward regulation surfaces of the other optical connector, and the at least one pair of first outward regulation surfaces makes contact with at least one pair of first inward regulation surfaces of the other optical connector, a part of the inward regulation part makes contact with an outward regulation part of the other optical connector, and a part of the outward regulation part makes contact with an inward regulation part of the other optical connector.

2. The optical connector according to claim 1, wherein the at least one pair of first inward regulation surfaces and the at least one pair of first outward regulation surfaces are a part of a latch structure configured to connect the optical connector and the other optical connector.

3. The optical connector according to claim 1, wherein one of the protrusion and the recess includes a second inward regulation surface that is a flat surface disposed to face inward in the second direction, and configured to suppress positional displacement with respect to the other optical connector in the second direction, wherein the other of the protrusion and the recess includes a second outward regulation surface that is a flat surface disposed to face outward in the second direction, and configured to suppress positional displacement with respect to the other optical connector in the second direction, and wherein when the optical connector and the other optical connector are engaged with each other, the second inward regulation surface makes contact with a second outward regulation surface of the other optical connector, and the second outward regulation surface makes contact with a second inward regulation surface of the other optical connector.

4. The optical connector according to claim 1, further comprising a third inward regulation surface that is a flat surface disposed to face the reference straight line in the second direction, the third inward regulation surface being configured to suppress positional displacement with respect to the other optical connector in the second direction, wherein the third inward regulation surface makes contact with a third inward regulation surface of the other optical connector.

5. The optical connector according to claim 3, wherein the second inward regulation surface and the second outward regulation surface are tilted with respect to the second direction perpendicular to the first direction as viewed along the optical path between the optical connector and the other optical connector.

6. The optical connector according to claim 5, wherein the first inward regulation surface and the first outward regulation surface are tilted with respect to the second direction in a plane including the first direction, and the second direction perpendicular to the first direction as viewed along the optical path between the optical connector and the other optical connector.

7. The optical connector according to claim 1, wherein the holding part includes:

a holding recess including a notch part at both end portions in the first direction, and configured to dispose the plurality of optical transmission members; and a lid configured be disposed to cover the holding recess where the plurality of optical transmission members is disposed.

8. The optical connector according to claim 1, further comprising a contact surface disposed to face the other optical connector and configured to make contact with the other optical connector when the optical connector and the other optical connector are engaged with each other, wherein the protrusion and the recess are disposed at the contact surface, and wherein the contact surface is a tilted surface that is tilted toward the first optical part side in a direction from the protrusion toward the recess as viewed along the first direction.

9. An optical connector module, comprising:

a plurality of optical transmission members; and the optical connector according to claim 1.

10. The optical connector module according to claim 9, wherein an end surface of the optical transmission member is tilted with respect to a plane orthogonal to an extending direction of the optical transmission member, wherein the second optical part includes a plurality of projecting surfaces disposed in parallel in the first direction and configured to emit toward the other optical connector light entered from the first optical part or allow incidence of light from the other optical connector, and wherein a central axis of one projecting surface of the plurality of projecting surfaces, and a virtual line do not intersect the reference straight line, the virtual line being a line passing through a center of an end surface of one optical transmission member corresponding to the one projecting surface among the plurality of optical transmission members, and extending in a third direction perpendicular the first direction and a second direction.

* * * * *